US008054319B2

(12) United States Patent
Lee et al.

(10) Patent No.: US 8,054,319 B2
(45) Date of Patent: Nov. 8, 2011

(54) METHOD AND APPARATUS FOR MULTISCREEN MANAGEMENT FOR MULTIPLE SCREEN CONFIGURATION

(75) Inventors: Kwang-Kee Lee, Seoul (KR); Jong-Ho Lee, Seoul (KR); Sung-Wook Byun, Suwon-si (KR); Un-Gyo Jung, Hwaseong-si (KR); Glenn A. Adams, Acton, MA (US)

(73) Assignee: Samsung Electronics Co. Ltd., Suwon-si (KR)

( * ) Notice: Subject to any disclaimer, the term of this patent is extended or adjusted under 35 U.S.C. 154(b) by 83 days.

(21) Appl. No.: 12/487,198

(22) Filed: Jun. 18, 2009

(65) Prior Publication Data

US 2009/0322714 A1 Dec. 31, 2009

Related U.S. Application Data

(63) Continuation of application No. PCT/KR2007/006637, filed on Dec. 18, 2007.

(60) Provisional application No. 60/870,471, filed on Dec. 18, 2006, provisional application No. 60/918,894, filed on Mar. 20, 2007, provisional application No. 60/948,038, filed on Jul. 5, 2007, provisional application No. 60/972,846, filed on Sep. 17, 2007, provisional application No. 60/975,906, filed on Sep. 28, 2007.

(51) Int. Cl.

| | |
|---|---|
| ***G09G 5/00*** | (2006.01) |
| ***H04N 9/74*** | (2006.01) |
| ***H04N 5/445*** | (2011.01) |
| ***G06F 3/00*** | (2006.01) |
| ***G06F 13/00*** | (2006.01) |

(52) U.S. Cl. ........... 345/620; 348/588; 348/564; 725/43

(58) Field of Classification Search ........................ None
See application file for complete search history.

(56) References Cited

U.S. PATENT DOCUMENTS

| | | | | |
|---|---|---|---|---|
| 5,289,574 | A * | 2/1994 | Sawyer | 715/759 |
| 2002/0167503 | A1 | 11/2002 | Tsunoda et al. | |
| 2005/0140574 | A1 | 6/2005 | Tamura | |
| 2006/0161948 | A1 | 7/2006 | Hwa | |

FOREIGN PATENT DOCUMENTS

| | | |
|---|---|---|
| CN | 1627765 A | 6/2005 |

(Continued)

OTHER PUBLICATIONS

Morris et al.; Interactive TV Standards, Chapters 5 and 7; Focal Press; Elsevier; May 5, 2005.*

(Continued)

*Primary Examiner* — Kee M Tung
*Assistant Examiner* — Carlos Perromat
(74) *Attorney, Agent, or Firm* — Sughrue Mion, PLLC

(57) ABSTRACT

The present invention performs multiscreen configuration and multiscreen management by using a plurality of screens and a plurality of methods in order to represent a plurality of service contents. In accordance with a multiscreen configuration method of the present invention, by mutually assigning one or more broadcasting services, one or more logical screens, one or more display screens, and one or more output ports, ultimately outputting service contents which are executed on screens assigned by output ports, and setting, changing, and reporting configuration of a multiscreen, the configuration of the multiscreen may be set or reset so as to effectively output various service contents on the multiscreen by using a desired method.

12 Claims, 51 Drawing Sheets

FOREIGN PATENT DOCUMENTS

| | | | |
|---|---|---|---|
| JP | 6-268908 | A | 9/1994 |
| JP | 2003-309780 | A | 10/2003 |
| WO | 2004/093048 | A1 | 10/2004 |

OTHER PUBLICATIONS

Java API; description of classes java.lang.Object and java.awt.Container; dated Aug. 1995; http://www.geom.uiuc.edu/~daeron/docs/apidocs/java.lang.Object.html and http://www.geom.uiuc.edu/~daeron/docs/apidocs/java.awt.Container.html; retrieved Mar. 31, 2011.*

Communication from the State Intellectual Property Office of P.R. China dated Jan. 18, 2011, in Chinese Application No. 200780051478.5.

* cited by examiner

FIG. 11A org.ocap.* org.ocap.ui.MultiScreenConfigurableContext

```
public static final int       CONFIGURABLE_SCREEN_PARAMETER_AUDIO_FOCUS 1
public static final int       CONFIGURABLE_SCREEN_PARAMETER_AUDIO_SOURCE 0
public static final int       CONFIGURABLE_SCREEN_PARAMETER_DEVICE_Z_ORDER 2
public static final int       CONFIGURABLE_SCREEN_PARAMETER_DISPLAY_AREA 3
public static final int       CONFIGURABLE_SCREEN_PARAMETER_DISPLAY_SCREEN 4
public static final int       CONFIGURABLE_SCREEN_PARAMETER_OUTPUT_PORT 5
public static final int       CONFIGURABLE_SCREEN_PARAMETER_SERVICE_CONTEXT 6
public static final int       CONFIGURABLE_SCREEN_PARAMETER_VISIBILITY 7
public static final int       CONFIGURABLE_SCREEN_PARAMETER_Z_ORDER 8
```

FIG. 11B org.ocap.ui.MultiScreenConfiguration

```
public static final java.lang.String SCREEN_CATEGORY_DISPLAY "display"
public static final java.lang.String SCREEN_CATEGORY_GENERAL "general"
public static final java.lang.String SCREEN_CATEGORY_MAIN "main"
public static final java.lang.String SCREEN_CATEGORY_NONE "none"
public static final java.lang.String SCREEN_CATEGORY_OVERLAY "overlay"
public static final java.lang.String SCREEN_CATEGORY_PIP "pip"
public static final java.lang.String SCREEN_CATEGORY_POP "pop"
public static final java.lang.String SCREEN_CONFIGURATION_DISPLAY "display"
public static final java.lang.String SCREEN_CONFIGURATION_GENERAL "general"
public static final java.lang.String SCREEN_CONFIGURATION_NON_PIP "non-pip"
public static final java.lang.String SCREEN_CONFIGURATION_PIP "pip"
public static final java.lang.String SCREEN_CONFIGURATION_POP "pop"
```

FIG. 11C org.ocap.ui.MultiScreenContext

```
public static final int       SCREEN_TYPE_DISPLAY    0
public static final int       SCREEN_TYPE_LOGICAL    1
```

FIG. 11D org.ocap.ui.event.MultiScreenConfigurationEvent

```
public static final int       MULTI_SCREEN_CONFIGURATION_CHANGED 1
public static final int       MULTI_SCREEN_CONFIGURATION_CHANGING 0
public static final int       MULTI_SCREEN_CONFIGURATION_LAST 3
public static final int       MULTI_SCREEN_CONFIGURATION_SCREEN_ADDED 2
public static final int       MULTI_SCREEN_CONFIGURATION_SCREEN_REMOVED 3
```

FIG. 11E org.ocap.ui.event.MultiScreenContextEvent

```
public static final int       MULTI_SCREEN_CONTEXT_AUDIO_FOCUS_CHANGED 41
public static final int       MULTI_SCREEN_CONTEXT_AUDIO_SOURCES_CHANGED 40
public static final int       MULTI_SCREEN_CONTEXT_DEVICES_CHANGED 32
public static final int       MULTI_SCREEN_CONTEXT_DEVICES_Z_ORDER_CHANGED 33
public static final int       MULTI_SCREEN_CONTEXT_DISPLAY_AREA_CHANGED 36
public static final int       MULTI_SCREEN_CONTEXT_DISPLAY_SCREEN_CHANGED 35
public static final int       MULTI_SCREEN_CONTEXT_OUTPUT_PORT_CHANGED 37
public static final int       MULTI_SCREEN_CONTEXT_SERVICE_CONTEXT_CHANGED 34
public static final int       MULTI_SCREEN_CONTEXT_VISIBILITY_CHANGED 38
public static final int       MULTI_SCREEN_CONTEXT_Z_ORDER_CHANGED 39
public static final int       MULTI_SCREEN_CONTEXTS_LAST 41
```

FIG. 11F org.ocap.ui.event.MultiScreenEvent

```
public static final int       MULTI_SCREEN_CONFIGURATION_FIRST 0
public static final int       MULTI_SCREEN_CONTEXT_FIRST 32
```

FIG. 11G org.ocap.ui.event.MultiScreenResourceEvent

```
public static final int       MULTI_SCREEN_RESOURCE_SCREEN_RELEASED 0
public static final int       MULTI_SCREEN_RESOURCE_SCREEN_RESERVED 0
```

FIG. 13A org.ocap.ui

Interface MultiScreenConfigurableContext

All Superinterfaces:

MultiScreenContext, org.davic.resources.ResourceProxy

```
public interface MultiScreenConfigurableContext
extends MultiScreenContext, org.davic.resources.ResourceProxy
```

FIG. 13B

Field — 1300

```
static int CONFIGURABLE_SCREEN_PARAMETER_AUDIO_FOCUS        — 1302
static int CONFIGURABLE_SCREEN_PARAMETER_AUDIO_SOURCE       — 1304
static int CONFIGURABLE_SCREEN_PARAMETER_DEVICE_Z_ORDER     — 1306
static int CONFIGURABLE_SCREEN_PARAMETER_DISPLAY_AREA       — 1308
static int CONFIGURABLE_SCREEN_PARAMETER_DISPLAY_SCREEN     — 1310
static int CONFIGURABLE_SCREEN_PARAMETER_OUTPUT_PORT        — 1312
static int CONFIGURABLE_SCREEN_PARAMETER_SERVICE_CONTEXT    — 1314
static int CONFIGURABLE_SCREEN_PARAMETER_VISIBILITY         — 1316
static int CONFIGURABLE_SCREEN_PARAMETER_Z_ORDER            — 1318
```

Fields inherited from interface org.ocap.ui.MultiScreenContext — 1320

```
SCREEN_TYPE_DISPLAY, SCREEN_TYPE_LOGICAL
```

FIG. 13C

```
MultiScreenConfigurableContext msxx = (MultiScreenConfigurableContext)
HScreen.getDefaultHScreen();
Cbject[] values =
msxx.getDiscreteParameterSpace(CONFIGURABLE_SCREEN_PARAMETER_DEVICE_Z_ORDER);
ASSERT ( values != null );
ASSERT ( values instanceof HScreenDevice[][] );
ASSERT ( values.length == 2 );
HScreenDevice[] order1 = (HScreenDevice[]) values[0];            ┐
ASSERT ( order1 != null );                                       │
ASSERT ( order1.length == 4 );                                   │
ASSERT ( order1[0] instanceof HBackgroundDevice );               │
ASSERT ( order1[1] instanceof HVideoDevice );                    ├ 1330
ASSERT ( order1[2] instanceof HGraphicsDevice );                 │
ASSERT ( order1[2].getIDstring().equals ( "G1" ) );              │
ASSERT ( order1[3] instanceof HGraphicsDevice );                 │
ASSERT ( order1[2].getIDstring().equals ( "G2" ) );              ┘
HScreenDevice[] order2 - (HScreenDevice[]) values[1];            ┐
ASSERT ( order2 != null );                                       │
ASSERT ( order2.length == 4 );                                   │
ASSERT ( order2[0] instanceof HBackgroundDevice );               │
ASSERT ( order2[1] instanceof HVideoDevice );                    ├ 1340
ASSERT ( order2[2] instanceof HGraphicsDevice );                 │
ASSERT ( order2[2].getIDstring().equals ( "G2" ) );              │
ASSERT ( order2[3] instanceof HGraphicsDevice );                 │
ASSERT ( order2[2].getIDstring().equals ( "G1" ) );              ┘
```

FIG. 13D

Method(1) — 1350 void addAudioSources(org.havi.ui.HScreenDevice[] devices, boolean mixWithAudioFocus) — 1352 void addOutputPorts(org.ocap.hardware.VideoOutputPort[] ports, boolean removeExisting) — 1354 void addServiceContexts(javax.tv.service.selection.ServiceContext[] contexts, boolean associateDefaultDevices) — 1356 void assignAudioFocus() — 1358

Boolean checkServiceContextCompatibility(javax.tv.service.selection.ServiceContext context) — 1360 org.davic.resources.ResourceClient getClient() — 1362 java.lang.Object[] getDiscreteParameterSpace(int parameter) — 1364 boolean hasDiscreteParameterSpace(int parameter) — 1366 boolean isConfigurableParameter(int parameter) — 1368 void releaseScreen() — 1370

FIG. 13E

Method(2)

void removeAudioSources(org.havi.ui.HScreenDevice[] devices) — 1372 void removeOutputPorts(org.ocap.hardware.VideoOutputPort[] ports) — 1374 void removeServiceContexts(javax.tv.service.selection.ServiceContext[] contexts) — 1376 void requestMultiScreenConfigurationChange(MultiScreenConfiguration configuration,java.util.Dictionary serviceContextAssociations) — 1378 boolean reserveScreen(org.davic.resources.ResourceClient client, java.lang.Object requestData) — 1380 void setDisplayArea(org.havi.ui.HScreenRectangle rect) — 1382 void setDisplayScreen(org.havi.ui.HScreen screen) — 1384 void setMultiScreenConfiguration(MultiScreenConfiguration configuration, java.util.Dictionary serviceContextAssociations) — 1386 void setVisible(boolean visible) — 1388 void setZOrder(org.havi.ui.HScreenDevice[] devices) — 1390 void setZOrder(int order) — 1392

FIG. 13F

Methods inherited from interface org.ocap.ui.MultiScreenContext — 1394

```
addMultiScreenConfigurationListener, addScreenContextListener,
getAudioFocus,
getAudioSources, getDisplayArea, getDisplayScreen, getID,
getMultiScreenConfiguration, getMultiScreenConfigurations,
getMultiScreenConfigurations, getOutputPorts, getScreenCategory,
getScreenType, getServiceContexts, getVisible, getZOrder, getZOrder,
removeMultiScreenConfigurationListener, removeScreenContextListener
```

FIG. 14A org.ocap.ui

Interface MultiScreenConfiguration

```
public interface MultiScreenConfiguration
```

FIG. 14B

Field — 1400

| | | |
|---|---|---|
| static java.lang.String | **SCREEN_CATEGORY_DISPLAY** | — 1402 |
| static java.lang.String | **SCREEN_CATEGORY_GENERAL** | — 1404 |
| static java.lang.String | **SCREEN_CATEGORY_MAIN** | — 1406 |
| static java.lang.String | **SCREEN_CATEGORY_NONE** | — 1408 |
| static java.lang.String | **SCREEN_CATEGORY_OVERLAY** | — 1410 |
| static java.lang.String | **SCREEN_CATEGORY_PIP** | — 1412 |
| static java.lang.String | **SCREEN_CATEGORY_POP** | — 1414 |
| static java.lang.String | **SCREEN_CONFIGURATION_DISPLAY** | — 1416 |
| static java.lang.String | **SCREEN_CONFIGURATION_GENERAL** | — 1418 |
| static java.lang.String | **SCREEN_CONFIGURATION_NON_PIP** | — 1420 |
| static java.lang.String | **SCREEN_CONFIGURATION_PIP** | — 1422 |
| static java.lang.String | **SCREEN_CONFIGURATION_POP** | — 1424 |

FIG. 14C

Method — 1450 java.lang.String getConfigurationType() — 1452 org.havi.ui.HScreen getDefaultServiceContextScreen() — 1454 org.havi.ui.HScreen[] getScreens() — 1456 org.havi.ui.HScreen[] getScreens(java.lang.String category) — 1458 boolean hasOverlayScreen() — 1460 boolean isScreenInConfiguration(org.havi.ui.HScreen screen) — 1462 void setDefaultServiceContextScreen — 1464

FIG. 15A org.ocap.ui

Interface MultiScreenContext

All Known Subinterfaces:

MultiScreenConfigurableContext public interface MultiScreenContext

FIG. 15B

Field — 1500 static int SCREEN_TYPE_DISPLAY — 1502 static int SCREEN_TYPE_LOGICAL — 1504

FIG. 15C

Method(1) — 1550 void
addMultiScreenConfigurationListener(MultiScreenConfigurationListener
listener) — 1552
void addScreenContextListener(MultiScreenContextListener listener) — 1554
org.havi.ui.HScreen getAudioFocus() — 1556
org.havi.ui.HScreenDevice[] getAudioSources() — 1558
org.havi.ui.HScreenRectangle getDisplayArea() — 1560
org.havi.ui.HScreen getDisplayScreen() — 1562
java.lang.String getID() — 1564
MultiScreenConfiguration getMultiScreenConfiguration() — 1566
MultiScreenConfiguration[] getMultiScreenConfigurations() — 1568
MultiScreenConfiguration[]
getMultiScreenConfigurations(java.lang.String screenConfigurationType) — 1570

FIG. 15D

Method(2)

org.ocap.hardware.VideoOutputPort[] getOutputPorts() — 1572
java.lang.String getScreenCategory() — 1574
int getScreenType() — 1576
javax.tv.service.selection.ServiceContext[] getServiceContexts() — 1578
boolean getVisible() — 1580
int getZOrder() — 1582
int getZOrder(org.havi.ui.HScreenDevice device) — 1584
void
removeMultiScreenConfigurationListener(MultiScreenConfigurationListene
r listener) — 1586
void removeScreenContextListener(MultiScreenContextListener listener) — 1588

FIG. 16A org.ocap.ui

Class MultiScreenManager

```
java.lang.Object
  └org.ocap.ui.MultiScreenManager
```

All Implemented Interfaces:

org.davic.resources.ResourceServer

```
public abstract class MultiScreenManager
extends java.lang.Object
implements org.davic.resources.ResourceServer
```

FIG. 16B

Constructor — 1600 protected MultiScreenManager() — 1602

FIG. 16C

Method(1) — 1630 void addMultiScreenConfigurationListener(MultiScreenConfigurationListener listener) — 1632 void addPlayerScreenDevices(javax.media.Player player, org.havi.ui.HScreenDevice[] devices) — 1634 void addResourceStatusListener(org.davic.resources.ResourceStatusListener listener) — 1636 org.havi.ui.HScreen[] findScreens(javax.tv.service.selection.ServiceContext context) — 1638 org.havi.ui.HScreen[] getCompatibleScreens(org.ocap.hardware.VideoOutputPort port) — 1640 org.havi.ui.HScreen getDefaultScreen() — 1642 org.havi.ui.HScreen getEmptyScreen() — 1644 static MultiScreenManager getInstance() — 1646

FIG. 16D

Method(2)

MultiScreenConfiguration getMultiScreenConfiguration() — 1648

MultiScreenConfiguration
getMultiScreenConfiguration(org.havi.ui.HScreen screen) — 1650

MultiScreenConfiguration[] getMultiScreenConfigurations() — 1652

MultiScreenConfiguration[]
getMultiScreenConfigurations(java.lang.String screenConfigurationType) — 1654 org.havi.ui.HScreen
getOutputPortScreen(org.ocap.hardware.VideoOutputPort port) — 1656 org.havi.ui.HScreenDevice[] getPlayerScreenDevices(javax.media.Player player) — 1658 org.havi.ui.HScreen[] getScreens() — 1660 boolean isEmptyScreen(org.havi.ui.HScreen screen) — 1662 boolean isEmptyScreenDevice(org.havi.ui.HScreenDevice device) — 1664 void moveServiceContexts(org.havi.ui.HScreen src, org.havi.ui.HScreen dst, javax.tv.service.selection.ServiceContext[] contexts) — 1666 void
removeMultiScreenConfigurationListener(MultiScreenConfigurationListener listener) — 1668 void removePlayerScreenDevices(javax.media.Player player, org.havi.ui.HScreenDevice[] devices) — 1670

FIG. 16E

Method(3)

void removeResourceStatusListener(org.davic.resources.ResourceStatusListener listener) — 1672 void requestMultiScreenConfigurationChange(MultiScreenConfiguration configuration, java.util.Dictionary serviceContextAssociations) — 1674 boolean sameResources(org.havi.ui.HScreenDevice device1, org.havi.ui.HScreenDevice device2) — 1676 boolean sameResources(org.havi.ui.HScreen screen1, org.havi.ui.HScreen screen2) — 1678 boolean sameResources(javax.tv.service.selection.ServiceContext sc1, javax.tv.service.selection.ServiceContext sc2) — 1680 void setMultiScreenConfiguration(MultiScreenConfiguration configuration, java.util.Dictionary serviceContextAssociations) — 1682 void swapServiceContexts(org.havi.ui.HScreen screen1, org.havi.ui.HScreen screen2, javax.tv.service.selection.ServiceContext[] exclusions) — 1684

FIG. 16F

Methods inherited from class java.lang.Object — 1690 clone, equals, finalize, getClass, hashCode, notify, notifyAll, toString, wait, wait, wait

Methods inherited from interface org.davic.resources.ResourceServer — 1695 addResourceStatusEventListener, removeResourceStatusEventListener

FIG. 17

Package org.ocap.ui.event

Interface Summary — 1700

MultiScreenConfigurationListener — 1702
MultiScreenContextListener — 1704

Class — 1710

MultiScreenConfigurationEvent — 1712
MultiScreenContextEvent — 1714
MultiScreenEvent — 1716
MultiScreenResourceEvent — 1718

FIG. 18A org.ocap.ui.event
Class MultiScreenConfigurationEvent

```
java.lang.Object
  └java.util.EventObject
      └org.ocap.ui.event.MultiScreenEvent
          └org.ocap.ui.event.MultiScreenConfigurationEvent
```

All Implemented Interfaces:

java.io.Serializable

```
public class MultiScreenConfigurationEvent
extends MultiScreenEvent
```

FIG. 18B

Field — 1800

```
static int MULTI_SCREEN_CONFIGURATION_CHANGED — 1802
static int MULTI_SCREEN_CONFIGURATION_CHANGING — 1804
static int MULTI_SCREEN_CONFIGURATION_LAST — 1806
static int MULTI_SCREEN_CONFIGURATION_SCREEN_ADDED — 1808
static int MULTI_SCREEN_CONFIGURATION_SCREEN_REMOVED — 1810
```

Fields inherited from class org.ocap.ui.event.MultiScreenEvent — 1820

MULTI_SCREEN_CONFIGURATION_FIRST, MULTI_SCREEN_CONTEXT_FIRST

Fields inherited from class java.util.EventObject — 1825 source

FIG. 18C

Constructor — 1830

MultiScreenConfigurationEvent(java.lang.Object source, int id, java.lang.Object related) — 1832

FIG. 18D

Method — 1840 java.lang.Object getRelated() — 1842

Methods inherited from class org.ocap.ui.event.MultiScreenEvent — 1850 getId

Methods inherited from class java.util.EventObject — 1852 getSource, toString

Methods inherited from class java.lang.Object — 1854 clone, equals, finalize, getClass, hashCode, notify, notifyAll, wait, wait, wait

FIG. 19A org.ocap.ui.event

Interface MultiScreenConfigurationListener

All Superinterfaces:

java.util.EventListener

```
public interface MultiScreenConfigurationListener
extends java.util.EventListener
```

FIG. 19B

Method — 1900

```
void notify(MultiScreenConfigurationEvent evt) — 1910
```

FIG. 20A org.ocap.ui.event

Class MultiScreenContextEvent

```
java.lang.Object
  └java.util.EventObject
      └ org.ocap.ui.event.MultiScreenEvent
          └ org.ocap.ui.event.MultiScreenContextEvent
```

All Implemented Interfaces:

java.io.Serializable

```
public class MultiScreenContextEvent
extends MultiScreenEvent
```

FIG. 20B

Field — 2000 static int MULTI_SCREEN_CONTEXT_AUDIO_FOCUS_CHANGED — 2002 static int MULTI_SCREEN_CONTEXT_AUDIO_SOURCES_CHANGED — 2004 static int MULTI_SCREEN_CONTEXT_DEVICES_CHANGED — 2006 static int MULTI_SCREEN_CONTEXT_DEVICES_Z_ORDER_CHANGED — 2008 static int MULTI_SCREEN_CONTEXT_DISPLAY_AREA_CHANGED — 2010 static int MULTI_SCREEN_CONTEXT_DISPLAY_SCREEN_CHANGED — 2012 static int MULTI_SCREEN_CONTEXT_OUTPUT_PORT_CHANGED — 2014 static int MULTI_SCREEN_CONTEXT_SERVICE_CONTEXT_CHANGED — 2016 static int MULTI_SCREEN_CONTEXT_VISIBILITY_CHANGED — 2018 static int MULTI_SCREEN_CONTEXT_Z_ORDER_CHANGED — 2020 static int MULTI_SCREEN_CONTEXTS_LAST — 2022

Fields inherited from class org.ocap.ui.event.MultiScreenEvent — 2030

MULTI_SCREEN_CONFIGURATION_FIRST, MULTI_SCREEN_CONTEXT_FIRST

Fields inherited from class java.util.EventObject — 2035

Scurce

FIG. 20C

Constructor — 2040

MultiScreenContextEvent(java.lang.Object source, int id) — 2042

FIG. 20D

Method — 2050

Methods inherited from class org.ocap.ui.event.MultiScreenEvent — 2052 getId

Methods inherited from class java.util.EventObject — 2054 getSource, toString

Methods inherited from class java.lang.Object — 2056 clone, equals, finalize, getClass, hashCode, notify, notifyAll, wait, wait, wait

FIG. 21A org.ocap.ui.event

Interface MultiScreenContextListener

All Superinterfaces:

java.util.EventListener

```
public interface MultiScreenContextListener
extends java.util.EventListener
```

FIG. 21B

Method — 2100

```
void notify(MultiScreenContextEvent evt) — 2102
```

FIG. 22A org.ocap.ui.event

Class MultiScreenEvent

```
java.lang.Object
  └─java.util.EventObject
      └─org.ocap.ui.event.MultiScreenEvent
```

All Implemented Interfaces:

java.io.Serializable

Direct Known Subclasses:

MultiScreenConfigurationEvent, MultiScreenContextEvent

```
public abstract class MultiScreenEvent
extends java.util.EventObject
```

FIG. 22B

Field — 2200 static int MULTI_SCREEN_CONFIGURATION_FIRST — 2202 static int MULTI_SCREEN_CONTEXT_FIRST — 204

Fields inherited from class java.util.EventObject — 2210 source

FIG. 22C

Constructor — 2220 protected MultiScreenEvent(java.lang.Object source, int id) — 2222

FIG. 22D

Method — 2230 int getId() — 2232

Methods inherited from class java.util.EventObject — 2240 getSource, toString

Methods inherited from class java.lang.Object — 2245 clone, equals, finalize, getClass, hashCode, notify, notifyAll, wait, wait, wait

FIG. 23A org.ocap.ui.event

Class MultiScreenResourceEvent java.lang.Object
    └ java.util.EventObject
        └ org.davic.resources.ResourceStatusEvent
            └ org.ocap.ui.event.MultiScreenResourceEvent

All Implemented Interfaces:
    java.io.Serializable public class MultiScreenResourceEvent
extends org.davic.resources.ResourceStatusEvent

FIG. 23B

Field — 2300 static int MULTI_SCREEN_RESOURCE_SCREEN_RELEASED — 2302
static int MULTI_SCREEN_RESOURCE_SCREEN_RESERVED — 2304

Fields inherited from class java.util.EventObject — 2310
Source

FIG. 23C

Constructor — 2320

MultiScreenResourceEvent(java.lang.Object source, int id) — 2322

FIG. 23D

Method — 2330

```
int getId()  — 2332
java.lang.Object getSource()  — 2334
```

Methods inherited from class java.util.EventObject — 2340
```
toString
```

Methods inherited from class java.lang.Object — 2345
```
clone, equals, finalize, getClass, hashCode, notify, notifyAll, wait,
wait, wait
```

FIG. 24A

```
static void verifyConstraints()
{
        MultiScreenManager MSM = MultiScreenManager.getInstance();
        verifyInvariantConstraints();  — 2410
        HScreen S1 = MSM.getDefaultScreen();  — 2420
        HBackgroundDevice B1 = S1.getDefaultHBackgroundDevice();
        HScreenConfiguration BC1 = null;
        HScreenRectangle B1SR = null;
        Dimension B1PR = null;
        Dimension B1PAR = null;
        if ( B1 != null ) {                                              } 2430
              BC1 = B1.getCurrentConfiguration();
              B1SR = BC1.getScreenArea();
              B1PR = BC1.getPixelResolution();
              B1PAR = BC1.getPixelAspectRatio();
        }
        //continue
```

FIG. 24B

```
//continue
HVideoDevice V1 = S1.getDefaultHVideoDevice();
HScreenConfiguration VC1 = null;
HScreenRectangle V1SR = null;
Dimension V1PR = null;
Dimension V1PAR = null;
if ( V1 != null ) {
        VC1 = V1.getCurrentConfiguration();
        V1SR = VC1.getScreenArea();
        V1PR = VC1.getPixelResolution();
        V1PAR = VC1.getPixelAspectRatio();
}
HGraphicsDevice G1 = S1.getDefaultHGraphicsDevice();
HScreenConfiguration GC1 = null;
HScreenRectangle G1SR = null;
Dimension G1PR = null;
Dimension G1PAR = null;
if ( G1 != null ) {
        GC1 = G1.getCurrentConfiguration();
        G1SR = GC1.getScreenArea();
        G1PR = GC1.getPixelResolution();
        G1PAR = GC1.getPixelAspectRatio();
}
//continue
```

```
//continue
HScreen[] SX1ND = getNonDefaultScreens(); — 2460
HScreenDevice[] DX1ND = getNonDefaultScreenDevices(); — 2470
MultiScreenConfiguration[] MSCX1 = MSM.getMultiScreenConfigurations();
MultiScreenConfiguration MSC1 = MSM.getMultiScreenConfiguration();
MultiScreenConfiguration MSC2 = null;
for ( int i = 0; ( MSC2 == null ) && ( i < MSCX1.length ); i++ ) {
        if ( MSCX1[i] != MSC1 )
                MSC2 = MSCX1[i];
}

ASSERT ( MSC2 != null );
ASSERT ( MSC2 != MSC1 );
//continue
```

```
//continue
try {
        MSM.setMultiScreenConfiguration ( MSC2, null );
        waitForMultiScreenConfigurationChangingEvent();
        waitForMultiScreenConfigurationChangedEvent();
} catch ( SecurityException x ) {
        ASSERT ( false );
}
. . . . .
```

```
. . . .
verifyInvariantConstraints(); — 2500
ASSERT ( MSM.getMultiScreenConfiguration() == MSC2 ); — 2505
HScreen S2 = MSM.getDefaultScreen();  } 2510
ASSERT ( S2 == S1 );                  }
HBackgroundDevice B2 = S2.getDefaultHBackgroundDevice();  }
if ( B1 != null ) {                                       }
        if ( B2 == null )                                 }
               ASSERT ( MSM.isEmptyScreenDevice ( B1 ) ); } 2515
        else                                              }
               ASSERT ( B2 == B1 );                       }
}                                                         }
//continue
```

FIG. 25B

```
//continue
if ( B1 != null ) {
        if ( B2 != null ) {
                HScreenConfiguration BC2 = B1.getCurrentConfiguration();
                HScreenRectangle B2SR = BC2.getScreenArea();
                ASSERT ( B1SR != null );
                ASSERT ( B2SR != null );
                ASSERT ( B2SR.x == B1SR.x );
                ASSERT ( B2SR.y == B1SR.y );
                ASSERT ( B2SR.width == B1SR.width );
                ASSERT ( B2SR.height == B1SR.height );
                Dimension B2PR = BC2.getPixelResolution();
                ASSERT ( B1PR != null );
                ASSERT ( B2PR != null );
                ASSERT ( B2PR.width == B1PR.width );
                ASSERT ( B2PR.height == B1PR.height );
                Dimension B2PAR = BC2.getPixelAspectRatio();
                ASSERT ( B1PAR != null );
                ASSERT ( B2PAR != null );
                ASSERT ( B2PAR.width == B1PAR.width );
                ASSERT ( B2PAR.height == B1PAR.height );
        }
}
//continue
```

```
//continue
HVideoDevice V2 = S2.getDefaultHVideoDevice();
if ( V1 != null ) {
        if ( V2 == null )
                ASSERT ( MSM.isEmptyScreenDevice ( V1 ) );
        else
                ASSERT ( V2 == V1 );
}
```

2525

```
if ( V1 != null ) {
        if ( V2 != null ) {
                HScreenConfiguration VC2 = V1.getCurrentConfiguration();
                HScreenRectangle V2SR = VC2.getScreenArea();
                ASSERT ( V1SR != null );
                ASSERT ( V2SR != null );
                ASSERT ( V2SR.x == V1SR.x );
                ASSERT ( V2SR.y == V1SR.y );
                ASSERT ( V2SR.width == V1SR.width );
                ASSERT ( V2SR.height == V1SR.height );
                Dimension V2PR = VC2.getPixelResolution();
                ASSERT ( V1PR != null );
                ASSERT ( V2PR != null );
                ASSERT ( V2PR.width == V1PR.width );
                ASSERT ( V2PR.height == V1PR.height );
                Dimension V2PAR = VC2.getPixelAspectRatio();
                ASSERT ( V1PAR != null );
                ASSERT ( V2PAR != null );
                ASSERT ( V2PAR.width == V1PAR.width );
                ASSERT ( V2PAR.height == V1PAR.height );
        }
}
//continue
```

```
//continue
HGraphicsDevice G2 = S2.getDefaultHGraphicsDevice();
if ( G1 != null ) {
        if ( G2 == null )
                ASSERT ( MSM.isEmptyScreenDevice ( G1 ) );
        else
                ASSERT ( G2 == G1 );
}
```
2535

```
if ( G1 != null ) {
        if ( G2 != null ) {
                HScreenConfiguration GC2 = G1.getCurrentConfiguration();
                HScreenRectangle G2SR = GC2.getScreenArea();
                ASSERT ( G1SR != null );
                ASSERT ( G2SR != null );
                ASSERT ( G2SR.x == G1SR.x );
                ASSERT ( G2SR.y == G1SR.y );
                ASSERT ( G2SR.width == G1SR.width );
                ASSERT ( G2SR.height == G1SR.height );
                Dimension G2PR = GC2.getPixelResolution();
                ASSERT ( G1PR != null );
                ASSERT ( G2PR != null );
                ASSERT ( G2PR.width == G1PR.width );
                ASSERT ( G2PR.height == G1PR.height );
                Dimension G2PAR = GC2.getPixelAspectRatio();
                ASSERT ( G1PAR != null );
                ASSERT ( G2PAR != null );
                ASSERT ( G2PAR.width == G1PAR.width );
                ASSERT ( G2PAR.height == G1PAR.height );
        }
}
//continue
```
2540

FIG. 25E

```
//continue
HScreen[] SX2ND = getNonDefaultScreens();
for ( int i = 0, j; i < SX1ND.length; i++ ) {
        HScreen S = SX1ND[i];
        for ( j = 0; j < SX2ND.length; i++ ) {
                if ( S == SX2ND[j] )
                        break;
        }
        if ( j == SX2ND.length )ASSERT ( MSM.isEmptyScreen ( S ) );
        else
                ASSERT ( ! MSM.isEmptyScreen ( S ) );
}
```

2545

```
HScreenDevice[] DX2ND = getNonDefaultScreenDevices();
for ( int i = 0, j; i < DX1ND.length; i++ ) {
        HScreenDevice D = DX1ND[i];
        for ( j = 0; j < DX2ND.length; i++ ) {
                if ( D == DX2ND[j] )
                        break;
        }
        if ( j == DX2ND.length )
                ASSERT ( MSM.isEmptyScreenDevice ( D ) );
        else
                ASSERT ( ! MSM.isEmptyScreenDevice ( D ) );
}
}
```

```
static private void verifyInvariantConstraints()
{
        int found;
        MultiScreenManager MSM = MultiScreenManager.getInstance();        } 2605
        ASSERT ( MSM != null );

        MultiScreenConfiguration MSC = MSM.getMultiScreenConfiguration();  } 2610
        ASSERT ( MSC != null );

        MultiScreenConfiguration[] MSCX = MSM.getMultiScreenConfigurations(); } 2615
        ASSERT ( MSCX != null );
        ASSERT ( MSCX.length > 0 );

        found = 0;                                                          } 2620
        for ( int i = 0; i < MSCX.length; i++ ) {
                ASSERT ( MSCX[i] != null );
                if ( MSCX[i] == MSC ) {
                        found++;
                }
        }
        ASSERT ( found == 1 );
        //continue
```

FIG. 26B

```
//continue
HScreen[] MSCSX = MSC.getScreens();
ASSERT ( MSCSX != null );
ASSERT ( MSCSX.length > 0 );                                    2625

for ( int i = 0; i < MSCSX.length; i++ ) {
        ASSERT ( ! MSM.isEmptyScreen ( MSCSX[i] ) );            2630
}

for( int i = 0; i < MSCSX.length; i++ ) {
        for ( int j = 0; j < MSCSX.length; j++ ) {
                if ( i != j ) {
                        ASSERT ( MSCSX[i] != null );
                        ASSERT ( MSCSX[j] != null );            2635
                        ASSERT ( ! MSM.sameResources ( MSCSX[i],
                MSCSX[j] ) );
                }
        }
}
//continue
```

FIG. 26C

```
//continue
HScreen MSMS0 = MSM.getDefaultScreen();       } 2640
ASSERT ( MSMS0 != null );

ASSERT ( ! MSM.isEmptyScreen ( MSMS0 ) ); —2645

found = 0;                                                     } 2650
for ( int i = 0; i < MSCSX.length; i++ ) {
        if ( MSM.sameResources ( MSCSX[i], MSMS0 ) )
                found++;
}
ASSERT ( found == 1 );

HScreen[] MSMSX = MSM.getScreens();                            } 2655
ASSERT ( MSMSX != null );
ASSERT ( MSMSX.length > 0 );

found = 0;                                                     } 2660
for ( int i = 0; i < MSMSX.length; i++ ) {
        ASSERT ( MSMSX[i] != null );
        if ( MSMSX[i] == MSMS0 ) {
                found++;
        }
}
ASSERT ( found == 1 );
//continue
```

FIG. 26D

```
//continue
HBackgroundDevice[] BX = MSMS0.getHBackgroundDevices();
if ( BX != null ) {
        for ( int i = 0; i < BX.length; i++ ) {
                ASSERT ( BX[i] != null );
                ASSERT ( ! MSM.isEmptyScreenDevice ( BX[i] ) );
        }
}

HVideoDevice[] VX = MSMS0.getHVideoDevices();
if ( VX != null ) {
        for ( int i = 0; i < VX.length; i++ ) {
                ASSERT ( VX[i] != null );
                ASSERT ( ! MSM.isEmptyScreenDevice ( VX[i] ) );
        }
}

HGraphicsDevice[] GX = MSMS0.getHGraphicsDevices();
if ( GX != null ) {
        for ( int i = 0; i < GX.length; i++ ) {
                ASSERT ( GX[i] != null );
                ASSERT ( ! MSM.isEmptyScreenDevice ( GX[i] ) );
        }
}
}
```

2665 (first block), 2670 (second block), 2675 (third block)

FIG. 27

```
static private HScreen[] getNonDefaultScreens()
{
        MultiScreenManager MSM = MultiScreenManager.getInstance();
        HScreen[] SX1 = MSM.getScreens();
        HScreen S1 = MSM.getDefaultScreen();
        int NSX1ND = 0;
        for ( int i = 0; i < SX1.length; i++ ) {
                if ( ! MSM.sameResources ( SX1[i], S1 ) )
                        NSX1ND++;
        }
        HScreen[] SX1ND = new HScreen[NSX1ND];
        for ( int i = 0, n = 0; i < SX1.length; i++ ) {
                if ( ! MSM.sameResources ( SX1[i], S1 ) )
                        SX1ND[n++] = SX1[i];
        }
        return SX1ND;
}
        //continue
```

FIG. 28A

```
//continue
static private HScreenDevice[] getNonDefaultScreenDevices()
{
        MultiScreenManager MSM = MultiScreenManager.getInstance();
        HScreen[] SX1 = MSM.getScreens();
        Int NDX1ND = 0;
        for ( int i = 0; i < SX1.length; i++ ) {
                HScreenDevice[] BX1 = SX1[i].getHBackgroundDevices();
                HScreenDevice B1 = SX1[i].getDefaultHBackgroundDevice();
                for ( int j = 0; i < BX1.length; j++ ) {
                        if ( ! MSM.sameResources ( BX1[i], B1 ) )
                                NDX1ND++;
                }
                HScreenDevice[] VX1 = SX1[i].getHVideoDevices();
                HScreenDevice V1 = SX1[i].getDefaultHVideoDevice();
                for ( int j = 0; i < VX1.length; j++ ) {
                        if ( ! MSM.sameResources ( VX1[i], V1 ) )
                                NDX1ND++;
                }
                HScreenDevice[] GX1 = SX1[i].getHGraphicsDevices();
                HScreenDevice G1 = SX1[i].getDefaultHGraphicsDevice();
                for ( int j = 0; i < GX1.length; j++ ) {
                        if ( ! MSM.sameResources ( GX1[i], G1 ) )
                                NDX1ND++;
                }
        }
//continue
```

```
//continue
        HScreenDevice[] DX1ND = new HScreenDevice[NDX1ND];
        for ( int i = 0, n = 0; i < SX1.length; i++ ) {
                HScreenDevice[] BX1 = SX1[i].getHBackgroundDevices();
                HScreenDevice B1 = SX1[i].getDefaultHBackgroundDevice();
                for ( int j = 0; i < BX1.length; j++ ) {
                        if ( ! MSM.sameResources ( BX1[i], B1 ) )
                                DX1ND[n++] = BX1[i];
                }
                HScreenDevice[] VX1 = SX1[i].getHVideoDevices();
                HScreenDevice V1 = SX1[i].getDefaultHVideoDevice();
                for ( int j = 0; i < VX1.length; j++ ) {
                        if ( ! MSM.sameResources ( VX1[i], V1 ) )
                                DX1ND[n++] = VX1[i];
                }
                HScreenDevice[] GX1 = SX1[i].getHGraphicsDevices();
                HScreenDevice G1 = SX1[i].getDefaultHGraphicsDevice();
                for ( int j = 0; i < GX1.length; j++ ) {
                        if ( ! MSM.sameResources ( GX1[i], G1 ) )
                                DX1ND[n++] = GX1[i];
                }
        }
        return DX1ND;
}
```

```
static private void waitForMultiScreenConfigurationChangingEvent()   ⎫
{                                                                    ⎬ 2910
}                                                                    ⎭
static private void waitForMultiScreenConfigurationChangedEvent()    ⎫
{                                                                    ⎬ 2920
}                                                                    ⎭
static private void ASSERT ( boolean condition )                     ⎫
{                                                                    ⎬ 2930
}                                                                    ⎭
```

FIG. 30A

```
...
AppID appid = new AppID(0x1234, 0xABCD); —3010
appMgrProxy.unregisterUnboundApp(appid);
...
Permission appsControlPermission = new AppsControlPermission();
AppId denyAppsControlPermissionAppId = new AppId(1, 2); —3015
...
import org.dvb.application.AppID; —3020
boolean badOne = af.accept(new AppID(0x30, 0x10)); —3025
boolean goodOne = af.accept(new AppID(0x30, 0x30)); —3030
...
```

FIG. 30B

```
...
AppID appid = new OcapAppID(0x1234, 0xABCD); —— 3050
appMgrProxy.unregisterUnboundApp(appid);
...
Permission appsControlPermission = new AppsControlPermission();
AppId denyAppsControlPermissionAppId = new OcapAppId(1, 2); —— 3055
...
import org.ocap.application.OcapAppID; —— 3060
boolean badOne = af.accept(new OcapAppID(0x30, 0x10)); —— 3065
boolean goodOne = af.accept(new OcapAppID(0x30, 0x30)); —— 3070
...
```

FIG. 31

```
package org.ocap.application;

import javax.tv.service.selection.ServiceContext;

public class OcapAppID extends org.dvb.application.AppID —— 3110
{
    public OcapAppID ( int oid, int aid ) —— 3120
    {
        this ( oid, aid, null );
    }

    public OcapAppID ( int oid, int aid, ServiceContext context ) —— 3130
    {
        super ( oid, aid );
    }

    public ServiceContext getServiceContext() —— 3140
    {
        return null;
    }
}
```

FIG. 32A

```
package org.ocap.ui;

import org.ocap.application.OcapAppAttributes;
import org.havi.ui.HScreenRectangle;

public interface HSceneBinding
{
    public HScreenRectangle getRectangle();

    public OcapAppAttributes getAppAttributes();
}
```

FIG. 32B

```
package org.ocap.ui;

import org.ocap.application.OcapAppAttributes;
import org.havi.ui.HGraphicsDevice; — 3250
import org.havi.ui.HScreenRectangle;

public interface HSceneBinding — 3260
{
    public HScreenRectangle getRectangle(); — 3270

    public OcapAppAttributes getAppAttributes(); — 3280

    public HGraphicsDevice getGraphicsDevice(); — 3290
}
```

FIG. 33A

```
package org.ocap.ui;

import org.havi.ui.HScreenRectangle;


public interface HSceneChangeRequestHandler
{
   public boolean testShow( HSceneBinding newScene,
                            HSceneBinding oldScenes[]); —— 3310

   public boolean testMove( HSceneBinding move, HSceneBinding
currentScenes[]);

   public boolean testOrder( HSceneBinding currentScenes[],
int currentOrder, int newOrder); —— 3320
}
```

FIG. 33B

```
package org.ocap.ui;

import org.havi.ui.HScreenRectangle; —— 3330

public interface HSceneChangeRequestHandler
{
   public boolean testMove ( HSceneBinding move, HSceneBinding —— 3340
   currentScenes[] );

   public HSceneBinding[] testOrder ( HSceneBinding reorder,
   HSceneBinding currentScenes[], int currentOrder, int newOrder ); —— 3350

   public boolean testFocusChange ( HSceneBinding newScene, HSceneBinding
   oldScene ); —— 3360

   public void focusChanged ( HSceneBinding newScene, HSceneBinding
   oldScene ); —— 3370
}
```

FIG. 34A

```
package org.ocap.ui;

import org.ocap.application.OcapAppAttributes;

public abstract class HSceneManager
{
    protected HSceneManager()
    {
    }

    public static HSceneManager getInstance()
    {
        return null;
    }

    public void setHSceneChangeRequestHandler
    (HSceneChangeRequestHandler handler)
    {
    }

    public static OcapAppAttributes [] getHSceneOrder() — 3410
    {
        return null;
    }

    public int getAppHSceneLocation()
    {
        return -1;
    }
}
```

FIG. 34B

```
package org.ocap.ui;

import org.dvb.application.AppID;
import org.havi.ui.HGraphicsDevice;
import org.havi.ui.HScene;

public abstract class HSceneManager — 3420
{
   protected HSceneManager() — 3430
   {
   }

   public static HSceneManager getInstance() — 3435
   {
      return null;
   }

   public void setHSceneChangeRequestHandler
  ( HSceneChangeRequestHandler handler ) — 3440
      throws SecurityException
   {
   }

   public HSceneBinding[] getHSceneOrder() — 3445
      throws SecurityException
   {
      return null;
   }

   public HSceneBinding[] getHSceneOrder ( HGraphicsDevice device ) — 3450
      throws SecurityException
   {
      return null;
   }
```

FIG. 34C

```
    public int getAppHSceneLocation() — 3455
    {
        return -1;
    }

    public int getAppHSceneLocation ( HScene scene ) — 3460
    {
        return -1;
    }

    public HSceneBinding getAppDefaultHScene ( AppID id ) — 3465
        throws SecurityException
    {
        return null;
    }

    public HSceneBinding[] getAppHScenes ( AppID id ) — 3470
        throws SecurityException
    {
        return null;
    }

    public HSceneBinding getHSceneFocus() — 3475
    {
        return null;
    }

    public void transferHSceneFocus ( HSceneBinding binding ) — 3480
        throws SecurityException
    {
    }

    public boolean sameScene ( HSceneBinding sb1, HSceneBinding sb2 ) — 3485
    {
        return false;
    }
}
```

METHOD AND APPARATUS FOR MULTISCREEN MANAGEMENT FOR MULTIPLE SCREEN CONFIGURATION

CROSS-REFERENCE TO RELATED APPLICATIONS

This is a Continuation Application of International Application PCT/KR2007/006637, with an international filing date of Jun. 26, 2007, the disclosure of which is incorporated herein by reference. This application claims priority from U.S. Provisional Patent Application Nos. 60/870,471 filed on Dec. 18, 2006, 60/918,894 filed on Mar. 20, 2007, 60/948,038 filed on Jul. 5, 2007, 60/972,846 filed on Sep. 17, 2007, and 60/975,906 filed on Sep. 28, 2007, in the U.S. Patent and Trademark Office, the disclosures of which are incorporated herein in their entireties by reference.

BACKGROUND

1. Field

Apparatuses and methods consistent with the present invention relate to configuring a screen on which a plurality of services are displayed, and more particularly, to configuring a final output screen including a plurality of screens on which a plurality of services are presented or displayed.

2. Description of the Related Art

In general, related art broadcast receiving systems, such as digital television (TVs) or digital set-top boxes, provide only one content element on a single physical display device or simultaneously display a main screen and a sub-screen on a single physical display device. However, even though the related art broadcast receiving systems can simultaneously display both the main screen and the sub-screen on the same display screen, they can only arrange the main screen and the sub-screen in a limited number of manners. Also, there are limited kinds of display devices capable of combining and displaying services from various sources such as a broadcaster, a digital versatile disk (DVD), and an external device connected to an input terminal. While all of a video service, an audio service, and a data service can be displayed on the main screen, a data service cannot be displayed on the sub screen.

FIG. 1 illustrates screen configurations formed by a related art picture-in-picture (PIP) method. The related art PIP method displays a main screen and a sub screen on a physical display screen. For example, as shown in FIG. 1, sub screens 105, 115, 125, 135, 142, 144, 152, and 154 are displayed on physical display screens 100, 110, 120, 130, 140, and 150. Since positions or sizes of the sub screens 105, 115, 125, 135, 142, 144, 152, and 154 are restricted, there is a limitation in flexibly implementing the related art PIP method.

In an interactive TV application program environment, such as Multimedia Home Platform (MHP), Application Configuration Access Protocol (ACAP), and OpenCable Application platform (OCAP), it is assumed that only one screen is output. In the interactive TV application program environment, a Home Audio/Visual Interface (HAVi) User Interface (UI) is adopted. According to the HAVi UI, even though no restriction is imposed on the number of screens displayed on a physical display device, only one screen is generally displayed. Also, application programs share only one screen that is displayed.

Accordingly, the related art application program environment for broadcasting service has a limitation in displaying various kinds of service content on a dynamically configured screen.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method and apparatus for configuring and managing a multiscreen on which a plurality of service contents can be simultaneously displayed at desired positions and with desired sizes.

Exemplary embodiments of the present invention also provide interfaces, which permit effective use of resources of devices supporting multiscreens, and interoperable applications for multiscreen functionality management. Exemplary embodiments of the present invention also provide a standardized interface for managing multiscreen functionality and a multiscreen state such as a picture-in-picture (PIP) or picture-outside-picture (POP) screen.

Methods and apparatuses for managing the multiscreen according to exemplary embodiments of the present invention dynamically control the use of resources and lifecycles of application programs for every screen in order to show service contents on a plurality of independent logical screens.

Since one or more service contents correspond to one or more screens in a many-to-many manner, not a one-to-one manner, a method and apparatus for configuring and managing a multiscreen according to an exemplary embodiment of the present invention can dynamically configure and output a final screen. Also, thanks to various resource management interfaces, multiscreen management functionality may permit effective use of resources of a host device supporting a multiscreen.

An open cable application platform (OCAP) multiscreen management (MSM) Extension according to an exemplary embodiment of the present invention is an extension of an OCAP profile that includes all required application program interfaces (APIs), content and data formats, and protocols, up to the application level. Applications developed to the OCAP MSM Extension will be executed on OpenCable-compliant Host devices. The OCAP MSM Extension allows cable operators to deploy interoperable applications to manage multiscreen functionality on OpenCable-compliant Host devices connected to their networks. This profile allows cable operators to have a standardized interface for managing multiscreen functionality and its state, such as PIP and POP screens across multiple Host device vendors.

The OCAP MSM Extension may be applicable to a wide variety of hardware and operating systems to allow Consumer Electronics (CE) manufacturers flexibility in implementation. A primary objective in defining the OCAP MSM Extension is to enable competing implementations by CE manufacturers while maintaining a consistent and interoperable programmatic interface for use by cable operator-defined applications as well as cable network-independent applications that wish to be aware of multiscreen functionality.

According to an aspect of the present invention, there is provided a method of configuring and managing a multiscreen, the method comprising: receiving one or more broadcasting services; assigning the one or more broadcasting services to a screen; assigning the screen to one or more display screens; and assigning the one or more display screens to one or more output ports.

According to another aspect of the present invention, the method of configuring and managing a multiscreen may further comprise associating a service context for the logical screen to a context for the one or more display screens, and changing the association between the contexts.

According to another aspect of the present invention, the method of configuring and managing a multiscreen may further comprise determining a multiscreen configuration including the logical screen, the one or more display screens, a context for the service, and information regarding the one or more output ports, and changing the multiscreen configuration.

According to another aspect of the present invention, the method of configuring and managing a multiscreen may further comprise observing preconditions and postconditions for changing the multiscreen configuration.

According to another aspect of the present invention, the method of configuring and managing a multiscreen may further comprise reporting a change of the multiscreen configuration and the contexts.

BRIEF DESCRIPTION OF THE DRAWINGS

The above and/or other aspects of the invention will become apparent and more readily appreciated from the following description of exemplary embodiments, taken in conjunction with the accompanying drawings of which:

FIG. 11A illustrates the registry of Java constants in 'org.ocap.ui.MultiScreenConfigurableContext' according to an exemplary embodiment of the present invention.

FIG. 11B illustrates the registry of Java constants in 'org.ocap.ui.MultiScreenConfiguration' according to an exemplary embodiment of the present invention.

FIG. 11C illustrates the registry of Java constants in 'org.ocap.ui.MultiScreenContext' according to an exemplary embodiment of the present invention.

FIG. 11D illustrates the registry of Java constants in 'org.ocap.ui.event.MultiScreenConfigurationEvent' according to an exemplary embodiment of the present invention.

FIG. 11E illustrates the registry of Java constants in 'org.ocap.ui.event.MultiScreenContextEvent' according to an exemplary embodiment of the present invention.

FIG. 11F illustrates the registry of Java constants in 'org.ocap.ui.event.MultiScreenEvent' according to an exemplary embodiment of the present invention.

FIG. 11G illustrates the registry of Java constants in 'org.ocap.ui.event.MultiScreenResourceEvent' according to an exemplary embodiment of the present invention.

FIG. 13A illustrates definition of a 'MultiScreenConfigurableContext' interface of the 'org.ocap.ui' package according to an exemplary embodiment of the present invention.

FIG. 13B illustrates a field of the 'MultiScreenConfigurableContext' interface of the 'org.ocap.ui' package according to an exemplary embodiment of the present invention.

FIG. 13C illustrates a use case of a 'CONFIGURABLE_SCREEN_PARAMETER_DEVICE_Z_ORDER' field according to an exemplary embodiment of the present invention.

FIGS. 13D through 13F illustrate a method of the 'MultiScreenConfigurableContext' interface of the 'org.ocap.ui' package according to an exemplary embodiment of the present invention.

FIG. 14A illustrates definition of a 'MultiScreenConfiguration' interface of the 'org.ocap.ui' package according to an exemplary embodiment of the present invention.

FIG. 14B illustrates a field of the 'MultiScreenConfiguration' interface of the 'org.ocap.ui' package according to an exemplary embodiment of the present invention.

FIG. 14C illustrates a method of the 'MultiScreenConfiguration' interface of the 'org.ocap.ui' package according to an exemplary embodiment of the present invention.

FIG. 15A illustrates definition of a 'MultiScreenContext' interface of the 'org.ocap.ui' package according to an exemplary embodiment of the present invention.

FIG. 15B illustrates a field of the 'MultiScreenContext' interface of the 'org.ocap.ui' package according to an exemplary embodiment of the present invention.

FIGS. 15C and 15D illustrate a method of the 'MultiScreenContext' interface of the 'org.ocap.ui' package according to an exemplary embodiment of the present invention.

FIG. 16A illustrates definition of a 'MultiScreenManager' class of the 'org.ocap.ui' package according to an exemplary embodiment of the present invention.

FIG. 16B illustrates a constructor of the 'MultiScreenManager' class of the 'org.ocap.ui' package according to an exemplary embodiment of the present invention.

FIGS. 16C through 16F illustrate a method of the 'MultiScreenManager' class of the 'org.ocap.ui' package according to an exemplary embodiment of the present invention.

FIG. 17 illustrates an interface and a class of a Java package 'org.ocap.ui.event' according to an exemplary embodiment of the present invention.

FIG. 18A illustrates definition of a 'MultiScreenConfigurationEvent' class of the 'org.ocap.ui.event' package according to an exemplary embodiment of the present invention.

FIG. 18B illustrates a field of the 'MultiScreenConfigurationEvent' class of the 'org.ocap.ui.event' package according to an exemplary embodiment of the present invention.

FIG. 18C illustrates a constructor of the 'MultiScreenConfigurationEvent' class of the package 'org.ocap.ui.event' according to an exemplary embodiment of the present invention.

FIG. 18D illustrates a method of the 'MultiScreenConfigurationEvent' class of the 'org.ocap.ui.event' package according to an exemplary embodiment of the present invention.

FIG. 19A illustrates definition of a 'MultiScreenConfigurationListener' interface of the 'org.ocap.ui.event' package according to an exemplary embodiment of the present invention.

FIG. 19B illustrates a method of the 'MultiScreenConfigurationListener' interface of the 'org.ocap.ui.event' package according to an exemplary embodiment of the present invention.

FIG. 20A illustrates definition of a 'MultiScreenContext Event' class of the 'org.ocap.ui.event' package according to an exemplary embodiment of the present invention.

FIG. 20B illustrates a field of the 'MultiScreenContext Event' class of the 'org.ocap.ui.event' package according to an exemplary embodiment of the present invention.

FIG. 20C illustrates a constructor of the 'MultiScreenContextEvent' class of the 'org.ocap.ui.event' package according to an exemplary embodiment of the present invention.

FIG. 20D illustrates a method of the 'MultiScreenContext Event' class of the 'org.ocap.ui.event' package according to an exemplary embodiment of the present invention.

FIG. 21A illustrates definition of a 'MultiScreenContext Listener' interface of the 'org.ocap.ui.event' package according to an exemplary embodiment of the present invention.

FIG. 21B illustrates a method of the 'MultiScreenContext Listener' interface of the 'org.ocap.ui.event' package according to an exemplary embodiment of the present invention.

FIG. 22A illustrates definition of a 'MultiScreenEvent' class of the 'org.ocap.ui.event' package according to an exemplary embodiment of the present invention.

FIG. 22B illustrates a field of the 'MultiScreenEvent' class of the 'org.ocap.ui.event' package according to an exemplary embodiment of the present invention.

FIG. 22C illustrates a constructor of the 'MultiScreenEvent' class of the 'org.ocap.ui.event' package according to an exemplary embodiment of the present invention.

FIG. 22D illustrates a method of the 'MultiScreenResourceEvent' class of the 'org.ocap.ui.event' package according to an exemplary embodiment of the present invention.

FIG. 23A illustrates definition of a 'MultiScreenResourceEvent' class of the 'org.ocap.ui.event' package according to an exemplary embodiment of the present invention.

FIG. 23B illustrates a field of the 'MultiScreenResourceEvent' class of the 'org.ocap.ui.event' package according to an exemplary embodiment of the present invention.

FIG. 23C illustrates a constructor of the 'MultiScreenResourceEvent' class of the 'org.ocap.ui.event' package according to an exemplary embodiment of the present invention.

FIG. 23D illustrates a method of the 'MultiScreenResourceEvent' class of the 'org.ocap.ui.event' package according to an exemplary embodiment of the present invention.

FIGS. 24A through 24C illustrate preconditions for changing a multiscreen configuration according to an exemplary embodiment of the present invention.

FIG. 24D illustrates a process of changing a multiscreen configuration according to an exemplary embodiment of the present invention.

FIGS. 25A through 25E illustrate postconditions for changing a multiscreen configuration according to an exemplary embodiment of the present invention.

FIGS. 26A through 26D illustrate constraints for verifying invariants according to an exemplary embodiment of the present invention.

FIG. 27 illustrates definition of a 'getNonDefaultScreens( )' method according to an exemplary embodiment of the present invention.

FIGS. 28A and 28B illustrate definition of a 'getNonDefaultScreenDevices( )' method according to an exemplary embodiment of the present invention.

FIG. 29 illustrates a plurality of methods according to an exemplary embodiment of the present invention.

FIG. 30A illustrates pseudo-codes of an 'AppID' Java type according to open cable application platform (OCAP) standards.

FIG. 30B illustrates pseudo-codes of an 'OcapAppID' Java type for implementing an OCAP MSM, according to an exemplary embodiment of the present invention.

FIG. 31 illustrates pseudo-codes for supporting the 'Ocap AppID' Java type according to an exemplary embodiment of the present invention.

FIG. 32A illustrate pseudo-codes of a 'HSceneBinding' Java type according to the OCAP standards.

FIG. 32B illustrates pseudo-codes of the 'HSceneBinding' Java type for implementing OCAP MSM according to an exemplary embodiment of the present invention.

FIG. 33A illustrates pseudo-codes of a 'HSceneChangeRequestHandler' Java type according to the OCAP standards.

FIG. 33B illustrates pseudo-codes of the 'HSceneChangeRequestHandler' Java type for implementing OCAP MSM according to an exemplary embodiment of the present invention.

FIG. 34A illustrates pseudo-codes of a 'HSceneManager' Java type according to the OCAP standards.

FIGS. 34B and 34C illustrate pseudo-codes of the 'HSceneManager' Java type for implementing OCAP MSM according to an exemplary embodiment of the present invention.

DETAILED DESCRIPTION OF EXEMPLARY EMBODIMENTS

Figure 1:
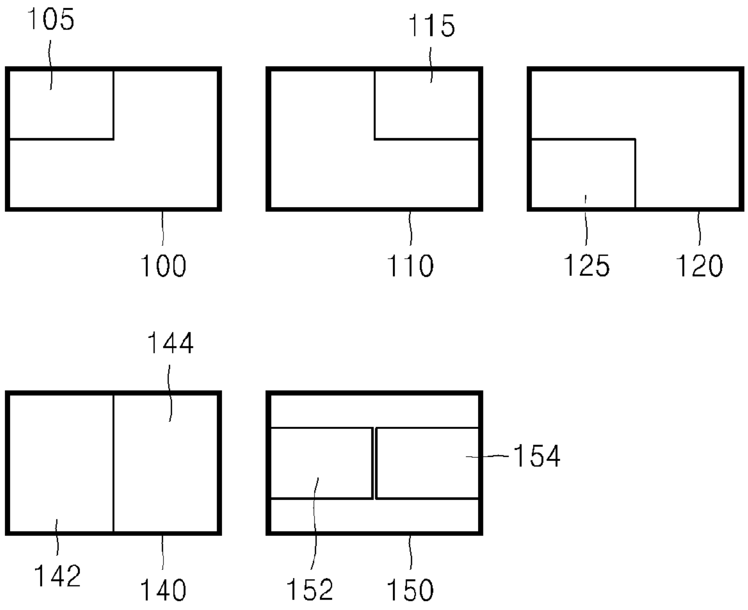
FIG. 1 illustrates screen configurations formed by a related art PIP method.

Exemplary embodiments of the present invention will now be described more fully with reference to the accompanying drawings.

Multiscreen management of exemplary embodiments of the present invention will be explained with reference to at least FIGS. 2 through 34C.

The concept of a multiscreen system and multiscreen management introduced in exemplary embodiments of the present invention will be explained with reference to at least FIGS. 2 through 10.

Definitions and functions of various Java types according to exemplary embodiments of the present invention will be explained with reference to at least FIGS. 11A through 29.

Modifications or additions to the existing OpenCable Application Platform (OCAP) standard to implement exemplary embodiments of the present invention in an OCAP environment will be explained with reference to at least FIGS. 30A through 34C.

For a better understanding of the specification, abbreviations and terms will now be defined.

"HAVi" is an abbreviation of Home Audio-visual Interface. "MSM" is an abbreviation of Multiscreen Manager. "PIP" is an abbreviation of Picture-in-Picture. "POP" is an abbreviation of Picture-outside-Picture. "AIT" is an abbreviation of Application Information Table). "XAIT" is an abbreviation of Extended Application Information Table.

"Audio Focus Screen" is a screen whose audio sources are selected for rendition on any audio presentation device associated with any enabled video output ports with which the screen is associated directly (in case it is a display screen) or indirectly (in case it is a mapped logical screen).

"Display Mapper" is a logical process of compositing the normalized coordinate space of a logical screen to the normalized coordinate space of a display screen (or some portion thereof).

"Display Multiscreen Configuration" is a multiscreen configuration consisting only of display screens. Every per-platform multiscreen configuration is a display multiscreen configuration. A configuration type of a display multiscreen configuration is SCREEN_CONFIGURATION_DISPLAY which will be explained later.

"Display Screen" is a type of screen that models a final output composition of a physical display device. A display screen is associated with one or more video output ports that are themselves either (1) attached to an internal, integrated display or (2) attached to a physical output port cable of being connected to an external display device via some well-defined interface, e.g., High Definition Multimedia Interface (HDMI) or Institute of Electrical and Electronics Engineers (IEEE) 1394.

"General Screen" is a logical screen that is assigned to a general screen category which will be explained later. A general screen is typically capable of being reconfigured such that it may serve different application cases. For example, it may be configured as a PIP screen at some time, but as a POP screen at another time.

"Logical Screen" is a type of screen that is not directly associated with a physical display device but may be mapped through a display mapper to a display screen. A logical screen is either mapped or unmapped. If mapped, it is associated with a display screen; if unmapped, it is not associated with a display screen. In exceptional cases, a logical screen may be directly associated with a video output port, in which case it is simultaneously serving as a logical screen and as a quasi-display screen.

"Main Screen" is a display screen or a logical screen that is assigned to a main screen category which will be explained later. A main screen is always coextensive with the full screen extent of a display device (unless further mapped by the display device itself without the knowledge of MSM).

"Multiscreen Configurable Context" is an extension of a multiscreen context that provides the ability to configure (mutate) state information related to multiscreen management functionality. The Multiscreen Configuration Context is defined by a 'MultiScreenConfigurableContext' interface used in an exemplary embodiment of the present invention, and the 'MultiScreenConfigurableContext' interface is a Java type for representing the Multiscreen Configurable Context.

"Multiscreen Configuration" is an identifiable collection of screens that are presenting or able to present content, where this collection may (but need not) be a proper subset of all accessible screens on a given platform implementation or on a given display screen. At any given time, a single multiscreen configuration applies to both (1) the platform as a whole, in which case the screens in the configuration are display screens, and (2) each display screen, in which case the screens in the configuration are either the display screen itself or a set of logical screens mapped to that display screen. A given underlying screen may be present in multiple multiscreen configurations at a given time.

The Multiscreen Configuration is defined by a 'MultiScreenConfiguration' interface used in an exemplary embodiment of the present invention, and the 'MultiScreenConfiguration' interface is a Java type for representing the Multiscreen Configuration.

"Multiscreen Configuration Type" is a characterization of a multiscreen configuration based primarily upon its constituent screen categories. The set of multiscreen configuration types is further divided into (1) a singleton display multiscreen configuration type, known as a display multiscreen configuration, and (2) all other multiscreen configuration types, known as non-display multiscreen configurations.

"Multiscreen Context" is a set of state information that extends a HAVi Screen in order to permit interoperation in a platform that implements multiple screens. The baseline multiscreen context provides functionality to discover (but not mutate) this state information.

The Multiscreen Context is defined by a 'MultiScreenContext' interface used in an exemplary embodiment of the present invention, and the 'MultiScreenContext' interface in the specification represents the Multiscreen Context.

"Multiscreen Manager" is a singleton management component provided by a platform implementation that, through the attributes defined in this specification, enables effective use of multiple screens. The Multiscreen Manager is also referred to as a multiple screen manager.

The Multiscreen Manager is defined by a 'MultiScreenManager' class used in an exemplary embodiment of the present invention, and the 'MultiScreenManager' class is a Java type for representing the Multiscreen Manager.

"Overlay Screen" is a logical screen that is assigned to an overlay screen category which will be explained later. The z-order of an overlay screen places a corresponding overlay screen more front-most than all other non-overlay screens.

"Per-Display Multiscreen Configuration" is a non-display multiscreen configuration that defines or may be used to define the active or potentially active set of screens associated with a given display screen. Each underlying display screen in the currently active per-platform multiscreen configuration contains a state variable to define its active per-display multiscreen configuration.

"Per-Platform Multiscreen Configuration" is a display multiscreen configuration that currently defines or may be used to define the active or potentially active set of display screens. The currently active per-platform multiscreen configuration is a state variable of the multiscreen manager singleton instance.

"PIP Screen" is a logical screen that is assigned to a PIP screen category. A PIP screen typically intersects with a Main screen, and appears more front-most (in z-order) than this Main screen.

"POP Screen" is a logical screen that is assigned to a POP screen category. A POP screen is typically tiled along with one or more other POP screens so as to fill the extent of a display screen.

"Screen" is a set of (logical and possibly physical) resources that enable presentation of some combination of a background color, a background image, video, and graphics. The background color, the background image, the video, and the graphics are displayed through a HScreenDevice provided by the HAVI. The background color and the background image may be displayed with a HBackgroundDevice, the video may be displayed with a HVideoDevice, and the graphics may be displayed with a HGraphicDevice. The Screen may include one HBackgroundDevice, one HVideoDevice, and one HGraphicDevice. A screen may be either a display screen or a logical screen.

"Default Screen" is a most highly accessible screen among a plurality of screens. "Default Screen Device" is a most highly accessible screen device among a plurality of screen devices. The Default Screen Device may be one of the HBackgroundDevice, HVideoDevice, and HGraphicDevice.

"Screen Category" is a grouping of screens according to their usage or configurability characteristics.

"Screen Identifier" is a platform-unique designation of an underlying screen and its respective resources that permits discrimination between screens of different categories or screens within a single category.

"Screen Type" is a top-level division of screens into two types: display screens and logical screens.

"Service" is multimedia content including a plurality of service components.

"Service Component" is a service element including a video component, an audio component, and a data component. The data component includes various information items for service and applications executed on a platform.

"Service Context" is an object including resources regarding service to be implemented, devices, state information, etc.

The OCAP MSM Extension defines a collection of functionality and behaviors to permit the effective use of multiple displays and multiple logical screens on platform implementations that support these attributes.

"Multiscreen Configuration Listener" is used to provide notifications regarding system and application induced changes to the global state of the MultiScreenManager instance or the state of some display HScreen with respect to the per-platform or some per-display multiscreen configuration, respectively, or to changes to a specific MultiScreenConfiguration instance. The Multiscreen Configuration Listener is defined by a 'MultiScreenConfigurationListener' interface of an exemplary embodiment of the present invention, and the 'MultiScreenConfigurationListener' interface in the specification is a Java type for representing the Multiscreen Configuration Listener.

"Multiscreen Context Listener" is used to provide notifications regarding system and application induced changes to a MultiScreenContext. The Multiscreen Context is defined by a 'MultiScreenContextListener' interface of an exemplary embodiment of the present invention. The 'MultiScreenContextListener' interface in the specification is a Java type for representing the Multiscreen Context Listener.

"Multiscreen Configuration Event" is used to report changes to the global state of the MultiScreenManager instance or the state of some display HScreen with respect to the per-platform or some per-display multiscreen configuration, respectively, or to changes to a specific MultiScreenConfiguration instance. The Multiscreen Configuration Event is defined by a 'MultiScreenConfigurationEvent' interface of an exemplary embodiment of the present invention. The 'MultiScreenConfigurationEvent' interface in the specification is a Java type for representing the Multiscreen Configuration Event.

"Multiscreen Context Event" is used to report a change to a MultiScreenContext to interested listeners. The Multiscreen Context Event is defined by a 'MultiScreenContextEvent' interface of an exemplary embodiment of the present invention. The 'MultiScreenContextEvent' interface in the specification is a Java type for representing the Multiscreen Context Event.

"Multiscreen Event" is an abstract base class used to organize event identification codes used by disparate types of events related to multiple screen management functionality. The Multiscreen Event is defined by a 'MultiScreenEvent' interface of an exemplary embodiment of the present invention. The 'MultiScreenEvent' interface in the specification is a Java type for representing the Multiscreen Event.

Multiscreen Resource Event is used to report changes regarding the resource status of multiscreen related to resources. The Multiscreen Resource Event is defined by a 'MultiScreenResourceEvent' interface of an exemplary embodiment of the present invention which will be explained later. The 'MultiScreenResourceEvent' interface in the specification is a Java type for presenting the Multiscreen Resource Event.

The degree to which a specific platform implementation supports this extension is determined by the platform and device manufacturer or by other external profiles of this extension, and is typically dictated by the type and configurability of hardware, including the number of available tuners or independent input sources, the number of available video decoding pipelines, the number of integrated displays, the number of independent video (and audio) output ports, the amount of memory available for video and graphics buffering, and other unspecified resources.

A multiscreen system and multiscreen management introduced in the present invention will be explained with reference to at least FIGS. 2 through 10.

Figure 2:
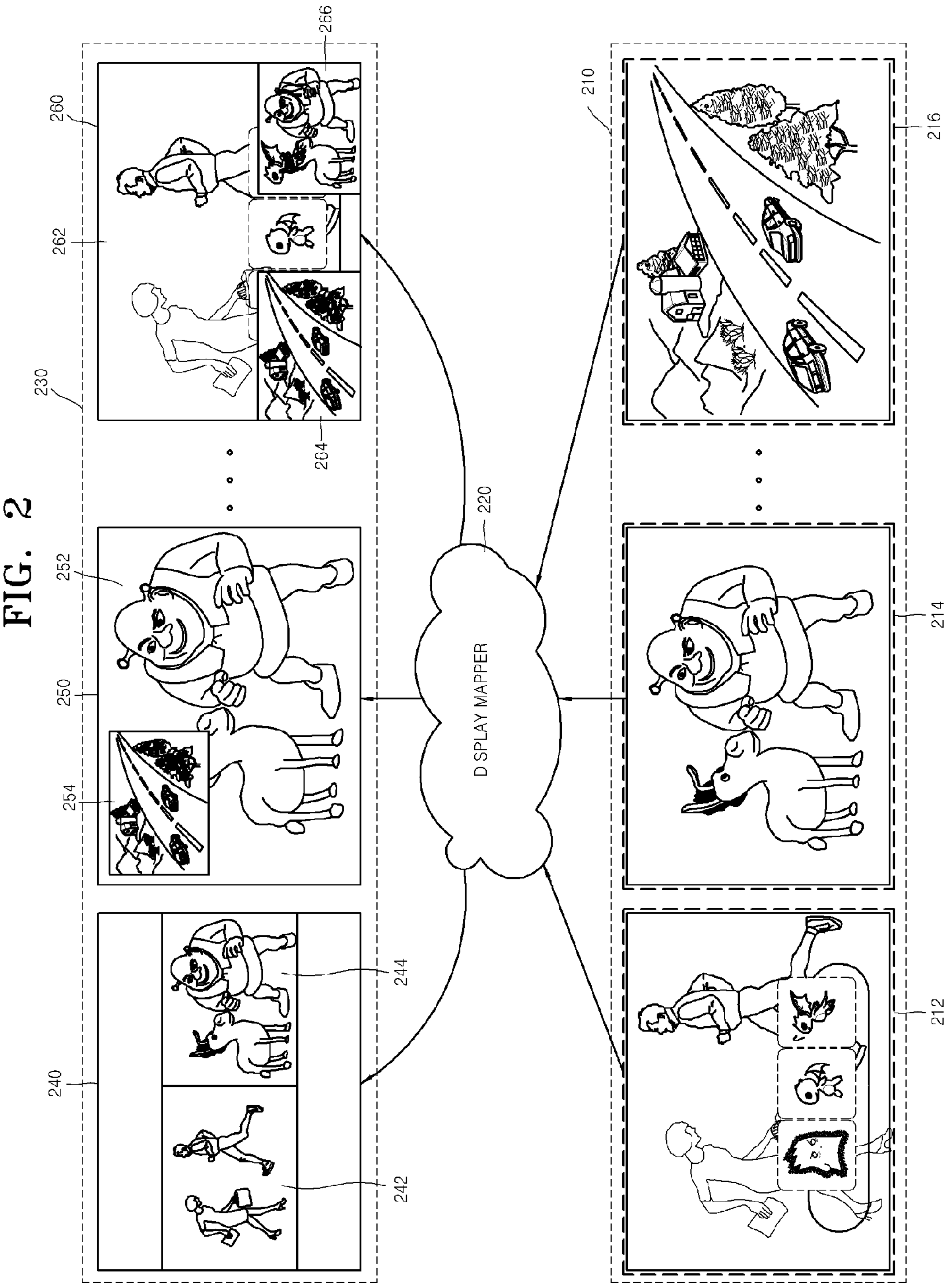
FIG. 2 illustrates a relationship between a logical screen, a display screen, and a display mapper according to an exemplary embodiment of the present invention.

FIG. 2 illustrates a relationship between a logical screen, a display screen, and a display mapper according to an exemplary embodiment of the present invention.

A screen on a multiscreen management includes a logical screen set 210 and a display screen set 230. The logical screen set 210 is associated with the display screen set 230 through a display mapper 220. The display mapper 220 is a logical process of compositing the normalized coordinate space of a logical screen to the normalized coordinate space of a display screen. That is, one or more logical screens can be displayed at desired positions on one display screen through the display mapper 220.

For example, a multiscreen management system according to an exemplary embodiment of the present invention includes the display mapper 220, a plurality of logical screens 212, 214, and 216, and a plurality of display screens 240, 250, and 260. At least one of the logical screens 212, 214, and 216 is displayed on each of the display screens 240, 250, and 260 by means of the display mapper 220.

That is, due to the display mapper 220, screen regions 242 and 244 can be arranged in parallel within the display screen 240. The logical screen 212 is contracted and disposed in the screen region 242, and the logical screen 214 is also scaled and disposed in the screen region 244. Likewise, the logical screen 214 is disposed in a rear-most screen region 252 within the display screen 250. The logical screen 216 is disposed in a screen region 254 of the display screen 250. The logical screen 212 is disposed in a rear-most screen region 262 of the display screen 260. The logical screen 214 is contracted and disposed in a screen region 266 of the display screen 260. The logical screen 216 is contracted and disposed in a screen region 264 of the display screen 260.

Figure 3:
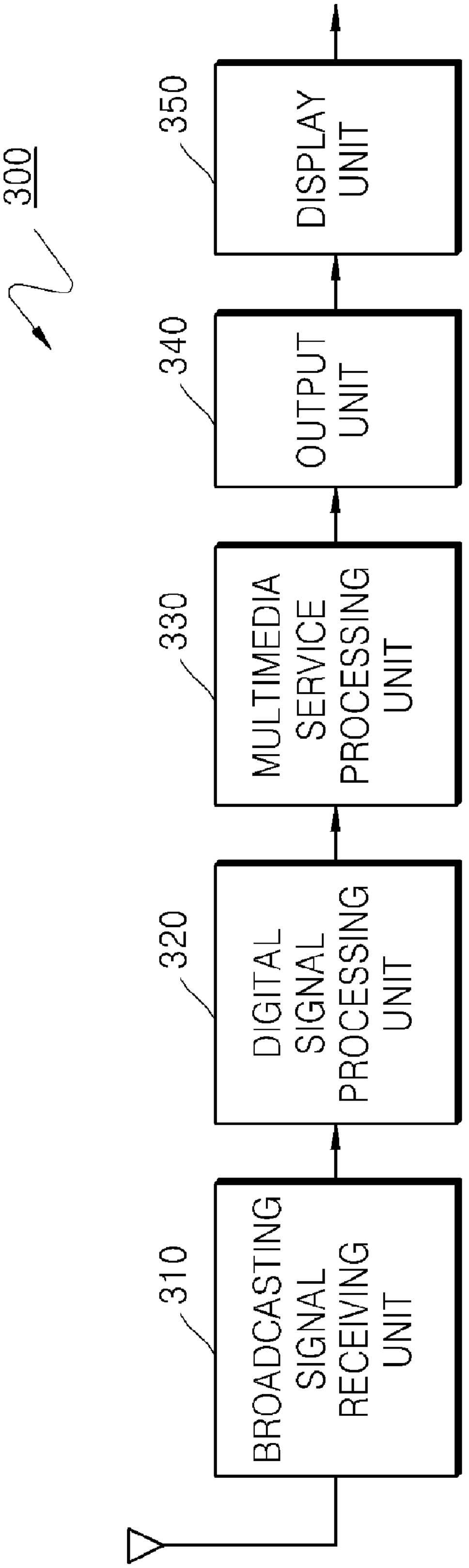
FIG. 3 is a block diagram of a digital TV system, which can implement a multiscreen manager, according to an exemplary embodiment of the present invention.

FIG. 3 is a block diagram of a TV system 300 in which a multiscreen manager can be implemented according to an exemplary embodiment of the present invention.

The digital TV system 300 includes a broadcasting signal receiving unit 310, a digital signal processing unit 320, a multimedia service processing unit 330, an output unit 340, and a display unit 350.

The broadcasting signal receiving unit 310 receives a cable broadcasting signal. Alternatively, a broadcasting signal receiving unit 310 may receive a terrestrial broadcasting signal or a satellite broadcasting signal.

The digital signal processing unit 320 reconfigures service by using a service component received by the broadcasting signal receiving unit 310.

The multimedia service processing unit 330 generates a logical screen for presenting the service reconfigured by the digital signal processing unit 320 and outputs the generated logical screen to the output unit 340.

The output unit 340 generates a display screen, and maps the display screen to the logical screen. That is, the logical screen is associated with the display screen, such that service of the logical screen is associated with the display screen. Although service is associated with the logical screen and then with the display screen in FIG. 3, the present invention is not limited thereto, and service may be directly associated with the display screen.

When the output unit 340 includes one or more output ports, the output ports may be associated with the display screen.

In order for the digital TV system 300 to implement multiscreen management functionality, associations between the logical screen, the display screen, and the output ports should be determined in the multimedia signal processing unit 330 and the output unit 340. A plurality of screens may be generated when a platform is implemented, and implementation of multiscreen management functionality, that is, multiscreen configuration, management, and change, provides an application program interface (API) for MSM which will be explained later.

The display unit 350 may include a physical display screen device on which the display screen is displayed.

Figure 4:
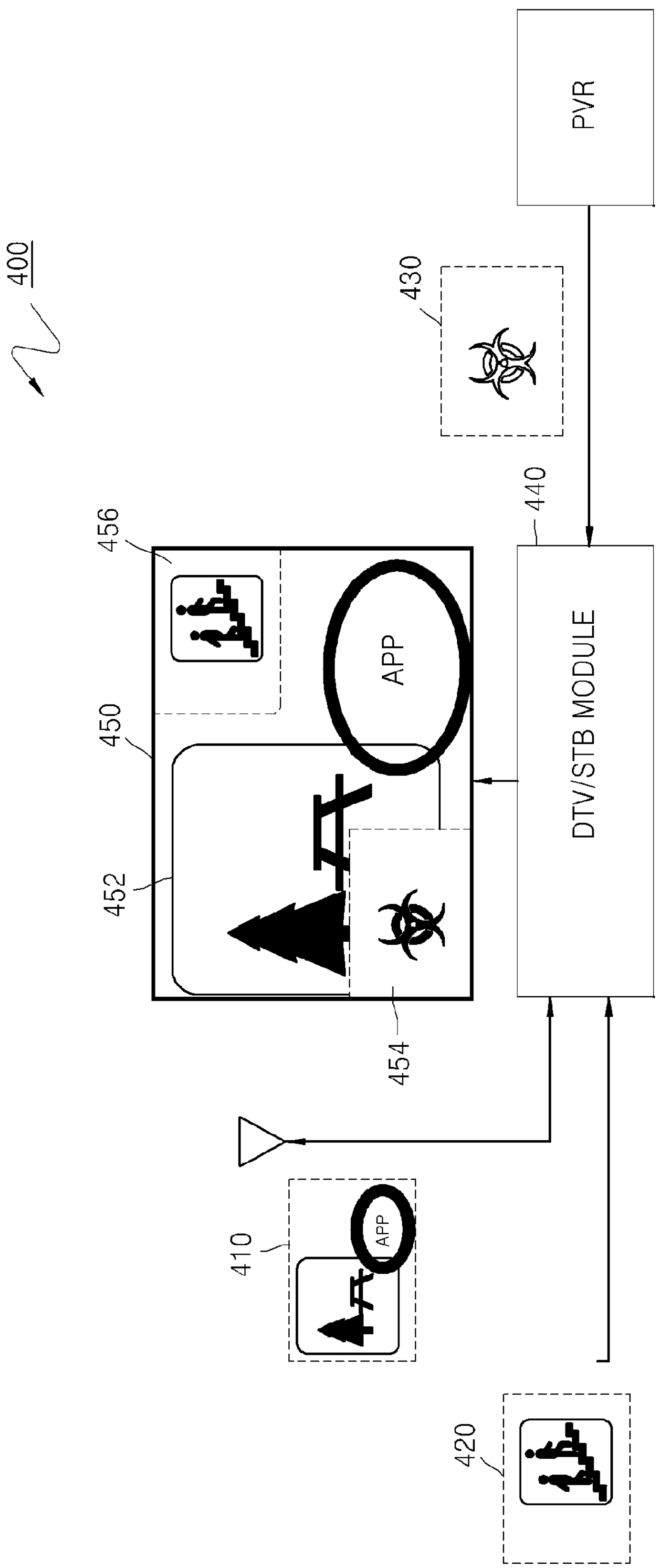
FIG. 4 illustrates a plurality of contents presented in a digital TV system according to an exemplary embodiment of the present invention.

FIG. 4 illustrates a plurality of contents presented in a digital TV system 400 according to an exemplary embodiment of the present invention.

The digital TV system 400 may simultaneously present a terrestrial broadcasting content 410, a cable broadcasting content 420, and a personal video recorder (PVR) data content 430. That is, if multiscreen management of the present invention can be implemented in a digital TV/Set-top Box (DTV/STB) module, the terrestrial broadcasting content 410, the cable broadcasting content 420, and the PVR data content 430 are respectively associated with logical screens, and each logical screen is displayed on a display screen 450.

Since the multiscreen management of the present invention defines associations between one or more logical screens and one or more display screens, one or more logical screens can be mapped to one display screen. That is, a logical screen 452 of the terrestrial broadcasting content 410 is disposed in a screen region 452 of the display screen 450, and a logical screen 456 of the cable broadcasting content 420 is disposed in a screen region 456 of the display screen 450. Also, due to the DTV/STB module, a logical screen 454 of the PVR content 430 is disposed in a screen region 454 of the display screen 450.

That is, the logical screens 452, 454, and 466 may be scaled and disposed in various positions of the display screen 450 in a predetermined order.

Figure 5A:
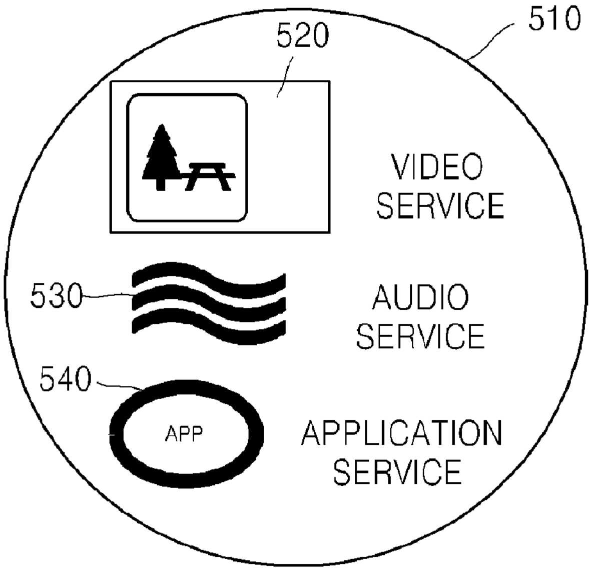
FIGS. 5A and 5B respectively illustrate a non-abstract service and an abstract service according to an exemplary embodiment of the present invention.
Figure 5B:
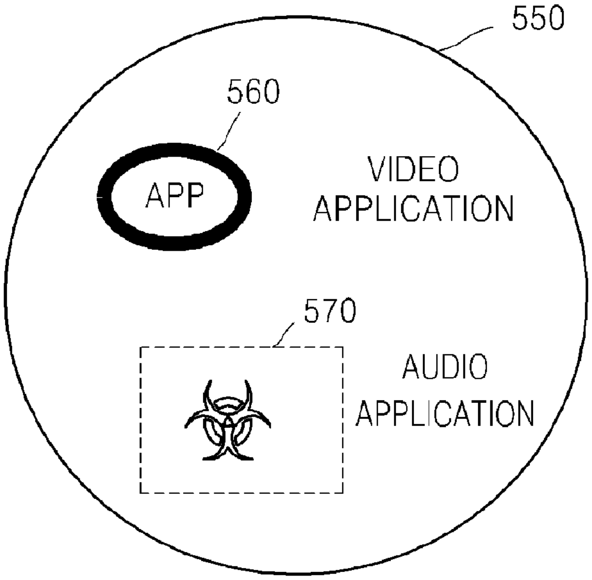

FIGS. 5A and 5B respectively illustrate a non-abstract service and an abstract service according to an exemplary embodiment of the present invention.

In FIG. 5A, a service set 510 is a non-abstract service set. In FIG. 5B, a service set 550 is an abstract service set. The non-abstract service set 510 includes a video service 520, an audio service 530, and an application service 540. In contrast, the abstract service set 550 includes a video application 560 and an audio application 570. That is, the abstract service set 550 is a service set including only application services, without any video service or an audio service, and the non-abstract service set 510 is a service set including other services as well as an application service.

Figure 6:
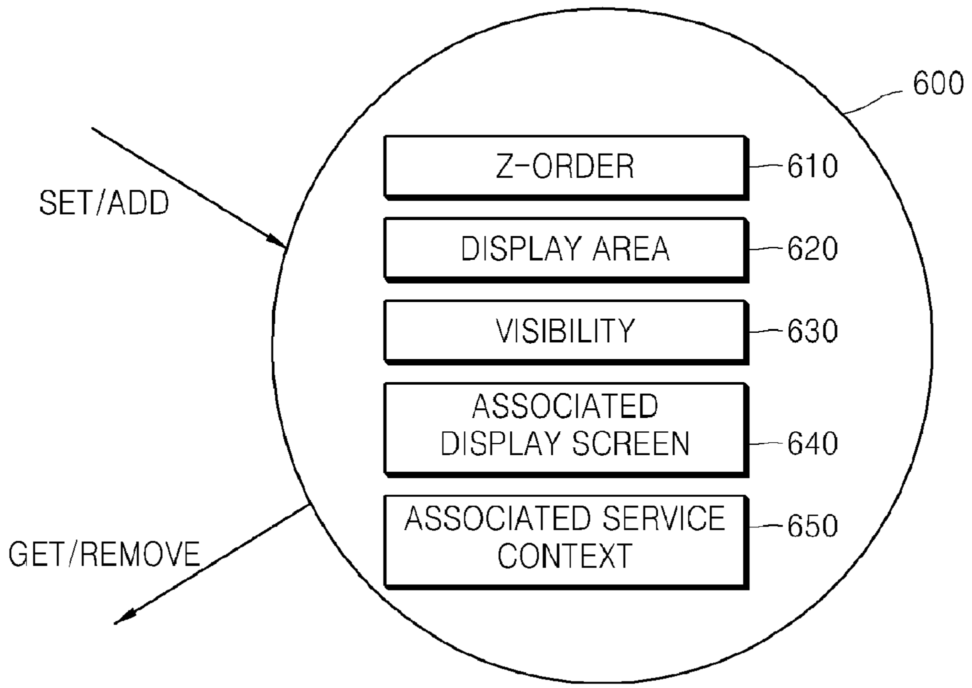
FIG. 6 illustrates a relationship between a screen context and various methods, according to an exemplary embodiment of the present invention.

FIG. 6 illustrates a relationship between a screen context 600 and various methods.

Referring to FIG. 6, the screen context 600 includes a z-order 610, a display area 620, a visibility 630, an associated display screen 640, and an associated service context 650.

The z-order 610 means information for determining in what order a plurality of logical screens are displayed on a display screen.

The display area 620 is a region in which the normalized screen coordinate space of a logical screen is mapped to the normalized screen coordinate space of a display screen.

The visibility 630 determines whether a logical screen is to be visibly or invisibly displayed on a display screen.

The associated display screen 640 is a display screen to which a logical screen is associated. The associated service context 650 is a service context connected to a logical screen or a display screen.

The screen context 600 may set or add the attributes through a 'set/add' method, and get or remove the attributes through a 'get/remove' method. That is, the screen context 600 can set and alter the attributes by using the 'set/add' and 'get/remove' methods.

Although not shown in FIG. 6, the screen context 600 may include not only the z-order 610, the display region 620, the visibility 630, the associated display screen 640, and the associated service context 650, but also at least one of an audio focus associated with a current screen, an audio source associated with the current screen, a z-order of a screen device associated with the current screen, a display area associated with the current screen, and a video output port associated with the current screen.

Figure 7A:
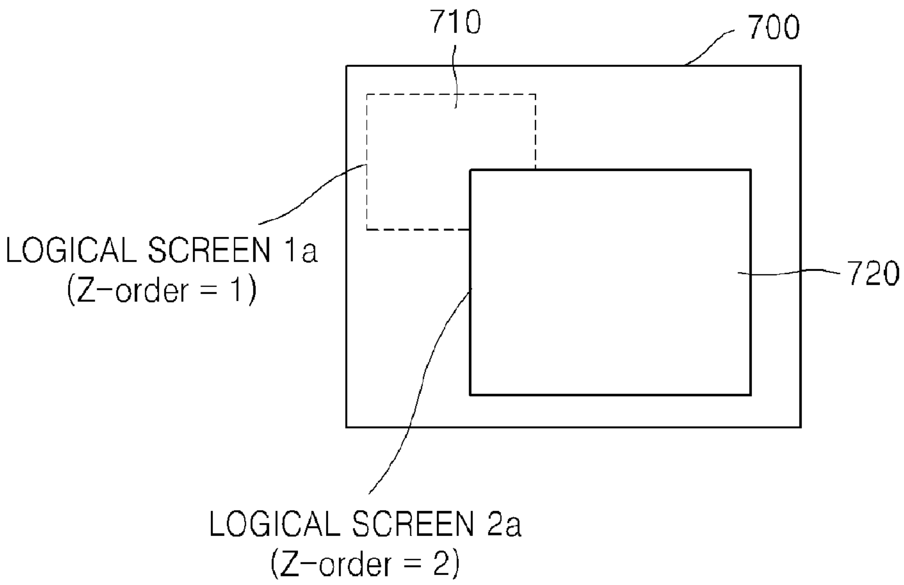
FIGS. 7A and 7B illustrate results on a display screen according to the z-order of a logical screen, according to an exemplary embodiment of the present invention.
Figure 7B:
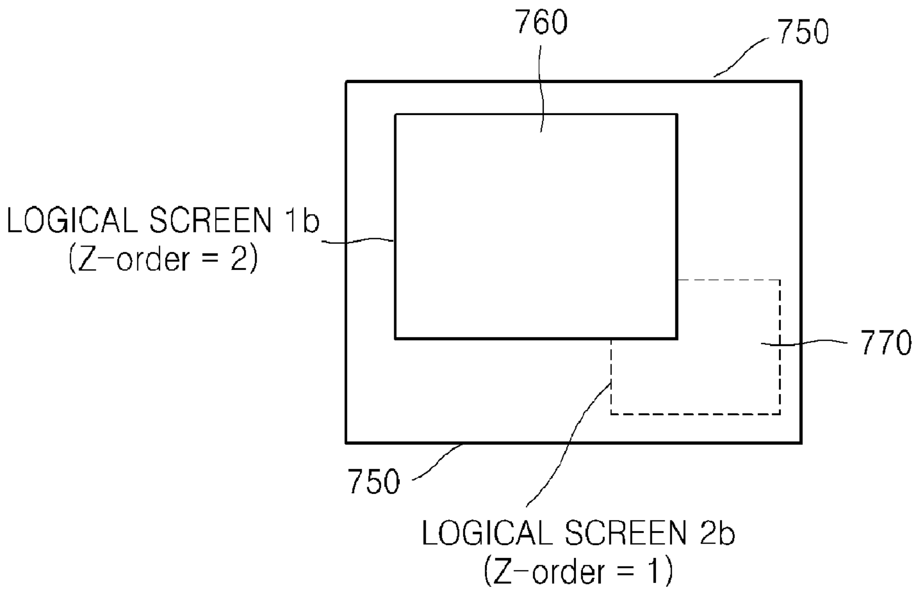

FIGS. 7A and 7B illustrate results on a display screen according to the z-order of a logical screen.

As the z-order of a corresponding element increases, the corresponding element is disposed at a higher (more front) position. Referring to FIG. 7A, when z-orders of a logical screen 1*a* 710 and a logical screen 2*a* 720 which are disposed on a display screen 700 are respectively 1 and 2, the logical screen 2*a* 720 is higher (more front) than the logical screen 1*a* 710.

Likewise, referring to FIG. 7B, when z-orders of a logical screen 1*b* 760 and a logical screen 2*b* 770 which are disposed on a display screen 750 are respectively '2' and '1', the logical screen 1*b* 760 is higher (more front) than the logical screen 2*b* 770.

The concept and order of z-orders applies to screen devices as well as logical screens.

Figure 8A:
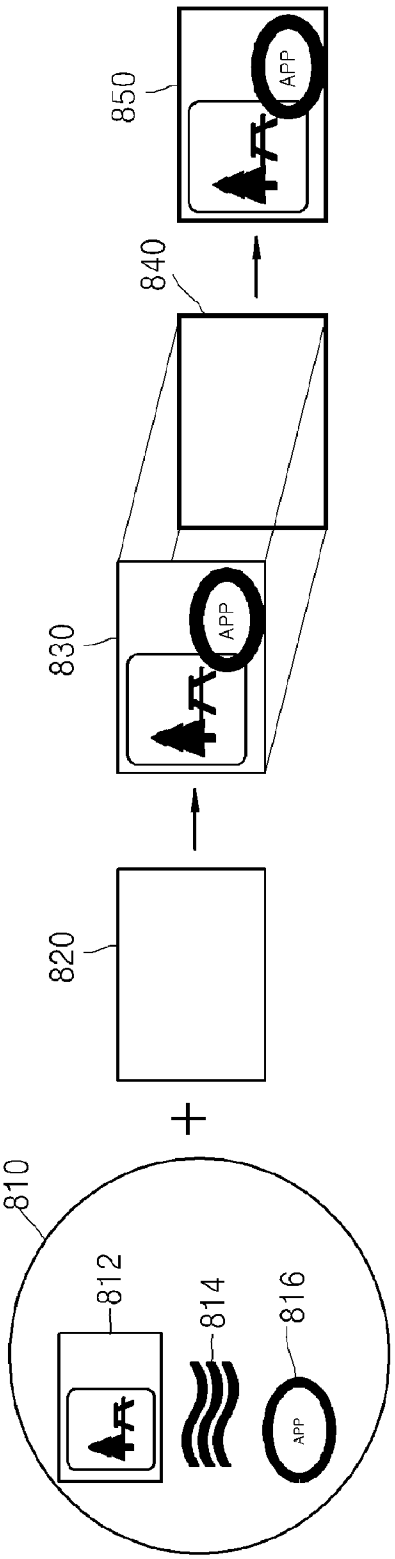
FIGS. 8A and 8B illustrate associations between a service context, a logical screen, and a display screen, according to an exemplary embodiment of the present invention.
Figure 8B:
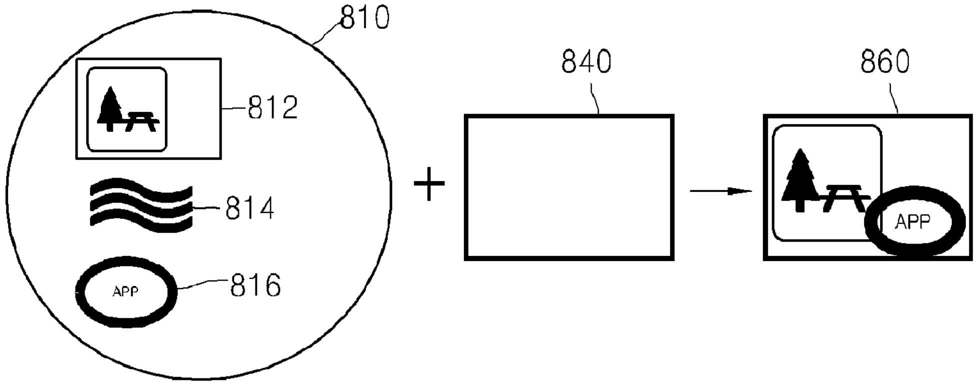

FIGS. 8A and 8B illustrate associations between a service context, a logical screen, and a display screen.

A method of directly/indirectly associating service with a display screen when a service 810 including a video content 812, an audio content 814, and an application content 816 is received will be explained.

Referring to FIG. 8A, when the service 810 is associated with an empty logical screen 820 and a logical screen 830 with which the service 810 is associated is associated with a display screen 840, the service 810 is displayed 850 on the display screen 840. That is, the display screen 840 and the service 810 are indirectly associated with each other through the logical screens 820 and 830.

Referring to FIG. 8B, when the service 810 is associated with the empty display screen 840, the service 810 is displayed 860 on the display screen 840. That is, the display screen 840 and the service 810 are directly associated with each other.

Accordingly, since the service 810 is directly/indirectly associated with the display screen 840, the service 810 can be displayed on the display screen 840, and when finally associated with an output port, can be output.

Figure 9A:
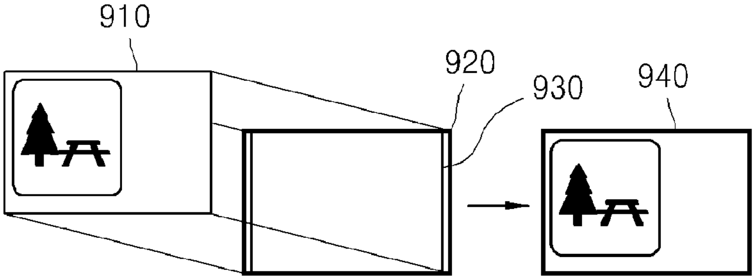
FIGS. 9A and 9B illustrate results on a display screen according to display areas to which a logical screen is mapped, according to an exemplary embodiment of the present invention.
Figure 9B:
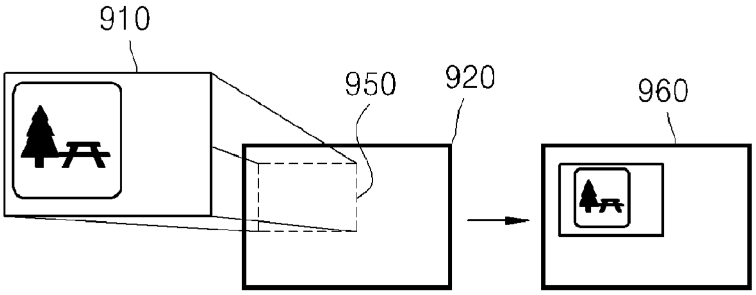

FIGS. 9A and 9B illustrate results on a display screen according to a display area to which a logical screen is mapped.

Referring to FIG. 9A, when a logical screen 910 is mapped to an overall area 930 of a display screen 920 through a display mapper 220, the logical screen 910 is displayed 940 on the overall area 930 of the display screen 920.

In contrast, referring to FIG. 9B, when the logical screen 910 is mapped to a area 950 of the display screen 920 through the display mapper 220, the logical screen 910 is displayed 960 on the area 950 of the display screen 920.

That is, unlike a conventional PIP method, a content screen displayed on a part of an overall screen can be scaled.

Figure 10:
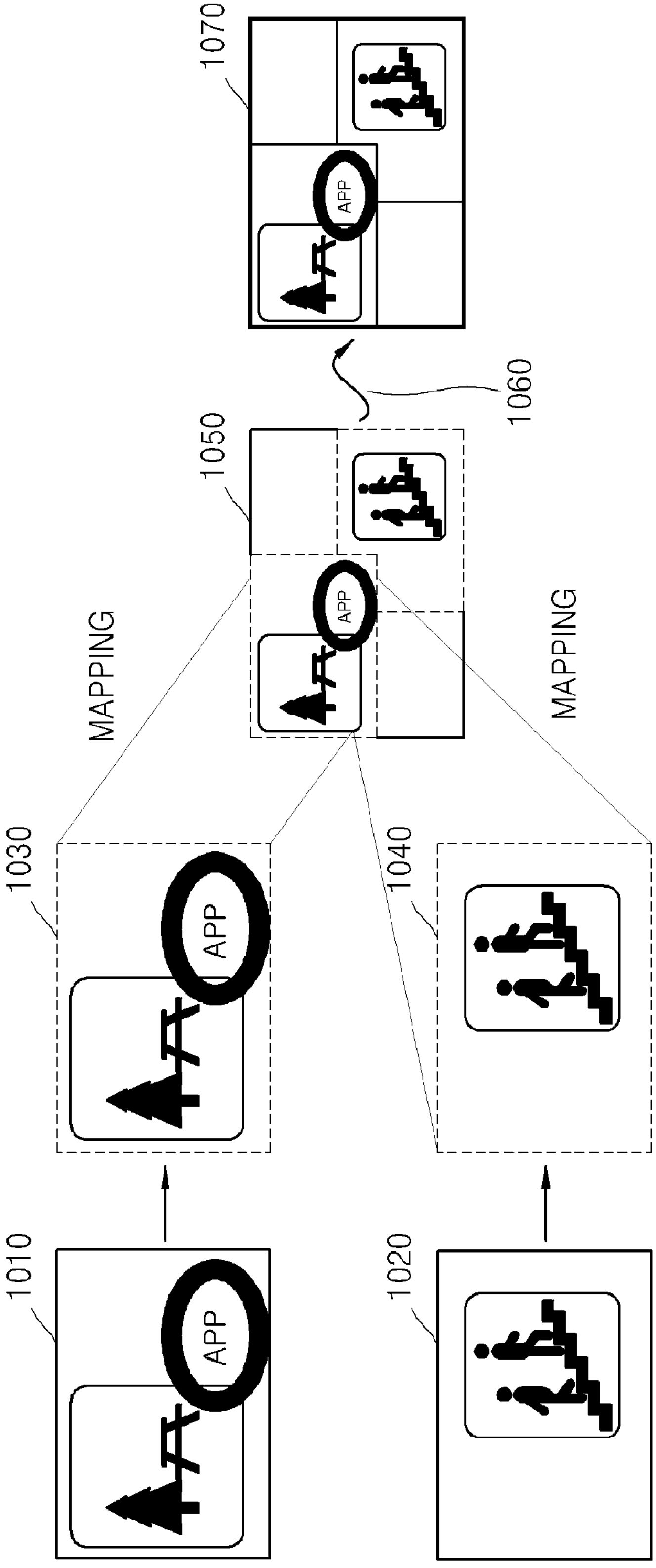
FIG. 10 illustrates associations between a plurality of services, a plurality of logical screens, and a display screen, according to an exemplary embodiment of the present invention.

FIG. 10 illustrates associations between a plurality of services, a plurality of logical screens, and a display screen.

A multiscreen management apparatus according to an exemplary embodiment of the present invention can simultaneously map a first logical screen 1030 with which a first service 1010 is associated and a second logical screen 1040 with which a second service 1020 is associated to a display screen 1050. When the display screen 1050 to which the first and second logical screens 1030 and 1040 are mapped is associated with an output port 1060, a final output result 1070 can be presented on a display unit.

That is, the multiscreen management apparatus may include a plurality of services, a plurality of logical screens, a plurality of display screens, and a plurality of output ports. Accordingly, the multiscreen management apparatus can present a plurality of services and a plurality of screens through a plurality of output ports.

The present invention is not limited to the multiscreen configuration described with reference to FIGS. 2 through 10, but a multiscreen management method and apparatus according to an exemplary embodiment of the present invention may also define operations for multiscreen state configuration, change, and management. That is, since the multiscreen management method and apparatus is provided with various abilities: to get, change, set, and discover a mapping relationship between a logical screen and a display screen, associations between a screen device, a service context, a display screen, and a video output port, an audio focus assignment, a per-display multiscreen configuration, and a per-platform multiscreen configuration; to reserve resources and release and resource reservation; and monitor and notify various changes, and various abilities for preconditions and postconditions for various changes, a smooth multiscreen configuration and multiscreen management can be carried out. Various abilities for the multiscreen configuration and multiscreen management will be explained below.

A multiscreen management method and apparatus applied to an OCAP system according to an exemplary embodiment of the present invention will now be explained.

The present invention defines a modular extension to an OCAP Profile for OCAP Host devices that support Multiscreen Management functionality as defined by this specification. Multiscreen Management functionality is defined as a standardized software interface for allowing interoperable OCAP applications to effectively use the resources of a Host device that supports multiple screens.

The OCAP MSM Extension is an extension of the OCAP Profile that includes all required APIs, content and data formats, and protocols, up to the application level. Applications developed to the OCAP MSM Extension will be executed on OpenCable-compliant Host devices. The OCAP MSM Extension allows cable operators to deploy interoperable applications to manage multiple screen functionality on OpenCable-compliant Host devices connected to their networks.

This profile allows cable operators to have a standardized interface for managing multiscreen functionality and its state, such as PIP and POP screens across multiple Host device vendors.

The OCAP MSM Extension is applicable to a wide variety of hardware and operating systems to allow Consumer Electronics (CE) manufacturers flexibility in implementation. A primary objective in defining the OCAP MSM Extension is to enable competing implementations by CE manufacturers while maintaining a consistent and interoperable programmatic interface for use by cable operator-defined applications as well as cable network-independent applications that wish to be aware of multiscreen functionality.

The multiscreen management method and apparatus is an Extension for an existing OCAP standard. The OCAP MSM Extension takes the form of signaling mechanisms (descriptors), APIs, platform behavior (semantics), and application usage constraints.

In an exemplary embodiment, the APIs defined by the specification take the form of extensions to existing functionality and APIs defined by the HAVi User Interface as defined by the package org.havi.ui. In particular, much of the functionality defined herein takes the form of interfaces implemented by the concrete class used by a platform to support the org.havi.ui.HScreen class.

An HScreen instance may be one screen below. A Java type or a parameter is cited in English within quotation marks. A Java class is a set of various parameters and methods for objects of the same types, and a Java interface specifies abilities of objects which interoperate within a class. An exemplary embodiment according to the present invention can mange and configure a multiscreen and change the configuration through a method defined by each class. An instance is an object generated from a class.

Various methods, various fields, and various Java types in exemplary embodiments of a multiscreen management are defined in FIGS. 11A through 23D.

The OCAP MSM Extension defines an optional descriptor used to signal MSM-related behavior for an Xlet application. In the absence of such a descriptor, default semantics are defined.

The OCAP MSM Extension extends the OCAP Profile through the multiple screen usage descriptor as defined below. An OCAP application signaled in an AIT or in an XAIT may include one, but no more than one multiple screen usage descriptor in the application descriptor loop that applies to the application.

If no multiple screen usage descriptor is present in the application descriptor loop of some application, then an OCAP Host device may consider this to be equivalent to the presence of a multiple screen usage descriptor whose terminate_on_condition flag is clear '0', whose disallow_partial_display_graphics_mapping flag is clear '0', and whose allow_default_device_reconfig flag is clear '0'.

The effect produced by the above is such that, by default, (1) an application default graphics plane can be scaled (along with its default background and video planes) to a portion of a display screen through the means of an intermediate logical screen, (2) an application default screen device cannot be arbitrarily reconfigured or unresourced, and (3) if this last condition would necessarily hold, then the application is suspended, or, if suspension is not possible, terminated. In the specification, the term 'suspend' is used when an application temporarily stops a process while continuously using a resource. Also, the term 'terminate' is used when an application unresources and completely ends a process.

A multiple screen usage descriptor includes descriptor_tag, descriptor_length, terminate_on_condition, disallow_partial_display_graphics_mapping, allow_default_device_reconfig, and reserved.

Descriptor_tag is an 8-bit unsigned integer with the value 0x6E that identifies this multiscreen usage descriptor.

Descriptor_length is an 8-bit unsigned integer that specifies the number of bytes immediately following this field. For this specification, exactly one byte may follow the descriptor_length field.

Terminate_on_condition is a 1-bit flag indicating the desired effect on this application lifecycle in the case that either 'disallow_partial_display_graphics_mapping' is set '1' or 'allow_default_device_reconfig' is clear '0', and the condition specified by one of these two respective flags requires application suspension or termination.

If this flag is set '1', then the OCAP platform may terminate (destroy) the application on the onset of the governing condition; otherwise, if this flag is clear '0', then the OCAP platform may attempt to suspend the application, and, if unable to suspend, may terminate the application on the onset of the governing condition.

If an application is suspended as a result of this flag being false, then when no governing condition is obtained, the application should be resumed, but if resumption is not possible, e.g., due to insufficient resource availability, may be terminated (destroyed).

In the present context, the term 'suspend' is to be interpreted as equivalent to invoking the 'pauseXlet( )' method of the affected application initial Xlet instance.

Disallow_partial_display_graphics_mapping is a 1-bit flag indicating that the application cannot continue to run when multiscreen configuration changes or service contexts are swapped or moved between screens such that the application default graphics plane (screen device) would be scaled to operate in a logical screen whose screen area is not mapped to full display screen extent.

If the disallow_partial_display_graphics_mapping is set '1', then the application may be suspended or terminated on the onset of this condition according to the value of the 'terminate_on_condition' flag above; otherwise, if the disallow_partial_display_graphics_mapping is clear '0', then the application is not suspended or terminated on the onset of this condition.

Allow_default_device_reconfig is a 1-bit flat indicating that the application can continue to run when a multiscreen configuration changes or service contexts are swapped or moved between screens such that (1) one or more of the following screen device configuration (HScreenConfiguration) parameters of some default screen device would change: screen area, pixel resolution, or pixel aspect ratio; or (2) the underlying resources of one or more default screen devices that were present before the configuration change or service context swap/move are no longer available after the configuration change or service context swap/move.

If the 'Allow_default_device_reconfig' is clear '0', then the application may be suspended or terminated on the onset of this condition according to the value of the 'terminate_on_condition' flag above; otherwise, if the 'Allow_default_device_reconfig' is set '1', then the application is not suspended or terminated on the onset of this condition.

An application that signals the 'allow_default_device_reconfig' flag in the set '1' state is expected to register listeners for and process both org.havi.ui.HScreenConfigurationEvent and org.ocap.ui.MultiScreenEvent Java types.

Reserved is a field that is reserved for future standardization and may have a value consisting of all '1'.

An application program interface for the OCAP MSM Extension will now be explained.

An exemplary embodiment of the present invention will now be explained with a Java type. However, the exemplary embodiments are not limited to the Java type and it will be understood by those of ordinary skill in the art that various methods for achieving objective and effect of the present invention can be used.

The OCAP MSM Extension defines a collection of functionality and behaviors to permit the effective use of multiple displays and multiple logical screens on platform implementations that support these attributes. The MSM Extension extends the OCAP Profile through the addition of the Multiple Screen Management functionality specified below.

OCAP Host devices that support the OCAP MSM Extension may implement semantics as specified by the following sub-sections.

MSM will now be explained.

The default HScreen for an OCAP application is an HScreen instance that represents the currently active set of default underlying screen devices and their currently active HAVi screen configurations.

Further information on an application's default HScreen is described in detail in a Default HScreen Assignment and 'MultiScreenManager.getDefaultHScreen( )' method.

An OCAP Host device that implements the MultiscreenManager class may provide a distinct logical HScreen instance for each secondary and primary viewing screen that is exposed to the OCAP implementation, i.e., both PIP and non-PIP viewing screens.

Screens will now be explained.

The HAVi User Interface sub-system (referred to as the baseline HAVi model) defines the 'HScreen class' to be a description of "the final output composition of a device", and indicates that "a platform with two independent displays would support two instances of this class". With the introduction of the MSM Extension, this definition is extended to introduce a distinction between a display screen and a logical screen.

First, the 'HScreen' class extended from the 'display screen' will now be explained.

A screen that models a "final output composition of a physical display device" is referred to by MSM as a 'display screen'. In contrast, a screen that is mapped to a display screen through a logical coordination system transformation process, either through hardware or software, is referred to as a 'logical screen'.

A display screen is associated with (mapped to) zero or more video output ports, which can be individually enabled or disabled as defined by VideoOutputPort. If a display screen is not associated with any video output port, then any presentation that is active in the context of the display screen is not rendered by a presentation device.

In the context of MSM, audio outputs and their association with a display screen for the purpose of rendering audio content are considered to be implied by the video output port associations of the display screen.

A display screen designates itself or one of the logical screens that map to it to be its 'audio focus screen'. The 'audio focus screen' is used to determine which audio sources are rendered on any (implied) audio outputs associated with the video output ports to which the display screen is mapped. In an exemplary embodiment, the audio outputs may be embedded audio outputs. This distinction is required only when there are multiple logical screens that are simultaneously mapped to and presenting on a display screen, such as would be the case in either a PIP or POP multiscreen configuration.

If no logical screen is mapped to a display screen, or audio focus is not associated with such a logical screen, then audio focus is assigned to the display screen itself In this case, any HScreenDevice instances associated with the display screen become potential candidates as audio sources.

A logical screen is a natural extension of the baseline HAVi model of an HScreen where one reads “device” in the phrase “the final output composition of a device” as a “logical device” as opposed to a physical device. This extension is not dissimilar to the commonly understood notion of a logical disk drive, where a portion of a physical disk drive is viewed as if it were an independent disk drive in its own right.

From the perspective of an OCAP application, a logical screen is for all intents and purposes the same as a display screen. It possesses all of the standard attributes and behaviors of an existing (non-multiscreen) HScreen instance: a set of default screen background, video, and graphics screen devices, an optional set of non-default screen devices of these same types, one or more sets of coherent screen device configurations, an ability to atomically modify a set of screen devices in order to establish a coherent set of screen configurations for these devices, and a mechanism for determining the best configuration of a screen device of a specific type given a screen device configuration template.

Each logical screen possesses its own, independent, normalized screen coordinate space as defined by the baseline HAVi model. A logical screen is typically associated with a display screen and a display area on that display screen. Through this association, the normalized screen coordinate space of a logical screen is mapped to a screen rectangle in the normalized screen coordinate space of the display screen. Although a display area is presented with the screen rectangle hereinafter for convenience of explanation, the present invention is not limited to the rectangle.

This screen rectangle (hereinafter referred to as display area) may coincide with the entire display screen, in which case the mapping is an identity mapping between the two normalized screen coordinate spaces.

Or, the screen rectangle may coincide with a portion of the display screen. In this case, the display area may be wholly contained within the visible region of the display screen, or it may be wholly outside the visible region of the display screen. Or, the screen rectangle may intersect with both visible and non-visible (external) parts of the display screen.

If some portion of the display area extends outside the visible display area of the display screen (i.e., outside screen rectangle [0,0],[1,1] of the display screen), then it is an implementation option whether or not areas are externally clipped to the (nominally) visible region of the display screen.

Each logical screen possesses a set of default screen devices, each represented as an HScreenDevice instance of a specific sub-type: HBackgroundDevice, HVideoDevice, or HSGraphicsDevice. In addition, like the baseline HAVi model, each logical screen can possess a set of additional non-default screen devices of each of these sub-types.

As with the baseline HAVi model, each underlying screen device resource utilized by a logical screen is referenced through a standard sub-type of the HScreenDevice class, and each of these screen devices possesses its own set of configuration parameters as defined by the baseline HAVi model and represented by means of a standard sub-type of the HScreenConfiguration class.

For example, one such parameter is modeled by a template preference HScreenConfigurationTemplate.PIXEL_RESOLUTION, and is accessible using a helper function ‘HScreenDevice.getPixelResolution( )’. As is the case with HScreenDevice instances in a non-multiscreen implementation of the baseline HAVi model, this parameter is also present and accessible through the same methods when referencing a screen device of a logical screen.

However, in the case of a logical screen as defined here, the pixel resolution refers to the resolution of the screen device in the context of the normalized coordinate space of the logical screen, and not the display screen to which this logical screen is mapped. Ultimately, the pixel resolution of a screen device of a logical screen does map, by means of a second order coordinate space transformation, to the normalized screen coordinate space of a display screen. However, an application that is using the logical screen need not be aware of this second order transformation, since from a logical processing perspective, the logical screen is not different from a final output signal to a real physical display device.

The mapping between a logical screen’s normalized coordinate space and the associated display area in the display screen’s normalized coordinate space (the second order coordinate space transformation cited above), referred to hereinafter as a display mapping, is defined as a logical mapping process, which is to say that an MSM implementation need not dedicate a specific hardware component to this mapping process.

For example, one implementation choice is to (internally) model the union of all sets of (resource-assigned) screen devices of all logical screens that map to a specific display screen as a single set of screen devices in that single display screen, where certain constraints regarding pixel coherency and z-order among this set of screen devices apply.

In particular, if some set of pixel coherency rules apply to a given (sub)set of screen devices in some logical screen, then those pixel coherency rules also apply when those screen devices are considered as part of the larger set of (notionally mapped) screen devices in the display screen.

Similarly, the z-order of the (notionally mapped) screen devices in the display screen must respect (1) the z-ordering of screen devices within each logical screen, and (2) the z-ordering between logical screens. In other words, the (notionally mapped) screen devices of the different logical screens are not interleaved.

Whether the display mapping process (from a logical to a display screen) is performed by logical or physical (hardware) means, the entity that effects this process is referred to as a display mapper for a given <logical screen, display screen> pair.

A video output port association of a logical screen will now be explained.

Under typical circumstances, a logical screen is indirectly associated with a video output port by virtue of being mapped to a display screen where the display screen is directly associated with a video output port. However, in order to permit more flexibility, MSM allows a logical screen to be directly associated with a video output port.

A logical screen may be directly associated with a video output port in two circumstances: (1) when the logical screen is orphaned, i.e., is not mapped to any display screen but is independently operating as if it were a display screen (in which case it can be directly associated with a video output port), and (2) when the logical screen is parented to a display screen and thus is indirectly associated with the display screen’s video output port associations, and, at the same time, is independently operating as if it were a display screen and is additionally directly associated with another video output port. Examples of cases that embody these two circumstances are described as follows, respectively.

1. An orphaned logical screen is attached to a service context whose content is being recorded, e.g., by digital video recorder (DVR) functionality, and it is desired to simultaneously output this content to an auxiliary video output port, e.g., a 1394 or an NTSC composite port.

2. A logical screen is presenting as a PIP screen mapped to a display screen in a PIP multiscreen configuration (wherein a Main screen is also simultaneously presenting) and this display screen is associated with the primary video output port; in addition, it is desired that this PIP logical screen be output directly to an auxiliary video output port, e.g., a 1394 or an NTSC composite port.

Logical screens are indirectly associated with audio output ports either through (1) indirect association with a video output port through being mapped to a display screen, or (2) directly association with a video output port similarly to the video output port association.

When multiple logical screens are mapped to a display screen, only one of the logical screens typically contributes audio sources for rendering at a given time. This one logical screen is designated as the audio focus screen of a display screen, and is determined by using a 'MultiScreenConfigurableContext.assignAudioFocus( )' method.

Because a single logical screen may have multiple sources of audio, as derived from both its default HScreenDevice instances as well as non-default instances, it is desirable to control which of these instances contributes to the logical screen's combined audio output. These sources are determined by using 'MultiScreenConfigurableContext.add, removeAudioSources(..)' methods.

Screen categories will now be explained.

Each screen in a multiscreen configuration is assigned to one of the following pre-defined screen categories or a platform-dependent category whose string representation starts with 'x-': 'None(SCREEN_CATEGORY_NONE)', 'Display(SCREEN_CATEGORY_DISPLAY)', 'Main (SCREEN_CATEGORY_MAIN)', 'PIP(SCREEN_CATEGORY_PIP)', 'POP(SCREEN_CATEGORY_POP)', 'Overlay(SCREEN_CATEGORY_OVERLAY)', and 'General(SCREEN_CATEGORY_GENERAL)'.

These screen categories are defined formally as an extensible String enumeration by the above specified fields of MultiScreenConfiguration. A screen is categorized as SCREEN_CATEGORY_NON only if no more specific category applies.

'Screen Identifier' will now be explained.

Each identifiable set of screen resources that collectively represents a display or logical screen is assigned a unique (string) identifier, where the scope of uniqueness includes all screens accessible through all active multiscreen configurations at a given time. An implementation of MSM may enlarge this scope of uniqueness to include all non-active multiscreen configurations at a given time, and furthermore, may enlarge the scope to include all continuous time durations over which the platform operates (between cold boot cycles).

An MSM implementation that supports dynamic, run-time addition of display screens or of logical screens may be prepared to assign identifiers, at the time of addition, that maintain the above constraints on minimum scope of uniqueness.

A multiscreen configuration includes a per-platform display multiscreen configuration and a per-display multiscreen configuration.

At any given time, a specific (usually, but not necessarily proper) subset of display screens is active in the context of an MSM implementation in the sense that these display screens, if marked as visible, are simultaneously presenting content or are able to present content from one or more logical screens. Such a subset of display screens is referred to as per-platform display multiscreen configuration and is modeled by MSM using an object that implements the MultiScreenConfiguration interface and where the getConfigurationType( ) method of this interface returns MultiScreenConfiguration.SCREEN_CONFIGURATION_DISPLAY.

The currently active per-platform multiscreen configuration may be obtained with 'MultiScreenManager.getMultiScreenConfiguration( )' and established with 'MultiScreenManager.setMultiScreenConfiguration( )'.

In addition, for each display screen that participates in a platform multiscreen configuration, there exists a specific (usually proper) subset of (extant) logical screens that is active in the context of that display screen such that, if some such logical screen is marked as visible, then it is simultaneously presenting content or is able to present content from one or more service contexts or media players. Such a subset of logical screens is referred to as a per-display multiscreen configuration and is modeled by MSM using an object that implements the MultiScreenConfiguration interface. The getConfigurationType( ) method of the MultiScreenConfiguration interface returns a value other than MultiScreenConfiguration.SCREEN_CONFIGURATION_DISPLAY.

The currently active per-display multiscreen configuration of a specific display screen may be obtained with the MultiScreenContext.getMultiScreenConfiguration( ) method and established with MultiScreenConfigurableContext.setMultiScreenConfiguration( ). The set of all accessible usable per-display multiscreen configurations (which may be used with a specific display screen) may be obtained with MultiScreenContext.getMultiScreenConfigurations( ).

The set of all accessible multiscreen configurations (whether presently in use or not in use, and whether a per-platform or per-display multiscreen configuration) may be obtained with MultiScreenManager.getMultiScreenConfigurations( ).

For each non-terminated OCAP application, the underlying resources of exactly one HScreen instance of some currently active multiscreen configuration of a display screen of the currently active per-platform multiscreen configuration may be the same as (equivalent to) the underlying resources of the default screen of the OCAP application.

Each set of screens that is modeled as a multiscreen configuration is assigned one of the following pre-defined configuration types or a platform-dependent configuration type whose string representation starts with "x-".

The multiscreen configuration type includes:
Display (SCREEN_CONFIGURATION_DISPLAY),
Non-PIP (SCREEN_CONFIGURATION_NON_PIP),
PIP (SCREEN_CONFIGURATION_PIP),
POP (SCREEN_CONFIGURATION_POP), and
General (SCREEN_CONFIGURATION_GENERAL).

These configuration types are defined formally as an extensible String enumeration by the above specified fields of the MultiScreenConfiguration interface.

A multiscreen configuration designates one of its accessible screens to be the default service context association screen. This screen is used to determine the default association between a service context and a screen in the absence of more specific association information.

Each pre-defined multiscreen configuration type defines a specific screen to be its initial default service context association screen. Subsequent to platform boot time, the default service context association screen of a multiscreen configuration may be changed by using MultiScreenConfiguration.setDefaultServiceContextScreen(..). The current default service context association screen of a multiscreen configuration may be obtained by using MultiScreenConfiguration.getDefaultServiceContextScreen( ).

For more information, MultiScreenManager.setMultiScreenConfiguration(..), MultiScreenConfigurableContext.setMultiScreenConfiguration(..), and specifically, the serviceContextAssociations parameter of these methods will now be explained.

A default multiscreen configuration includes a default per-platform multiscreen configuration and a default per-display multiscreen configuration.

After performing a cold boot (or restart) of an OCAP Host Device that implements the MSM Extension, the default (initially active) per-platform multiscreen configuration may be the same multiscreen configuration that was active prior to cold restart. If no prior per-platform multiscreen configuration is known, then the default per-platform multiscreen configuration may be the first multiscreen configuration returned by MultiScreenManager.getMultiScreenConfigurations (SCREEN_CONFIGURATION_DISPLAY) that is associated with a display screen, which, in turn, is associated with a per-display multiscreen configuration of configuration type SCREEN_CONFIGURATION_NON_PIP.

Similarly, the default (initially active) per-display multiscreen configuration of each display screen of the default per-platform multiscreen configuration may be the same multiscreen configuration that was active prior to cold Restart. If no prior per-display multiscreen configuration is known for some display screen, then it may be the first multiscreen configuration of configuration type SCREEN_CONFIGURATION_NON_PIP that is returned by MultiScreenContext.getMultiScreenConfigurations(SCREEN_CONFIGURATION_NON_PIP) on that display screen.

When performing any other type of (non-cold) restart, reboot, or reset of an OCAP Host Device or OCAP environment that implements the MSM Extension, then the default (initially active) multiscreen configuration may be the same multiscreen configuration that was active prior to non-cold restart, reboot, or environment reset.

Definition of a screen device will now be explained.

A HScreen instance represents a single independent video output signal from a device. Devices with multiple independent video output signals should support multiple instances of a HScreenDevice class. A video output signal is created by adding together the contributions from the devices represented by a number of objects inheriting from the HScreenDevice class. These objects can be HGraphicsDevice objects, HVideoDevice objects, and HBackgroundDevice objects. A given HScreen may support any number of any of these objects as far as the API is concerned. However, some form of profiling may restrict the number of the objects. At the present time, one instance of each is all that may reasonably be expected to be present.

A HBackgroundDevice class represents the ultimate background of a screen, that is, a background color and a background image. The background is the very back of the video/graphics composition stack. The background can potentially cover the entire area of a screen. When a device supports multiple applications on screen at the same time (or even a window manager), the background is not constrained by any particular application or window. The right to control the background of a screen is a scarce resource and managed as such.

A HGraphicsDevice class describes the raster graphics devices that are available for a particular HScreen. Each HGraphicsDevice has one or more HGraphicsConfiguration objects associated with the HGraphicsDevice. These objects specify the different configurations (settings) in which the HGraphicsDevice can be used.

An HVideoDevice class describes the logical video devices which can contribute to the appearance of a particular screen. Each HVideoDevice has one or more HVideoConfiguration objects associated with The HVideoDevice. These objects specify the different configurations (settings) in which the HVideoDevice can be used. The HVideoDevice class represents the presentation only of video and does not provide for the selection of which video is to be presented.

The HScreenDevice class, the HBackgroundDevice class, the HGraphicsDevice class, and HVideoDevice class are defined in the ‘org.havi.ui’ package for HAVi User Interface.

The public class HBackgroundDevice extends HScreenDevice. The HBackgroundDevice class describes a background device represented by objects inheriting from the HScreenDevice class.

The public class HGraphicsDevice extends HScreenDevice. The HGraphicsDevice class describes a graphics device represented by objects inheriting from the HScreenDevice class.

The public class HVideoDevice extends HScreenDevice. The HVideoDevice class describes a video device represented by objects inheriting from the HScreenDevice class.

Changing Multiscreen Configurations will now be explained.

A current multiscreen configuration may be changed by a privileged application (to which MonitorAppPermission (“multiscreen.configuration”) has been granted) by means of the setMultiScreenConfiguration(..) or requestMultiScreenConfigurationChange(..) method of either the MultiScreenManager instance or the MultiScreenConfigurableContext interface of some display screen. In addition, the current multiscreen configuration may be changed by the Host device itself as a result of other events not defined by this specification. For example, a manufacturer could provide an explicit remote control key that causes a specific multiscreen configuration to be activated.

Regardless of what causes the current multiscreen configuration to be changed, the following constraints may apply:

1. prior to the change, the preconditions specified below apply;

2. during the change, the change processing steps specified below apply, during which time the dynamic state invariants specified below apply; and 3. subsequent to the change, the postconditions specified below apply.

For the purpose of enhanced interoperability, a number of these preconditions and postconditions are expressed in pseudo-code form in the form of assertions in FIGS. 24A through 24C and 25A through 25E. The constraints expressed in FIGS. 24A through 24C and 25A through 25E are intended to be consistent with the descriptive text that appears in the following sub-sections. To avoid ambiguity, the following descriptive text takes priority over codes of FIGS. 24A through 24C and FIG. 25A through FIG. 25E in case of a discrepancy or partial coverage by the coded form.

Notwithstanding this prioritization, FIGS. 24A through 24C and FIG. 25A through FIG. 25E may apply for the purpose of determining conformance of an interoperable implementation of the MSM Extension.

Preconditions for changing multiscreen configurations will now be explained.

Prior to a MultiScreenConfigurationEvent.MULTI_SCREEN_CONFIGURATION_CHANGING event that is generated as a result of a multiscreen configuration change, the following ordered preconditions may hold.

1. The Quiescent State Invariants defined below must be satisfied.

Change Processing Steps will now be explained.

The MSM implementation may perform the following ordered steps in order to effect a change to the current multiscreen configuration.

1. Generate a MultiScreenConfigurationEvent. MULTI_SCREEN_CONFIGURATION_CHANGING event for application dispatching.

2. Starting at this time and until the time that MultiScreenConfiguration-Event.MULTI_SCREEN_CONFIGURATION_CHANGED is generated, do not permit an OCAP application to (1) change the current multiscreen configuration, (2) reserve an HScreen or an HScreenDevice and their underlying resources, or (3) perform a screen device configuration change or a multiscreen screen context state change.

3. For each OCAP application that has been granted MonitorAppPermission("multiscreen.configuration"), invoke the notify( ) method of any registered MultiScreenConfigurationListener, providing as an argument the MultiScreenConfigurationEvent.

MULTI_SCREEN_CONFIGURATION_CHANGING generated above.

All such registered listeners may be invoked prior to continuing to the next step. However, an MSM implementation is not required to wait for any or all listeners to return from the notify( ) method prior to continuing.

4. For any HScreen instance whose MultiScreenContext accessible state will or may change as a result of this change to the current multiscreen configuration, then, if the HScreen instance is currently reserved by some OCAP application other than the application that invoked the setMultiScreenConfiguration(..) method or reserved by any OCAP application in case this change is a result of a Host device-initiated change (without explicit invocation of this method by an OCAP application), then, for each HScreenDevice referenced by the reserved HScreen, and, while deferring the notification of any generated HScreenDeviceReleasedEvent instances, invoke the releaseDevice( ) method and, if necessary, invoke the releases method of the ResourceClient that holds the reservation.

5. For any HScreenDevice instance whose HScreenConfiguration accessible state will or may change as a result of this change to the current multiscreen configuration, then, if the HScreenDevice instance is currently reserved by some OCAP application other than the application that invoked the setMultiScreenConfiguration(..) method or reserved by any OCAP application in case this change is a result of a Host device-initiated change (without explicit invocation of this method by an OCAP application), then, for that HScreenDevice, and, while deferring the notification of any generated HScreenDeviceReleasedEvent instances, invoke the releaseDevice( ) method, and, if necessary, invoke the releases method of the ResourceClient that holds the reservation.

6. For any HScreenDevice instance whose HScreenConfiguration accessible state will or may change as a result of this change to the current multiscreen configuration, generate, but defer notification of, a corresponding HScreenConfigurationEvent instance.

7. For any HScreen instance whose MultiScreenContext accessible state will or may change as a result of this change to the current multiscreen configuration, generate, but defer notification of, a corresponding MultiScreenContextEvent instance.

8. If any MultiScreenConfigurationListener whose notify( ) method was invoked in step (3) above has not yet returned, then wait until either (1) all such notify( ) methods have returned or (2) a time period of at least five seconds and no greater than 30 seconds (in real-time) has elapsed since the first such method was invoked.

9. Perform all changes necessary to satisfy the postconditions specified below.

10. For each HScreenDeviceReleasedEvent instance generated above and in the generated order, then, for each OCAP application, invoke the statusChanged( ) method of any registered ResourceStatusListener, providing as an argument the HScreenDeviceReleasedEvent instance.

11. For each HScreenConfigurationEvent instance generated above and in the generated order, then, for each OCAP application, invoke the report( ) method of any registered HScreenConfigurationListener, providing as an argument the HScreenConfigurationEvent instance.

12. For each MultiScreenContextEvent instance generated above and in the generated order, then, for each OCAP application, invoke the notify( ) method of any registered MultiScreenContextListener, providing as an argument the MultiScreenContextEvent instance.

13. Generate a MultiScreenConfigurationEvent.MULTI_SCREEN_CONFIGURATION_CHANGED event for application dispatching.

14. For each OCAP application, invoke the notify( ) method of any registered MultiScreenConfigurationListener, providing as an argument the MultiScreen-Configuration-Event.MULTI_SCREEN_CONFIGURATION_CHANGED generated above.

Postconditions of a multiscreen configuration change will now be explained.

Subsequent to a MultiScreenConfigurationEvent.MULTI_SCREEN_CONFIGURATION_CHANGED event that is generated as a result of a multiscreen configuration change, the following ordered postconditions may hold.

1. The Quiescent State Invariants defined below must be satisfied.

2. The current multiscreen configuration is the new configuration.

3. The new default screen must be a same (Object) instance as the old default screen.

4. If default background screen devices exist in the default screen in both old and new multiscreen configurations, then, unless the application signals allow_default_device_reconfig as '1', a. the new default background screen device must be the same instance as the old default background screen device, and b. the new default background screen device must have same screen area, pixel resolution, and pixel aspect ratio as it did with the old default background screen device.

If the application signals allow_default_device_reconfig as '1' and a default background screen device exists in the old multiscreen configuration, but not in the new multiscreen configuration, then any reference to the old default background screen device must be reset so as to be equivalent to the empty background screen device.

5. If default video screen devices exist in the default screen in both old and new multiscreen configurations, then, unless the application signals allow_default_device_reconfig as '1', a. the new default video screen device must be the same instance as the old default video screen device, and b. the new default video screen device must have same screen area, pixel resolution, and pixel aspect ratio as it did with the old default video screen device.

If the application signals allow_default_device_reconfig as '1' and a default video screen device exists in the old multiscreen configuration, but not in the new multiscreen configuration, then any reference to the old default video screen device must be reset so as to be equivalent to the empty video screen device.

6. If default graphics screen devices exist in the default screen in both old and new multiscreen configurations, then, unless the application signals allow_default_device_reconfig as '1', a. the new default graphics screen device must be the same instance as the old default graphics screen device, and b. the new default graphics screen device must have same screen area, pixel resolution, and pixel aspect ratio as it did with the old default graphics screen device.

If the application signals allow_default_device_reconfig as '1' and a default graphics screen device exists in the old multiscreen configuration, but not in the new multiscreen configuration, then any reference to the old default graphics screen device must be reset so as to be equivalent to the empty graphics screen device.

7. For every non-default screen reference obtained prior to reconfiguration, if no longer a non-default screen, then it must be equivalent to an empty screen; otherwise, it must not be equivalent to an empty screen.

8. For every non-default screen device reference obtained prior to reconfiguration, if no longer a non-default screen device, then it must be equivalent to an empty screen device; otherwise, it must not be equivalent to an empty screen device.

Quiescent State Invariants will now be defined.

Prior to a MultiScreenConfigurationEvent.MULTI_SCREEN_CONFIGURATION_CHANGING event and subsequent to a corresponding MultiScreenConfiguration Event.MULTI_SCREEN_CONFIGURATION_CHANGED event, the following ordered invariants may hold true:

1. There must be a current, non-changing multiscreen manager;

2. There must be a current, non-changing per-platform multiscreen configuration;

3. There must be a current, non-changing per-display multiscreen configuration for each display screen;

4. There must be a non-empty, non-changing set of accessible multiscreen configurations;

5. The current per-platform multiscreen configuration must be an accessible configuration (for an appropriately privileged application);

6. Each current per-display multiscreen configuration must be an accessible configuration (for an appropriately privileged application);

7. There must be a non-empty, non-changing set of screens in the current per-platform multiscreen configuration;

8. There must be a non-empty, non-changing set of screens in each current per-display multiscreen configuration;

9. The screens in the current per-platform multiscreen configuration must not be empty;

10. The screens in each current per-display multiscreen configuration must not be empty;

11. Any two distinct screen entries in any current multiscreen configuration must not represent the same resources;

12. There must be a current default screen;

13. The current default screen must not be equivalent to the empty screen;

14. Exactly one screen entry in some current multiscreen configuration must represent the same resources as the default screen;

15. There must be a non-empty set of accessible screens;

16. The current default screen must be a distinct member of the set of accessible screens;

17. Any background screen device of the current default screen must not be equivalent to the empty background screen device;

18. Any video screen device of the current default screen must not be equivalent to the empty video screen device;

19. Any graphics screen device of the current default screen must not be equivalent to the empty graphics screen device.

Dynamic State Invariants will now be defined.

Subsequent to a MultiScreenConfigurationEvent.MULTI_SCREEN_CONFIGURATION_CHANGING event and prior to a corresponding MultiScreenConfiguration-Event.MULTI_SCREEN_CONFIGURATION_CHANGED event, the following ordered invariants may hold true:

1. There must be a current, non-changing multiscreen manager;

2. There must be a current, but possibly changing, multiscreen configuration;

3. There must be a non-empty, possibly changing, set of accessible multiscreen configurations;

4. The current multiscreen configuration must be an accessible configuration;

5. There must be a non-empty, but possibly changing, set of screens in the current multiscreen configuration;

6. The screens in the current multiscreen configuration must not be empty;

7. Any two distinct screen entries in the current multiscreen configuration must not represent the same resources;

8. There must be a current, but possibly changing, default screen;

9. The current default screen must not be equivalent to the empty screen;

10. Exactly one screen entry in the current multiscreen configuration must represent the same resources as the default screen;

11. There must be a non-empty, but possibly changing, set of accessible screens;

12. The current default screen must be a distinct member of the set of accessible screens;

13. Any background screen device of the current default screen must not be equivalent to the empty background screen device;

14. Any video screen device of the current default screen must not be equivalent to the empty video screen device;

15. Any graphics screen device of the current default screen must not be equivalent to the empty graphics screen device.

Baseline HAVi Model Extensions to which exemplary embodiments of the present invention applies will now be explained.

The Multiple Screen Manager entails the use of certain behavioral and usage extensions to the Baseline HAVi Model, and in particular to the following HAVi defined types as described below.

As specified above, each HScreen instance is characterized as a display screen or a logical screen as defined by the Multiple Screen Manager.

A distinction is made by the Multiple Screen Manager regarding an HScreen instance and the underlying resources represented by such an instance. In particular, the following underlying state associated with an HScreen instance may change over its temporal extent.

That is, the number of underlying background screen devices, the screen device configuration (parameter set) of these underlying background screen devices, the underlying background screen device that is associated with the default HbackgroundDevice instance, the number of underlying video screen devices, the screen device configuration (parameter set) of these underlying video screen devices, the underlying video screen device that is associated with the default HVideoDevice instance, the number of underlying graphics screen devices, the underlying graphics screen device that is associated with the default HGraphicsDevice instance, and the screen device configuration (parameter set) of these underlying graphics screen devices may change over their temporal extent.

Each HScreen instance may implement the MultiScreenContext interface or, if the HScreen instance represents underlying screen resources that are configurable according to the functionality defined by MultiScreenConfigurableContext, then the HScreen instance may implement the MultiScreenConfigurableContext interface instead of MultiScreenContext (note that the MultiScreen ConfigurableContext interface is a subinterface of the MultiScreenContext interface).

The HScreen.getHScreens( ) static method may return the same value as MultiScreenManager.getInstance( ).get Screens( ).

The HScreen.getDefaultHScreen( ) static method may return the same value as MultiScreen-Manager.getInstance( ).getDefaultScreen( ).

Default HScreen Assignment will now be explained.

When an application is initially launched, the application may firstly be associated with a set of accessible screens as would be returned by HScreen.getHScreens( ) and secondly be assigned a default HScreen according to the following rules, where the first rule that applies is used and the remainders are ignored:

1. If the ServiceContext SC whose selected Service the application is signaled is associated with only one (underlying) screen, then that screen is used as the default screen.

2. Otherwise, if SC is associated with multiple (underlying) screens, then if one of these screens is categorized as a main screen, i.e., getScreenCategory( ) returns MultiScreenConfiguration.SCREEN_CATEGORY_MAIN, then the first such main screen appearing in the array of screens returned by HScreen.getHScreens( ) is used as the default screen.

3. Otherwise (associated with multiple screens none of which is a main screen), the first screen appearing in the array of screens returned by HScreen.getHScreens( ) is used as the default screen.

MSM introduces a specially defined HScreen instance known as an empty HScreen, which is a unique, immutable instance of (a sub-class of) the HScreen class which is used for the purpose of establishing a well-defined, known state in a (nominally non-empty) HScreen instance.

The empty HScreen, referred to as ES below, may satisfy the following constraints:

1. Within the scope of an application's reference, ES is a unique (object) instance;

2. ES implements the following interfaces: MultiScreenContext, MultiScreenConfigurableContext, ResourceProxy, and ResourceServer;

3. ES.getDefaultHBackgroundDevice( ) may return an HBackgroundDevice whose state is equivalent to the empty HBackgroundDevice defined below;

4. ES.getDefaultHVideoDevice( ) may return an HVideoDevice whose state is equivalent to the empty HVideoDevice defined below;

5. ES.getDefaultHGraphicsDevice( ) may return an HGraphicsDevice whose state is equivalent to the empty HScreenDevice defined below;

6. ES.getBestConfiguration(HBackgroundConfigTemplate hbc) may return ES.getDefaultBackgroundDevice( ).getBestConfiguration(hbc);

7. ES.getBestConfiguration(HVideoConfigTemplate hvc) may return ES.getDefaultVideoDevice( ).getBestConfiguration(hvc);

8. ES.getBestConfiguration(HGraphicsConfigTemplate hgc) may return ES.getDefaultGraphicsDevice( ).getBestConfiguration(hgc);

9. ES.getBackgroundDevices( ) may return new HBackgroundDevice[1] {ES.getDefaultHBackgroundDevice( )};

10. ES.getVideoDevices( ) may return new HVideoDevice [1] {ES.getDefaultHVideoDevice( )};

11. ES.getGraphicsDevices( ) may return new HGraphicsDevice[1] {ES.getDefaultHGraphicsDevice( )};

12. ES.getCoherentScreenConfigurations(..) may return null;

13. ES.setCoherentScreenConfigurations(..) may throw HConfigurationException;

14. ((MultiScreenContext)ES).getScreenType( ) may return MultiScreenContext. SCREEN_TYPE_LOGICAL;

15. ((MultiScreenContext)ES).getDisplayScreen( ) may return null;

16. ((MultiScreenContext)ES).getDisplayArea( ) may return null;

17. ((MultiScreenContext)ES).getOutputPorts( ) may return null;

18. ((MultiScreenContext)ES).getServiceContexts( ) may return new ServiceContext[0];

19. ((MultiScreenContext)ES).getVisible( ) may return false;

20. ((MultiScreenContext)ES).getZOrder( ) may return −1;

21. ((MultiScreenContext)ES).addScreenContextListener( ) may not produce any side effect;

22. ((MultiScreenConfigurableContext)ES).setDisplayScreen (..) may throw IllegalStateException unless SecurityException applies;

23. ((MultiScreenConfigurableContext)ES).setDisplayArea(..) may throw IllegalStateException unless SecurityException applies;

24. ((MultiScreenConfigurableContext)ES).setVisible(..) may throw IllegalStateException unless SecurityException applies;

25. ((MultiScreenConfigurableContext)ES).setZOrder(..) may throw IllegalStateException unless SecurityException applies;

26. ((MultiScreenConfigurableContext)ES).addOutputPort(..) may throw IllegalStateException unless SecurityException applies;

27. ((MultiScreenConfigurableContext)ES).addServiceContext(..) may throw IllegalStateException unless SecurityException applies;

28. ((ResourceProxy)ES).getClient( ) may return null.

If two HScreenDevice instances, SD1 and SD2, are equivalent with respect to their underlying resources, i.e., if sameResources(SD1,SD2) returns true, then SD1.getIDstring( ) may return the same value as SD2.getIDstring( ); otherwise, SD1.getIDstring( ) may return the same value as SD2.getIDstring( ).

Any attempt by an OCAP application to reserve an HScreenDevice whose underlying screen device resources are not contained wholly within the set of underlying screen device resources referenced by a currently active multiscreen configuration may cause an HPermissionDeniedException to be thrown.

The above constraint is intended to prevent an application from reserving a screen device resource where that resource is not included in the set of underlying resources represented by some currently active multiscreen configuration. Such situation may apply in the case of a partition of screen device resources between an active multiscreen configuration and some non-active multiscreen configuration.

Default HScreenDevice Assignment will now be explained.

The default set of accessible screen devices is assigned to an application by assigning a default screen as described above. Upon default assignment to HScreen S, the default screen devices assigned to the application may be determined by: S.getDefaultHBackgroundDevice( ), S.getDefaultHVideoDevice( ), and S.getDefaultHGraphicsDevice( ).

If the default screen has more than one screen device of a specific type, then the process for determining which of these screen devices is the default screen device of that specific type for that screen may remain platform dependent, and such assignment may not be relied upon by an interoperable application.

MSM introduces a specially defined set of empty HScreenDevice instances of the defined sub-types: HBackgroundDevice, HVideoDevice, and HGraphicsDevice. These instances, referred to as ED below, may satisfy the following constraints in addition to their sub-type specific constraints defined under the subsequent sub-headings:

1. ED.getIDString( ) may return the empty string “”;
2. ED.getScreenAspectRatio( ) may return new Dimension( );
3. ED.addMultiScreenConfigurationListener(..) may not produce any side effect;
4. ED.reserveDevice(ResourceClient) may return false;
5. ED.releaseDevice( ) may not produce any side effect;
6. ED.getClient( ) may return null.

The empty HBackgroundDevice, referred to as EBD below, may satisfy the following constraints:

1. Within the scope of an application’s reference, EBD is a unique (object) instance;
2. EBD may satisfy the constraints specified for empty HScreenDevice above;
3. EBD.getDefaultConfiguration( ) may return the empty HbackgroundConfiguration as defined below;
4. EBD.getCurrentConfiguration( ) may return the same value as EBD.getDefaultConfiguration( );
5. EBD.getBestConfiguration(..) may return the same value as EBD.getDefaultConfiguration( );
6. EBD.getConfigurations( ) may return new HBackgroundConfiguration[1] {getDefaultConfiguration( )};
7. EBD.setBackgroundConfiguration( ) may throw HConfigurationException unless SecurityException or HPermissionDeniedException applies.

The empty HVideoDevice, referred to as EVD below, may satisfy the following constraints:

1. Within the scope of an application’s reference, EVD is a unique (object) instance;
2. EVD may satisfy the constraints specified for empty HScreenDevice above;
3. EVD.getDefaultConfiguration( ) may return the empty HVideoConfiguration as defined below;
4. EVD.getCurrentConfiguration( ) may return the same value as EVD.getDefaultConfiguration( );
5. EVD.getBestConfiguration(..) may return the same value as EVD.getDefaultConfiguration( );
6. EVD.getConfigurations( ) may return new HVideoConfiguration[1] {getDefaultConfiguration( )};
7. EVD.setVideoConfiguration( ) may throw HConfigurationException unless SecurityException or HPermissionDeniedException applies.

The empty HGraphicsDevice, referred to as EGD below, may satisfy the following constraints:

1. Within the scope of an application’s reference, EGD is a unique (object) instance;
2. EGD may satisfy the constraints specified for empty HScreenDevice above;
3. EGD.getDefaultConfiguration( ) may return the empty HGraphicsConfiguration as defined below;
4. EGD.getCurrentConfiguration( ) may return the same value as EGD.getDefaultConfiguration( );
5. EGD.getBestConfiguration(..) may return the same value as EGD.getDefaultConfiguration( );
6. EGD.getConfigurations( ) may return new HGraphicsConfiguration[1] {getDefaultConfiguration( )};
7. EGD.setGraphicsConfiguration( ) may throw HConfigurationException unless SecurityException or HPermissionDeniedException applies.

MSM introduces a specially defined set of empty HScreenConfiguration instances of the defined sub-types: HBackgroundConfiguration, HVideoConfiguration, and HGraphics Configuration.

An instance of an empty HScreenConfiguration, referred to as EC below, may satisfy the following constraints in addition to their sub-type specific constraints defined under the subsequent sub-headings:

1. EC.convertTo(..) may return null;
2. EC.getFlickerFilter( ) may return false;
3. EC.getInterlaced( ) may return false;
4. EC.getOffset(..) may return new Dimension( );
5. EC.getPixetAspectRatio( ) may return new Dimension( );
6. EC.getPixelResolution( ) may return new Dimension( );
7. EC.getScreenArea( ) may return new HScreenRectangle (0,0,0,0).

The empty HBackgroundConfiguration, referred to as EBC below, may satisfy the following constraints:

1. Within the scope of an application’s reference, EBC is a unique (object) instance;
2. EBC may satisfy the constraints specified for empty HScreenConfiguration above;
3. EBC.getDevice( ) may return the empty HBackgroundDevice instance defined above;
4. EBC.getConfigTemplate( ) may return the empty BackgroundConfigTemplate defined below;
5. EBC.getColor( ) may return new Color(0,0,0);
6. EBC.setColor( ) may throw HConfigurationException.

The empty HVideoConfiguration, referred to as EVC below, may satisfy the following constraints:

1. Within the scope of an application’s reference, EVC is a unique (object) instance;
2. EVC may satisfy the constraints specified for empty HScreenConfiguration above;
3. EVC.getDevice( ) may return the empty HVideoDevice instance defined above;
4. EVC.getConfigTemplate( ) may return the empty HVideoConfigTemplate defined below.

The empty HGraphicsConfiguration, referred to as EGC below, may satisfy the following constraints:

1. Within the scope of an application’s reference, EGC is a unique (object) instance;
2. EGC may satisfy the constraints specified for empty HScreenConfiguration above;
3. EGC.getDevice( ) may return the empty HGraphicsDevice instance defined above;

4. EGC.getConfigTemplate( ) may return the empty HGraphicsConfigTemplate defined below;
5. EGC.getAllFonts( ) may return new Font[0];
6. EGC.getCompatibleImage(Image input, HImageHints hints) may return input;
7. EGC.getComponentHScreenRectangle(..) may return null;
8. EGC.getPixelCoordinatesHScreenRectangle(..) may return new Rectangle( );
9. EGC.getPunchThroughToBackgroundColor(..) may return null;
10. EGC.dispose(Color) may not produce any side effect.

MSM introduces a specially defined set of empty HScreenConfigTemplate instances of the defined sub-types: HBackgroundConfigTemplate, HVideoConfigTemplate, and HGraphicsConfigTemplate.

An instance of an empty HScreenConfigTemplate, referred to as ET below, may satisfy the following constraints in addition to their sub-type specific constraints defined under the subsequent sub-headings:

1. ET.getPreferenceObject(int) may throw IllegalArgumentException;
2. ET.getPreferencePriority(int) may return HScreenConfigTemplate.DONT_CARE;
3. ET.setPreference(int,int) may throw an IllegalArgumentException;
4. ET.setPreference(int,Object,int) may throw an IllegalArgumentException.

The empty HBackgroundConfigTemplate, referred to as EBT below, may satisfy the following constraints:

1. Within the scope of an application's reference, EBT is a unique (object) instance;
2. EBT may satisfy the constraints specified for empty HScreenConfigTemplate above;
3. EBT.isConfigSupported(HBackgroundConfiguration) may return false.

The empty HVideoConfigTemplate, referred to as EVT below, may satisfy the following constraints:

1. Within the scope of an application's reference, EVT is a unique (object) instance;
2. EVT may satisfy the constraints specified for empty HScreenConfigTemplate above;
3. EVT.isConfigSupported(HVideoConfiguration) may return false.

The empty HGraphicsConfigTemplate, referred to as EGT below, may satisfy the following constraints:

1. Within the scope of an application's reference, EGT is a unique (object) instance;
2. EGT may satisfy the constraints specified for empty HScreenConfigTemplate above;
3. EGT.isConfigSupported(HGraphicsConfiguration) may return false.

HvideoDevice will now be explained.

If the use of some mechanism defined by this specification permits more than one video pipeline (including at least a video decoder and a decoder format conversion component) to be associated with (mapped to) the underlying video screen device resources represented by an HVideoDevice instance, then one of these pipelines is designated as the contributing video pipeline and the remainder are designated as non-contributing video pipelines. A non-contributing video pipeline may not contribute video information or related audio information to the underlying video screen device resources represented by any HVideoDevice instance.

The contributing video pipeline may be determined from a group of potentially contributing video pipelines according to the following ordered rules:

1. if only one video pipeline among the candidate video pipelines is associated with the active video elementary stream of some non-abstract service, then that video pipeline is the contributing pipeline;
2. otherwise, if more than one video pipeline among the candidate video pipelines is associated with the active video elementary stream of some non-abstract service, then the video pipeline of the non-abstract service most recently selected is the contributing pipeline;
3. otherwise, if only one video pipeline among the candidate video pipelines is associated with a media player controlled by some non-abstract service, then the video pipeline of that media player is the contributing pipeline;
4. otherwise, if more than one video pipeline among the candidate video pipelines is associated with a media player of some non-abstract service, then the video pipeline of the media player most recently started (or resumed after being paused or stopped) is the contributing pipeline;
5. otherwise, if only one video pipeline among the candidate video pipelines is associated with a media player controlled by some abstract service, then the video pipeline of that media player is the contributing pipeline;
6. otherwise, if more than one video pipeline among the candidate video pipelines is associated with a media player of some abstract service, then the video pipeline of the media player most recently started (or resumed after being paused or stopped) is the contributing pipeline; and
7. otherwise, the determination of which video pipeline is the contributing pipeline is not defined by this specification, and is implementation dependent.

When an exemplary embodiment of the present invention is based on an OCAP Host device implementing the OCAP MSM Extension, some permissions necessary for security of an Xlet application will now be explained.

The invocation of certain methods defined by this specification requires the application to have either (or both) MonitorAppPermission("multiscreen.configuration") or (and) MonitorAppPermission ("multiscreen.context"). In OCAP Host devices that implement the OCAP MSM Extension, the following additional permissions are considered to apply to MonitorAppPermission.

multiscreen.configuration provides an ability to access and modify platform multiscreen configuration state. Applications with this permission may modify the platform's multiscreen configuration and discover and monitor its dynamic state.

multiscreen.context provides an ability to modify a screen's multiscreen context state. Applications with this permission may modify the multiscreen context state of accessible screens.

In addition, the enumerated token value type of the name attribute of the ocap:monitorapplication element type defined by the Document Type Definition (DTD) defined by the Permission Request File (PRF) may be considered to contain the following values: multiscreen.configuration and multiscreen-.context.

Since exemplary embodiments of the present invention are based on a Java system, System Property will now be defined.

If an OCAP Host device implements the MSM Extension in the present embodiment, then the "ocap.api.option.msm" Java system property may be defined with a value corresponding to the implemented version of this specification, where this version of this specification is "1.0.0". Conversely, if a Host device defines the "ocap.api.option.msm" Java system property, then the Host device may implement the version of this specification that corresponds with the property's value.

Read access to this property may be granted to both signed and unsigned applications.

Implementation of a Java system-based multiscreen manager according to an exemplary embodiment of the present invention will now be explained.

The registry of Java interface constants according to an exemplary embodiment of the present invention will now be explained with reference to FIGS. 11A through 11G FIG. 11A illustrates the registry of Java constants in org.ocap.ui.MultiScreenConfigurableContext according to an exemplary embodiment of the present invention. The constants are defined in MultiScreenConfigurableContext of the org.ocap.ui package described below with reference to FIGS. 13A through 13F.

FIG. 11B illustrates the registry of Java constants in 'org.ocap.ui.MultiScreenConfiguration' according to an exemplary embodiment of the present invention. The constants are defined in 'MultiScreenConfiguration' of the 'org.ocap.ui' package described below with reference to FIGS. 14A through 14C.

FIG. 11C illustrates the registry of Java constants in 'MultiScreenContext' 'org.ocap.ui.MultiScreenContext' according to an exemplary embodiment of the present invention. The constants are defined in 'MultiScreenContext' of the 'org.ocap.ui.' package described below with reference to FIGS. 15A through 15D.

FIG. 11D illustrates the registry of Java constants in 'org.ocap.ui.event.MultiScreenConfigurationEvent' according to an exemplary embodiment of the present invention. The constants are defined in 'MultiScreenConfigurationEvent' of 'org.ocap.ui.event' package described below with reference to FIGS. 18A through 18D.

FIG. 11E illustrates the registry of Java constants in 'org.ocap.ui.event.MultiScreenContextEvent' according to an exemplary embodiment of the present invention. The constants are defined in 'MultiScreenContextEvent' of the 'org.ocap.ui.event' package described below with reference to FIGS. 20A through 20D.

FIG. 11F illustrates the registry of Java constants in 'org.ocap.ui.event.MultiScreenEvent' according to an exemplary embodiment of the present invention. The constants are defined in 'MultiScreenEvent' of the 'org.ocap.ui.event' package described below with reference to FIGS. 22A through 22D.

FIG. 11G illustrates the registry of Java constants in 'org.ocap.ui.event.MultiScreenResourceEvent' according to an exemplary embodiment of the present invention. The constants are defined in 'MultiScreenResourceEvent' of the 'org.ocap.ui.event' package described below with reference to FIGS. 23A through 23D.

Platform behavior (semantics) for multiscreen management according to an exemplary embodiment of the present invention will now be explained.

Extension to the org.ocap.ui package of HAVi User Interface will now be explained with reference to FIGS. 12 through 16F.

Figure 12:
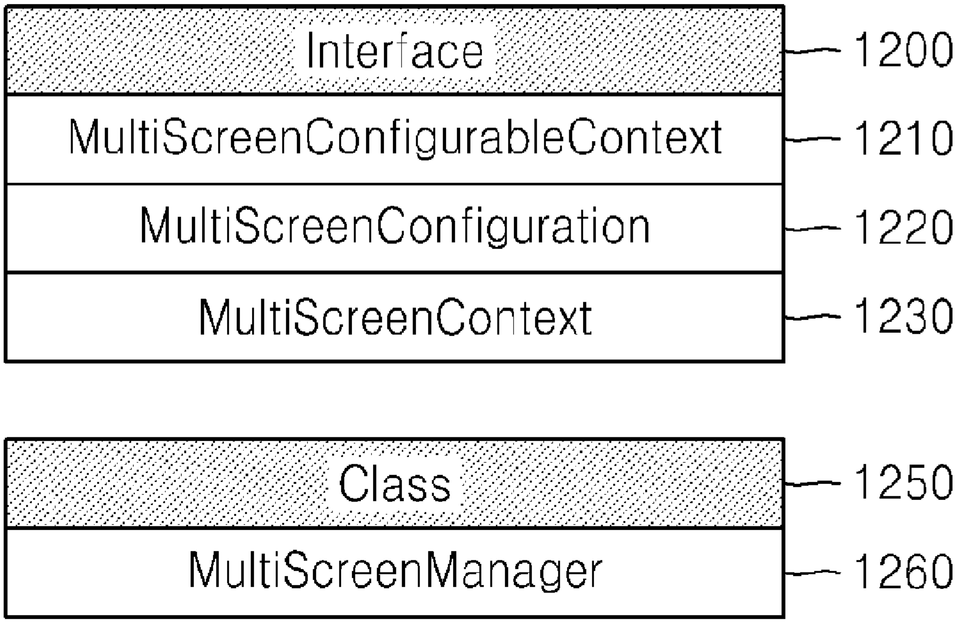
FIG. 12 illustrates an interface and a class of a Java package 'org.ocap.ui' according to an exemplary embodiment of the present invention.

FIG. 12 illustrates an interface and a class of the Java package 'org.ocap.ui' according to an exemplary embodiment of the present invention.

An interface 1200 of the org.ocap.ui package includes a MultiScreenConfigurableContext interface 1210, a MultiScreenConfiguration interface 1220, and MultiScreenContext interface 1230.

The MultiScreenConfigurableContext interface 1210 will be explained with reference to FIGS. 13A through 13F, the MultiScreenConfiguration interface 1220 will be explained with reference to FIGS. 14A through 14C, and the MultiScreenContext interface 1230 will be explained with reference to FIGS. 15A through 15D.

A class 1250 of the org.ocap.ui package includes a MultiScreenManager class 1260. The MultiScreenManager class 1260 will be explained with reference to FIGS. 16A through 16F.

FIG. 13A illustrates a definition of the MultiScreenConfigurableContext interface of the org.ocap.ui package according to an exemplary embodiment of the present invention.

The MultiScreenConfigurableContext' interface 1210 has MultiScreenContext and org.davic.resources.ResourceProxy as superinterfaces. The public interface MultiScreenConfigurableContext extends MultiScreenContext and org.davic.resources.ResourceProxy.

The MultiScreenConfigurable Context interface 1210 provides a set of tools for accomplishing the following:

1. modifying the mapping of logical HScreens to display HScreens including the area (extent) on the display HScreen where a logical HScreen appears, its visibility, and its z-order (among other HScreens);
2. modifying the z-order of HScreenDevices within an HScreen;
3. modifying the set of ServiceContexts associated with an HScreen;
4. modifying the association of display HScreens and corresponding VideoOutputPort instances;
5. modifying the set of HScreenDevices whose generated audio constitute the set of audio sources of an HScreen;
6. modifying the current audio focus assignment of a display HScreen;
7. reserving and releasing reservation of underlying screen and screen device resources;
8. obtaining a reference to current resource client that has reserved screen and its underlying resources; and
9. establishing the currently active per-display multiscreen configuration of a display HScreen.

If an HScreen instance may be exposed to an OCAP application and if that HScreen is configurable with respect to the functionality defined by the MultiScreenConfigurableContext interface 1210, then an MSM implementation may support the MultiScreenConfigurableContext interface on every such HScreen instance.

An MSM implementation may support the MultiScreenConfigurableContext interface 1210 on an HScreen instance that is not configurable with respect to the functionality defined by this MultiScreenConfigurableContext interface 1210.

A given implementation of the MultiScreenConfigurableContext interface 1210 is not required to support any or all defined configuration changes, but may, due to hardware or other constraints, support only specific configuration changes.

If an implementation of the MultiScreenConfigurableContext interface 1210 does not support a specific configuration change, then an attempt to perform that change may cause an IllegalStateException to be raised, as described under each method defined below.

The MultiScreenConfigurableContext interface 1210 has been applied since the MSM I01 version.

FIG. 13B illustrates a field of the MultiScreenConfigurableContext interface of the org.ocap.ui package according to an exemplary embodiment of the present invention.

A field 1300 of the MultiScreenConfigurableContext interface includes at least one of 'static int CONFIGURABLE_SCREEN_PARAMETER_AUDIO_FOCUS 1302', 'static int CONFIGURABLE_SCREEN_PARAMETER_AUDIO_SOURCE 1304', 'static int CONFIGURABLE_SCREEN_

PARAMETER_DEVICE_Z_ORDER 1306', 'static int CONFIGURABLE_SCREEN_PARAMETER_DISPLAY_AREA 1308', 'static int CONFIGURABLE_SCREEN_PARAMETER_DISPLAY_SCREEN 1310', 'static int CONFIGURABLE_SCREEN_PARAMETER_OUTPUT_PORT 1312', 'static int CONFIGURABLE_SCREEN_PARAMETER_SERVICE_CONTEXT 1314', 'static int CONFIGURABLE_SCREEN_PARAMETER_VISIBILITY 1316', and 'static int CONFIGURABLE_SCREEN_PARAMETER_Z_ORDER 1318'.

A field 1320 inheriting from the org.ocap.ui.MultiScreenContext interface 1230 includes at least one of 'SCREEN_TYPE_DISPLAY' and 'SCREEN_TYPE_LOGICAL'.

The static final int CONFIGURABLE_SCREEN_PARAMETER_AUDIO_SOURCE field 1304 is a configurable parameter identifying configurability of audio source(s). Configuration of the audio source(s) of a screen is accomplished by using the addAudioSources(..) and removeAudioSources(..) methods defined by the org.ocap.ui.MultiScreenconfigurableContext interface 1210.

If the HScreen instance referenced by the 'org.ocap.ui.MultiScreenconfigurableContext' interface 1210 supports configuration of its audio source(s), then isConfigurableParameter(CONFIGURABLE_SCREEN_PARAMETER_AUDIO_SOURCE) may return true.

If hasDiscreteParameterSpace(CONFIGURABLE_SCREEN_PARAMETER_AUDIO_SOURCE) returns true, then getDiscreteParameterSpace (CONFIGURABLE_SCREEN_PARAMETER_AUDIO_SOURCE) may return a value of type HScreenDevice[ ], where each entry in the value array is an accessible screen device of this screen that can serve as an audio source for this screen.

The CONFIGURABLE_SCREEN_PARAMETER_AUDIO_FOCUS field 1304 has been applied since the MSM I01 version.

The static final int CONFIGURABLE_SCREEN_PARAMETER_AUDIO_FOCUS field 1302 is a configurable parameter identifying configurability of audio focus.

Configuration of the audio focus of a screen is accomplished by using the assignAudioFocus(..) method defined by the 'org.ocap.ui.MultiScreenConfigurableContext' interface 1210.

If the HScreen instance referenced by this interface supports configuration of its audio source(s), then isConfigurableParameter (CONFIGURABLE_SCREEN_PARAMETER_AUDIO_FOCUS) may return true.

If hasDiscreteParameterSpace(CONFIGURABLE_SCREEN_PARAMETER_AUDIO_FOCUS) returns true, then getDiscreteParameterSpace(CONFIGURABLE_SCREEN_PARAMETER_AUDIO_FOCUS) may return a value of type HScreen[ ], where each entry in the value array is an accessible screen that can serve as an audio focus screen.

If this screen is a display screen, then the returned entries may be restricted to those logical screens that are currently mapped to this display screen that can be assigned audio focus. Because a display screen can always be assigned audio focus directly (as opposed to assigning audio focus to some logical screen mapped to the display screen), the display screen is not itself included in the returned entries.

If this screen is a logical screen and if this logical screen is mapped to a display screen and is capable of being assigned audio focus, then the returned array may contain only this screen; otherwise, the returned array may be empty.

The CONFIGURABLE_SCREEN_PARAMETER_DEVICE_Z_ORDER field 1302 has been applied since the MSM I01 version.

The static final int CONFIGURABLE_SCREEN_PARAMETER_DEVICE_Z_ORDER field 1306 is a configurable parameter identifying configurability of screen device z-order.

Configuration of device z-order of a screen is accomplished by using the setZOrder(HScreenDevice[ ]) method defined by the 'org.ocap.ui.MultiScreenContext' interface 1230.

If the HScreen instance referenced by this interface supports configuration of the z-order of its screen device(s), then isConfigurableParameter(CONFIGURABLE_SCREEN_PARAMETER_DEVICE_Z_ORDER) may return true.

If hasDiscreteParameterSpace(CONFIGURABLE_SCREEN_PARAMETER_DEVICE_Z_ORDER) returns true, then getDiscreteParameterSpace(CONFIGURABLE_SCREEN_PARAMETER_DEVICE_Z_ORDER) may return a value of type HScreenDevice[ ][ ], where each entry in the value array is an array of screen devices whose order matches a supported z-ordering of those screen devices, where the first entry of such an array of screen devices is back-most in z-order (i.e., device z-order of zero).

FIG. 13C illustrates a use case of the 'CONFIGURABLE_SCREEN_PARAMETER_DEVICE_Z_ORDER' field. In FIG. 13C, the following assumptions apply:

1. a screen has one background device B1, one video device V1, and two graphics devices G1 and G2; and
2. two orderings of graphics devices are supported: (1) B1<V1<G1<G2 and (2) B1<V1<G2<G1.

It is confirmed through S1330 that the z-order of the background device B1 is '0', z-order of the video device V1 is '1', the z-order of the graphics device G1 is '2', and the z-order of the graphics device G2 is '3'.

Likewise, it is confirmed through S1340 that the z-order of the background device B1 is 0, the z-order of the video device is 1, the z-order of the graphics device G2 is 2, and the z-order of the graphics device G1 is 3.

The 'CONFIGURABLE_SCREEN_PARAMETER_DEVICE_Z_ORDER' field 1306 has been applied since the MSM I01 version.

The static final int CONFIGURABLE_SCREEN_PARAMETER_DISPLAY_AREA field 1308 is a configurable parameter identifying configurability of screen's associated display area.

Configuration of the display area of a (logical) screen is accomplished by using the setDisplayArea(HScreenRectangle) method defined by the org.ocap.ui.MultiScreenContext interface 1230.

If the HScreen instance referenced by the org.ocap.ui.MultiScreenConfigurableContext interface 1210 is a display screen, then isConfigurableParameter(CONFIGURABLE_SCREEN_PARAMETER_DISPLAY_AREA) may return false; otherwise, if this logical screen supports configuration of its display area, then isConfigurableParameter(CONFIGURABLE_SCREEN_PARAMETER_DISPLAY_AREA) may return true.

If hasDiscreteParameterSpace(CONFIGURABLE_SCREEN_PARAMETER_DISPLAY_AREA) returns true, then getDiscreteParameterSpace(CONFIGURABLE_SCREEN_PARAMETER_DISPLAY_AREA) may return a value of type HScreenRectangle[ ], where each entry in the value array is a supported display area.

The CONFIGURABLE_SCREEN_PARAMETER_DISPLAY_AREA 1308 has been applied since the MSM I01 version.

The static final int CONFIGURABLE_SCREEN_PARAMETER_DISPLAY_SCREEN field 1310 is a configurable parameter identifying configurability of the screen's associated display screen.

Configuration of the display screen of a (logical) screen is accomplished by using 'setDisplayScreen(HScreen)' defined by the 'org.ocap.ui.MultiScreenContext' interface 1230.

If the 'HScreen' referenced by the 'org.ocap.ui.MultiScreenConfigurableContext' interface 1210 is a display screen, then 'isConfigurableParameter (CONFIGURABLE_SCREEN_PARAMETER_DISPLAY_SCREEN)' may return 'false'. Otherwise, if the logical screen supports the configuration of the display screen, then 'isConfigurableParameter(CONFIGURABLE_SCREEN_PARAMETER_DISPLAY_SCREEN)' may return 'true'. If the 'hasDiscreteParameterSpace (CONFIGURABLE_SCREEN_PARAMETER_DISPLAY_SCREEN)' method returns 'true', then 'getDiscreteParameterSpace(CONFIGURABLE_SCREEN_PARAMETER DISPLAY_SCREEN)' may return a value of type 'HScreen [ ]', where each entry in the value array is an accessible display screen to which the logical screen may be mapped.

The 'CONFIGURABLE_SCREEN_PARAMETER_DISPLAY_SCREEN' field 1310 has been applied since the MSM I01 version.

The 'static final int CONFIGURABLE_SCREEN_PARAMETER_OUTPUT_PORT' field 1312 is a configurable parameter identifying configurability of the screen's associated output port(s).

Configuration of the output port(s) of a screen is accomplished by using 'addOutputPorts(..)' and 'removeOutputPorts(..)' that are defined by the 'org.ocap.ui.MultiScreenConfigurableContext' interface 1210.

If the 'HScreen' instance referenced by the 'org.ocap.ui.MultiScreenConfigurableContext' interface 1210 supports configuration of its video output port(s), then 'isConfigurableParameter(CONFIGURABLE_SCREEN_PARAMETER_Output_Port)' may return 'true'. If 'hasDiscreteParameterSpace (CONFIGURABLE_SCREEN_PARAMETER_OUTPUT_PORT)' returns 'true', 'getDiscreteParameterSpace(CONFIGURABLE_SCREEN_PARAMETER_OUTPUT_PORT)' may return a value of a type 'VideoOutputPort[ ]', where each entry in the value array is an accessible video port to which the screen may be directly mapped.

The 'CONFIGURABLE_SCREEN_PARAMETER_OUTPUT_PORT' field 1312 has been applied since the MSM I01 version.

A 'CONFIGURABLE_SCREEN_PARAMETER_SERVICE_CONTEXT' field 1314 may be declared as 'static final int CONFIGURABLE_SCREEN_PARAMETER_SERVICE_CONTEXT', and is a configurable parameter identifying configurability of screen's associated service context(s).

Configuration of the service context(s) of a screen is accomplished by using 'addServiceContexts(..)' and 'removeServiceContexts(..)' defined by the 'org.ocap.ui.MultiScreenConfigurableContext' interface 1210, and by using 'swapServiceContexts(..)' and 'moveServiceContexts (..)' defined by 'MultiScreenManager'.

If the 'HScreen' instance referenced by the 'org.ocap.ui.MultiScreenConfigurableContext' interface 1210 supports configuration of its output port(s), then 'isConfigurableParameter(CONFIGURABLE_SCREEN_PARAMETER_SERVICE_CONTEXT)' may return 'true'.

If 'hasDiscreteParameterSpace(CONFIGURABLE_SCREEN_PARAMETER_SERVICE_CONTEXT)' returns 'true', then 'getDiscreteParameterSpace(CONFIGURABLE_SCREEN_PARAMETER_SERVICE_CONTEXT)' may return a value of type 'ServiceContext[ ]', where each entry in the value array is an accessible service context that can be associated with this screen.

The 'CONFIGURABLE_SCREEN_PARAMETER_SERVICE_CONTEXT' field 1314 has been applied since the MSM I01 version.

A 'CONFIGURABLE_SCREEN_PARAMETER_VISIBILITY' field 1316 may be declared as 'static final int CONFIGURABLE_SCREEN_PARAMETER_VISIBILITY', and is a configurable parameter identifying configurability of a screen's visibility.

Configuration of the visibility of a screen is accomplished by using 'setVisible(boolean)' defined by the 'org.ocap.ui.MultiScreenConfigurableContext' interface 1210.

If the 'HScreen' instance referenced by the 'org.ocap.ui.MultiScreenConfigurableContext' interface 1210 supports configuration of its visibility, then 'isConfigurableParameter (CONFIGURABLE_SCREEN_PARAMETER_VISIBILITY)' may return 'true', but 'hasDiscreteParameterSpace (CONFIGURABLE_SCREEN_PARAMETER_VISIBILITY)' returns 'false', implying that if visibility is configurable, then a continuous parameter space (i.e., both 'true' and 'false') is applied.

The 'CONFIGURABLE_SCREEN_PARAMETER_VISIBILITY' field 1316 has been applied since the MSM I01 version.

The 'static final int CONFIGURABLE_SCREEN_PARAMETER_Z_ORDER' is a configurable parameter identifying configurability of a screen's 'z-order'.

Configuration of the 'z-order' of a screen is accomplished by using 'setZOrder(int)' defined by 'org.ocap.ui.MultiScreenConfigurableContext' interface 1210.

If the 'HScreen' instance referenced by the 'org.ocap.ui.MultiScreenConfigurableContext' interface 1210 supports configuration of its z-order (with respect to other screen's within its multi-screen configuration), then 'isConfigurableParameter(CONFIGURABLE_SCREEN_PARAMETER_Z_ORDER)' may return 'true'.

If 'hasDiscreteParameterSpace(CONFIGURABLE_SCREEN_PARAMETER_Z_ORDER)' returns 'true', then 'getDiscreteParameterSpace(CONFIGURABLE_SCREEN_PARAMETER_Z_ORDER)' may return a value of type 'Integer[ ]', where each value entry 'v' in the value array is such that 'v.intValue( )' returns a supported 'z-order' index for this screen in the context of this screen's multi-screen configuration.

The 'CONFIGURABLE_SCREEN_PARAMETER_Z_ORDER' field 1318 has been applied since the MSM I01 version.

The 'Fields inherited from interface org.ocap.ui.MultiScreenContext' field 1320 inherited from 'org.ocap.ui.MultiScreenContext' includes 'SCREEN_TYPE_DISPLAY' and 'SCREEN_TYPE_LOGICAL'.

FIGS. 13D through 13F illustrate a method 1350 of a 'MultiScreenConfigurableContext' interface of the 'org.ocap.ui' package according to an exemplary embodiment of the present invention.

The method 1350 of the 'org.ocap.ui.MultiScreenContext' interface includes at least one of: a 'void addAudioSources (org.havi.ui.HScreenDevice[ ] devices, boolean mixWithAudioFocus)' method 1352; a 'void addOutputPorts(org.ocap.hardware.VideoOutputPort[ ] ports, boolean removeExisting)' method 1354; a 'void addServiceContexts(javax.tv.service.selection. ServiceContext[ ] contexts, a boolean associateDefaultDevices)' method 1356; a 'void assign AudioFocus( )' method 1358; a 'Boolean checkServiceContextCompatibility(javax.tv.service.selection.ServiceContext context)' method 1360; a 'org.davic.resources.ResourceClient getClient( )' method 1362; a 'java.lang.Object[ ] getDiscreteParameterSpace(int parameter)' method 1364; a 'boolean hasDiscreteParameterSpace(int parameter)' method 1366; a 'boolean isConfigurableParameter(int parameter)' method 1368; a 'void releaseScreen( )' method 1370; a 'void removeAudioSources(org.havi.ui.HScreenDevice[ ] devices)' method 1372; a 'void removeOutputPorts(org.ocap.hardware.VideoOutputPort[ ] ports)' method 1374; a 'void removeServiceContexts(javax.tv.service.selection.ServiceContext[ ] contexts)' method 1376; a 'void requestMultiScreenConfigurationChange (MultiScreenConfiguration configuration,java.util. Dictionary serviceContextAssociations)' method 1378; a 'boolean reserveScreen (org.davic.resources.ResourceClient client, java.lang.Object requestData)' method 1380; a 'void setDisplayArea (org.havi.ui.HScreenRectangle rect)' method 1382; a 'void setDisplayScreen(org.havi.ui.HScreen screen)' method 1384; a 'void setMultiScreenConfiguration(MultiScreenConfiguration configuration, java.util.Dictionary serviceContextAssociations)' method 1386; a 'void setVisible(boolean visible)' method 1388, a 'void setZOrder (org.havi.ui.HScreenDevice[ ] devices)' method 1390; and a 'void setZOrder(int order)' method 1392.

A method 1394 inherited from the 'org.ocap.ui.MultiScreenContext' interface 1230 includes at least one of: 'addMultiScreenConfigurationListener', 'addScreenContext Listener', 'getAudioFocus', 'getAudioSources', 'getDisplay Area', 'getDisplayScreen', 'getID', 'getMultiScreenConfiguration', 'getMultiScreenConfigurations', 'getMultiScreenConfigurations', 'getOutputPorts', 'getScreenCategory', 'getScreenType', 'getServiceContexts', 'getVisible', 'getZOrder', 'getZOrder', 'removeMultiScreenConfigurationListener', and 'removeScreenContextListener'.

The 'isConfigurableParameter' method 1368 may be declared as 'boolean isConfigurableParameter(int parameter)', and it is determined if a configurable parameter is supported as configurable (as opposed to fixed) by the platform implementation for some screen.

The 'parameter' parameter may be a configurable screen parameter enumeration value as defined above. If the platform implementation supports either continuous or discrete variation of the specified 'parameter' on this screen, the 'isConfigurableParameter' method 1368 then returns 'true'; otherwise, returns 'false'.

The 'isConfigurableParameter' method 1368 has been applied since the MSM I01 version.

The 'hasDiscreteParameterSpace' method 1366 may be declared as 'boolean hasDiscreteParameterSpace(int parameter)', and it is determined if a supported configurable parameter has a discrete or continuously variable value space.

In the present context, a 'continuously' configurable parameter means that the platform supports or can approximate all values of the parameter's value type, while "discrete" means only certain, enumerable values of the parameter's value type may be used as reported by 'getDiscreteParameterSpace(..)'.

The 'parameter' parameter may be a configurable screen parameter enumeration value as defined above. If the platform implementation supports a discrete, (sub) set of values of the value type space of the specified 'parameter' on this screen, then, the 'hasDiscreteParameterSpace' method 1366 returns 'true'. Otherwise, the 'hasDiscreteParameterSpace' method 1366 returns 'false', in which case all values of the value type space are supported (or approximated).

If the 'isConfigurableParameter(parameter)' 1368 returns 'false', the 'hasDiscreteParameterSpace' method 1366 generates 'java.lang.IllegalArgumentException'.

The 'hasDiscreteParameterSpace' method 1366 has been applied since the MSM I01 version.

The 'getDiscreteParameterSpace' method 1364 may be declared as 'java.lang.Object[ ] getDiscreteParameterSpace (int parameter)', and the discrete, (sub) set of values of the value type space of a configurable parameter is obtained.

The actual runtime type of the array and the array's elements returned by the 'getDiscreteParameterSpace' method 1364 may be as defined for the specified configurable parameter as documented by each configurable parameter's specification above.

Unless indicated otherwise by the definition of a specific configurable parameter, the order of entries in the array returned by the 'getDiscreteParameterSpace' method 1364 is not limited to that which is defined by the present specification, and may be considered implementation dependent by an interoperable application.

A set of supported discrete parameters may change for a given screen and a given configurable parameter over the lifetime of a screen based upon the dynamic state f the screen's underlying resources. However, such a change, if it occurs, may not occur outside the time interval between the completion of dispatching a 'MultiScreenConfigurationEvent.MULTI_SCREEN_CONFIGURATION_CHANGING' event and the completion of dispatching the corresponding 'MultiScreenConfigurationEvent.MULTI_SCREEN_CONFIGURATION_CHANGED' event.

The 'parameter' parameter may be a configurable screen parameter enumeration value as defined above. The 'getDiscreteParameterSpace' method 1364 returns an array of object instances, each of which denotes a discrete value of the specified parameter that is supported (or approximatable) by the platform.

If the 'hasDiscreteParameterSpace(parameter)' method 1366 returns 'false', the 'isConfigurableParameter(parameter)' method 1368 or the 'getDiscreteParameterSpace' method 1364 may generate 'java.lang.IllegalArgumentException'.

The 'getDiscreteParameterSpace' method 1364 has been applied since the MSM I01 version.

The 'setVisible' method 1388 may be declared as 'void setVisible(boolean visible)' and a screen visibility is set.

If this screen is a logical screen, then the screen is marked as visible (if previously hidden) or is marked as hidden (if previously visible). If the screen is a display screen, all logical screens mapped to the display screen are marked as visible (if previously hidden) or is marked as hidden (if previously visible).

The 'visible' parameter may be a Boolean value indicating whether this logical 'HScreen' or the logical screens mapped to this display screen should be made visible or hidden (non-visible) on its associated display 'HScreen'.

If the calling thread has not been granted 'MonitorAppPermission("multiscreen.context")', the 'setVisible' method 1388 generates 'java.lang.SecurityException'.

If the visibility for the 'HScreen' cannot be changed, e.g., if the platform uses a permanent visibility setting, the 'setVisible' method 1388 generates 'java.lang.IllegalStateException'.

The 'setVisible' method 1388 has been applied since the MSM I01 version.

If the 'setZOrder(int)' method 1392 is declared as 'void setZOrder(int order)' the screen 'z-order' is set.

The 'setZOrder(int)' method 1392 causes the logical 'HScreen' to change its 'z-order' among other logical 'HScreen's mapped to the same display 'HScreen'.

The 'order' parameter may be a positive integer value indicating the new 'z-order' to be assigned to this logical 'HScreen'.

If the calling thread has not been granted 'MonitorAppPermission("multiscreen.context")', the 'setZOrder(int)' method 1392 generates 'java.lang.SecurityException'. If the type of this 'HScreen' is not 'SCREEN_TYPE_LOGICAL' of if the 'z-order' for the 'HScreen' cannot be changed, e.g., if the platform uses a permanent 'z-order' setting, the 'setZOrder(int)' method 1392 generates 'java.lang.IllegalStateException'.

The 'setZOrder(int)' method 1392 has been applied since the MSM I01 version.

The 'setZOrder(HScreenDevice[ ])' method 1390 may be declared as 'void setZOrder(org.havi.ui.HScreenDevice[ ] devices)', and the 'z-order' for a screen device within this screen for a set of screen devices is set.

The 'setZOrder(HScreenDevice[ ])' method 1390 atomically sets the 'z-order' of the specified set of 'HScreenDevice' where the following constraints are applied:

if an 'HBackgroundDevice' is present in the specified set of devices, (i) the 'HBackgroundDevice' precedes any 'HVideoDevice' contained in the set of devices, and (ii) it precedes any 'HGraphicsDevice' contained in the set of devices.

if an 'HVideoDevice' is present in the specified set of devices, the 'HVideoDevice' precedes any 'HGraphicsDevice' contained in the set of devices.

If no exception is caused by the 'setZOrder(HScreenDevice[ ])' method 1390, then the set of specified 'HScreenDevice' instances will be ordered such that 'MultiScreenContext.getZOrder(HScreenDevice)' when invoked on this screen with any of the specified devices will return a 'z-order' index that preserves the relative order of the specified devices.

If fewer than the entire set of 'HScreenDevice' instances associated with this screen are provided in the 'devices' argument, then the resulting relative order of unspecified devices with respect to specified devices is not defined, except that constraints defined by the 'MultiScreenContext.getZOrder (HScreenDevice)' may be applied to all the ordering of devices in this screen after the returning of the 'setZOrder (HScreenDevice[ ])' method 1390.

The 'devices' parameters are an ordered array of 'HScreenDevice' instances associated with this screen.

If the calling thread has not been granted 'MonitorAppPermission("multiscreen.context")', the 'setZOrder (HScreenDevice[ ])' method 1390 generates 'java.lang.SecurityException'.

If the 'device' device is not an 'HScreenDevice' of this screen, the 'setZOrder(HScreenDevice[ ])' method 1390 generates 'java.lang.IllegalArgumentException'.

The 'setZOrder(HScreenDevice[ ])' method 1390 may generate 'java.lang.IllegalStateException' when (i) the 'z-order' for the specified 'HScreenDevice' cannot be changed, e.g., when the platform uses a permanent 'z-order' setting for screen devices in this screen, or (ii) when the order of specified devices does not permit the assignment of 'z-order' indices that satisfy the above constraints.

The 'setZOrder(HScreenDevice[ ])' method 1390 has been applied since the MSM I01 version.

The addAudioSources' method 1352 may be declared as 'void addAudioSources (org.havi.ui.HScreenDevice[ ] devices, boolean mixWithAudioFocus)', and one or more audio source(s) for this screen is added. The 'addAudioSources' method 1352 adds one or more 'HScreenDevice' instances to the set of audio sources from which presented audio is selected (and mixed) for the purpose of audio presentation from this screen.

If a specified audio source has already been designated as an audio source for this screen, but 'mixWithAudioFocus' differs from that specified when it was added as an audio source, then the new 'mixWithAudioFocus' values are applied.

The 'devices' parameter may be a non-empty array of 'HScreenDevice' instances, where each of the 'HScreenDevice' instances contributes to a mixed, audio presentation from this screen.

If the 'mixWithAudioFocus' parameter is 'true', then specified screen devices contribute audio to or mixes audio with any audio output associated with any video output port with which this screen is associated (directly or indirectly) regardless of whether or not this screen is assigned audio focus. If the 'mixWithAudioFocus' parameter is 'false', then the specified screen devices contribute audio only when this screen is assigned audio focus.

If the calling thread has not been granted 'MonitorAppPermission("multiscreen.context")', the 'addAudioSources' method 1352 generates 'java.lang.SecurityException'.

If the 'devices' parameter is not a non-empty array or some entry of 'devices' is not an 'HScreenDevice' of this screen, the 'addAudioSources' method 1352 generates 'java.lang.IllegalArgumentException'.

The 'addAudioSources' method 1352 may generate 'java.lang.IllegalStateException' when (i) the audio sources for this 'HScreenDevice' cannot be changed, e.g., when the platform uses a permanent audio source setting for screen devices in this screen, or (ii) when multiple audio sources are specified and audio mixing is not supported.

The 'addAudioSources' method 1352 has been applied since the MSM I01 version.

The 'removeAudioSources' method 1372 may be declared as 'void removeAudioSources(org.havi.ui.HScreenDevice[ ] devices)', and one or more audio sources is removed. The 'removeAudioSources' method 1372 removes all or some non-empty set of specific 'HScreenDevice' instances from the set of audio sources of this 'HScreen'. If 'devices' has a 'null' value, then all audio sources are removed.

The 'devices' parameter indicates either the 'null' value or a non-empty set of 'HScreenDevice' instances.

If the calling thread has not been granted 'MonitorAppPermission("multiscreen.context")', the 'removeAudioSources' method 1372 generates 'java.lang.SecurityException'.

If 'devices' is not null and some 'HScreenDevice' entry is not associated with this 'HScreen' instance, the 'removeAudioSources' method 1372 generates 'java.lang.IllegalArgumentException'.

If a specified 'HScreenDevice' used as an audio source for this 'HScreen' cannot be changed, e.g., if the platform uses a permanent association of audio sources with the specified 'HScreenDevice', the 'removeAudioSources' method 1372 may generate 'java.lang.IllegalStateException'.

The 'removeAudioSources' method 1372 has been applied since the MSM I01 version.

The 'assignAudioFocus' method 1358 may be declared as 'void assignAudioFocus( )', and audio focus to this screen is assigned.

At any given time, a display screen may assign audio focus to itself or exactly one logical screen mapped to it (the display screen). When audio focus is newly assigned to a logical screen of a display screen and the logical screen does not currently have audio focus assigned to it, then audio focus may be removed from any other logical screen mapped to the display screen and be assigned instead to the newly assigned logical screen.

If no logical screen is mapped to a given display screen or no logical screen mapped to a given display screen is assigned audio focus, then the display screen may assign itself audio focus (by default). Audio focus may be explicitly assigned to a display screen by using the 'assignAudioFocus' method 1358 on a display screen instance.

The audio focus screen of a display screen is the screen whose currently selected audio sources are assigned to be rendered on all (implied) audio presentation devices of all video output ports to which the display screen is mapped. If the screen to which audio focus is assigned has no audio source, i.e., if it has an empty set of audio sources, then audio (as produced by or potentially produced by the OCAP platform) may not be rendered by any (implied) audio presentation device of all video output ports to which the display screen is mapped.

Each distinct display screen may have a distinct logical screen to which audio focus is assigned for the purpose of rendering audio of the display screen (and its collection of mapped logical screens).

If the calling thread has not been granted 'MonitorAppPermission("multiscreen.context")', the 'assignAudioFocus' method 1358 generates 'java.lang.SecurityException'.

If audio focus cannot be assigned to this 'HScreen' or the current audio focus cannot be changed, the 'assignAudioFocus' method 1358 generates 'java.lang.IllegalStateException'.

The 'assignAudioFocus' method 1358 has been applied since the MSM I01 version.

The 'addOutputPorts' method 1354 may be declared as 'void addOutputPorts(org.ocap.hardware.VideoOutputPort[ ] ports, boolean removeExisting)', and one or more video output port(s) to which a screen is mapped is added.

If this 'HScreen' is a logical screen rather than a display screen, then the 'HScreen' may be considered to function as equivalent to a display screen for the purpose of mapping to the specified video output port(s). That is, the logical screen is treated as if it were a main display screen on its own accord.

The 'ports' parameter may be a non-empty array of 'VideoOutputPort' instances. If the 'removeExisting' parameter has a 'true' value, then an association with the existing screen (if such an association exists) may be removed before being added to a new screen.

If the calling thread has not been granted 'MonitorAppPermission("multiscreen.context")', the 'addOutputPorts' method 1354 generates 'java.lang.SecurityException'.

The 'addOutputPorts' method 1354 generates 'java.lang.IllegalStateException' when (i) the specified 'VideoOutputPort' has already been associated with a different 'HScreen' and 'removeExisting' is not 'true', (ii) this 'HScreen' cannot be mapped to some specified 'VideoOutputPort' due to some platform specific hardware constraints, and (iii) when the set of 'VideoOutputPort' instances to which this 'HScreen' is mapped cannot be changed, e.g., when the platform uses a permanent association with a specific set of 'VideoOutputPort' instances.

The 'addOutputPorts' method 1354 has been applied since the MSM I01 version.

The 'removeOutputPorts' method 1374 may be declared as 'void removeOutputPorts(org.ocap.hardware.VideoOutputPort[ ] ports)', and one or more video output ports to which a screen is mapped is removed. The 'removeOutputPorts' method 1374 removes all or some non-empty set of specific 'VideoOutputPort' instances from the set of video output ports to which the 'HScreen' is mapped. If the 'ports' parameter is 'null', then all video output ports associations are removed.

The 'ports' parameter may be either 'null' or a non-empty array of 'VideoOutputPort' instances.

If the calling thread has not been granted 'MonitorAppPermission("multiscreen.context")', the 'removeOutputPorts' method 1374 generates 'java.lang.SecurityException'.

If 'ports' is not null and some 'VideoOutputPort' entry is not associated with this 'HScreen' instance, the 'removeOutputPorts' method 1374 generates 'java.lang.IllegalArgument Exception'.

If a specified 'VideoOutputPort' for this 'HScreen' cannot be changed, e.g., if the platform uses a permanent association with the specified 'VideoOutputPort', the 'removeOutputPorts' method 1374 may generate 'java.lang.IllegalStateException'.

The 'removeOutputPorts' method 1374 has been applied since the MSM I01 version.

The 'setDisplayScreen' method 1384 may be declared as 'void setDisplayScreen (org.havi.ui.HScreen screen)', and a logical screen is associated with a display screen. That is, the 'setDisplayScreen' method 1384 associates this logical 'HScreen' with a display 'HScreen'.

The 'screen' parameter may be a display 'HScreen' instance or is null. If the 'screen' parameter is 'null', the 'setDisplayScreen' method 1384 is executed without an exception, and the 'screen' parameter is returned, then the logical 'HScreen' is no longer associated with a display 'HScreen'.

If the calling thread has not been granted 'MonitorAppPermission ("multiscreen.context")', the 'setDisplayScreen' method 1384 generates 'java.lang.SecurityException'.

The 'setDisplayScreen' method 1384 generates 'java.lang.IllegalStateException' when (i) the type of the 'HScreen' is not 'SCREEN_TYPE_LOGICAL', (ii) the specified 'screen' is not 'null' and its screen type is not 'SCREEN_TYPE_DISPLAY', or (iii) the display 'HScreen' associated with this logical 'HScreen' cannot be changed, e.g., when the platform uses a permanent association with a specific display 'HScreen'.

The 'setDisplayScreen' method 1384 has been applied since the MSM I01 version.

The 'setDisplayArea' method 1382 may be declared as 'void setDisplayArea(org.havi.ui.HScreenRectangle rect)', and an area of a display screen to which a logical screen is mapped is set. That is, the 'setDisplayArea' method 1382 associates this logical HScreen with an area (extent) of its associated display HScreen.

The 'rect' parameter may be an HScreenRectangle instance specifying the area on the display HScreen associated with this logical HScreen that may correspond to the extent of this logical HScreen.

If the calling thread has not been granted 'MonitorAppPermission("multiscreen.context")', the 'setDisplayArea' method 1382 generates 'java.lang.SecurityException'.

The 'setDisplayArea' method 1382 generates 'java.lang.IllegalStateException' if (1) this HScreen's type is not SCREEN_TYPE_LOGICAL or (2) if the area of the display HScreen associated with this logical HScreen cannot be changed, e.g., if the platform uses a permanent association with a specific area of the associated.

The 'setDisplayArea' method 1382 has been applied since the MSM I01 version.

The 'checkServiceContextCompatibility' method 1360 may be declared as 'boolean checkServiceContextCompatibility(javax.tv.service.selection.ServiceContext context)', and compatibility of service context with a screen is tested. That is, the 'checkServiceContextCompatibility' method 1360 determines if an application may assign ServiceContext to this HScreen and if the specified ServiceContext is compatible with presentation on this HScreen.

The 'context' parameter may be a valid 'ServiceContext' instance.

The 'checkServiceContextCompatibility' method 1360 returns a boolean value indicating if the specified ServiceContext instance can be assigned to this HScreen. If the specified ServiceContext instance can be assigned, 'true' is returned; otherwise, 'false' is returned.

If the calling thread has not been granted 'MonitorAppPermission("multiscreen.context")', the 'checkServiceContextCompatibility' method 1360 generates 'java.lang.SecurityException'.

If the specified 'ServiceContext' is not valid, the 'checkServiceContextCompatibility' method 1360 generates 'java.lang.IllegalArgumentException'.

The 'checkServiceContextCompatibility' method 1360 has been applied since the MSM I01 version.

The 'addServiceContexts' method 1356 may be declared as 'void addServiceContexts(javax.tv.service.selection. ServiceContext[ ] Contexts, boolean associateDefaultDevices)', and service context(s) is added to this screen. That is, the 'addServiceContexts' method 1356 adds one or more ServiceContext instances to the set of service contexts associated with this HScreen in order to permit background, video, and graphics content from these ServiceContext instances to be presented on the HScreen's respective screen devices.

If a specified service context has already been associated with the underlying screen represented by the 'org.ocap.ui. MultiScreenContext' interface, then that service context is not multiply associated with this screen, but the existing association remains intact. That is, a given service context may be associated with a given (underlying) screen either once or not at all.

If two or more non-abstract service contexts are associated with a given screen and multiple video sources from the background based players of these multiple non-abstract service contexts are associated with a given HVideoDevice instance of the given screen, then the background based player from these multiple service contexts whose video content is to be displayed is determined according to the following ordered rules:

1. If the owning application of one of the associated non-abstract service contexts holds a reservation on a given HVideoDevice of the screen, then background based player content from that service context is designated for presentation on that video device; and 2. Otherwise, the background based player of the associated non-abstract service context whose application is assigned the highest priority is designated for presentation on that video device;

If, after applying the above rules, multiple background based players of a given application are designated for presentation on a video device, then the player that was most recently started is given priority for video presentation.

The 'contexts' parameter may be a non-empty array of 'ServiceContext' instances. If the 'associateDefaultDevices' parameter is 'true', then a default screen devices of this screen is associated with all ServiceMediaHandler instances currently associated with the specified ServiceContext instances; otherwise. If the 'associateDefaultDevices' parameter is 'false', then this association with default screen devices is not performed.

If the calling thread has not been granted 'MonitorAppPermission("multiscreen.context")', the 'addServiceContexts' method 1356 generates 'java.lang.SecurityException'.

If some specified ServiceContext for this HScreen cannot be changed, e.g., if the platform uses a permanent association with a specific ServiceContext, the 'addServiceContexts' method 1356 generates 'java.lang.IllegalStateException'.

The 'addServiceContexts' method 1356 has been applied since the MSM I01 version.

The 'removeServiceContexts' method 1376 may be declared as 'void removeServiceContexts(javax.tv.service.selection.ServiceContext[ ] contexts)', and service context(s) is removed from a screen. That is, the 'removeServiceContexts' method 1376 removes all or some non-empty set of specific ServiceContext instances from the set of service contexts associated with this HScreen. If contexts is null, then all service contexts are removed.

The 'contexts' parameter may be either 'null' or non-empty array of 'ServiceContext' instances.

If the calling thread has not been granted 'MonitorAppPermission("multiscreen.context")', the 'removeServiceContexts' method 1376 generates 'java.lang.SecurityException'.

If contexts is not 'null' and some ServiceContext entry is not associated with this HScreen instance, the 'removeServiceContexts' method 1376 generates 'java.lang.IllegalArgumentException'.

If ServiceContext cannot be changed, e.g., if the platform uses a permanent association with a specified ServiceContext, the 'removeServiceContexts' method 1376 may generate 'java.lang.IllegalStateException'.

The 'removeServiceContexts' method 1376 has been applied since the MSM I01 version.

The 'setMultiScreenConfiguration' method 1386 may be declared as 'void setMultiScreenConfiguration(MultiScreenConfiguration configuration, java.util.Dictionary serviceContextAssociations)', and currently active multiscreen configuration is set for this display screen. That is, one from among the set of subsets of logical screens that may be associated with this display screen is selected at a given time.

If the specified configuration is the current configuration for this display screen, then, unless SecurityException is applied, a value is returned from the 'setMultiScreenConfiguration' method 1386 without producing any side effect.

If the specified configuration is not the current configuration for this display screen and if SecurityException, IllegalStateException, and IllegalStateException do not apply, then the synchronous display multiscreen configuration change processing defined in the present specification is performed.

If a serviceContextAssociations argument is specified (i.e., if it is not null), then any ServiceContext instance that is accessible to the invoking application may be associated with either no screen or the applicable screen(s) in the specified (new) multiscreen configuration. If no association matches some accessible ServiceContext, if some accessible ServiceContext instance is not present in the specified associations, or if it is present but no such applicable screen exists in the new multiscreen configuration, then the ServiceContext instance may be associated with the default service context association screen of the specified multiscreen configuration, i.e., the screen returned by the configuration.getDefaultServiceContextScreen( ).

For the purpose of matching accessible ServiceContext instances whose references appear as keys in a specified serviceContextAssociations dictionary, the virtual method equals(Object)on these keys may be used, in which case it is assumed that the 'setMultiScreenConfiguration' method 1386 behaves identically to the default implementation of Object.equals(Object).

In the context of a given application instance, the MSM host implementation should maintain a one-to-one relationship between ServiceContext instances exposed to that application and collections of underlying service context resources. If the MSM host implementation fails to maintain this relationship, then when consulting a serviceContextAssociations dictionary, the MSM implementation may consider two distinct collections of underlying service context resources to be the same service context, e.g., if at different times, a single ServiceContext instance references distinct underlying collections of resources. Also, the MSM implementation may consider a single collection of underlying service context resources to be two distinct service contexts, e.g., if at a given time, two distinct ServiceContext instances reference the same underlying collection of resources.

The state of the decoder format conversion (DFC) component of a video pipeline being used to process video associated with a service context that is implicitly swapped or moved between screens by the 'setMultiScreenConfiguration' method 1386 may not be affected by performance of the 'setMultiScreenConfiguration' method 1386.

The 'configuration' parameter may be a MultiScreenConfiguration instance to become the currently active per-display multi-screen configuration for this display screen.

If the 'serviceContextAssociations' parameter is not null, it may be a Dictionary instance whose keys are ServiceContext instances and whose values are String instances, where the string values are defined as follows: (1) if the string value is "–", then no screen is applied (in which case a matching service context is not associated with any screen after the configuration change), (2) otherwise, if the string value is "*", then all screens of the new screen configuration are applied, (3) otherwise, if the string value is a screen identifier as returned by MultiScreenContext.getID( ), then that identified screen is applied, (4) otherwise, if the string value is a screen category as returned by MultiScreenContext.getScreenCategory( ), then any screen of the new configuration with that category is applied, (5) otherwise, if the string value is a semicolon separated list of screen identifiers, then each screen of the new configuration with a matching identifier is applied, (6) otherwise, if the string value is a semicolon separated list of screen categories, then each screen of the new configuration with a matching category is applied, (7) otherwise, if the string value is a semicolon separated list of screen identifiers or screen categories, then each screen of the new configuration with a matching identifier or category is applied, and (8) otherwise, the default service context association screen of the new configuration is applied.

If the calling thread has not been granted 'MonitorAppPermission("multiscreen.configuration")', the 'setMultiScreenConfiguration' method 1386 generates 'java.lang.SecurityException'.

If the 'Configuration' parameter is not one of this (display) screen's multiscreen configurations as would be returned by MultiScreenContext.getMultiScreenConfigurations( ), the 'setMultiScreenConfiguration' method 1386 generates 'java.lang.IllegalArgumentException'.

The 'setMultiScreenConfiguration' method 1386 generates 'java.lang.IllegalStateException' if this screen is not a display screen or (1) if the MSM implementation does not permit activation of the specified multiscreen configuration, (2) if the 'setMultiScreenConfiguration' method 1386 was previously called and the change processing steps has not yet been completed, or (3) if activation is not otherwise permitted at the time of method invocation.

The 'setMultiScreenConfiguration' method 1386 has been applied since the MSM I01 version.

The 'requestMultiScreenConfigurationChange' method 1378 may be declared as 'void requestMultiScreenConfigurationChange(MultiScreenConfiguration configuration, java.util.Dictionary serviceContextAssociations)', and that the currently active multiscreen configuration for this display screen is requested to be changed.

If the specified configuration is the current configuration for this display screen, then, unless SecurityException is applied, a value is returned from the 'requestMultiScreenConfigurationChange' method 1378 without producing any side effect.

If the specified configuration is not the current display configuration and if 'SecurityException', 'IllegalArgumentException', and 'IllegalStateException' are not applied, then an asynchronous change to the current multiscreen configuration is initialized, where the semantics of setMultiScreenConfiguration( ) is applied except that this method may return immediately after MultiScreenConfiguration. MULTI_SCREEN_CONFIGURATION_CHANGING is generated (but before it is dispatched).

The 'configuration' parameter may be a 'MultiScreenConfiguration' instance to become the currently active screen configuration.

The 'serviceContextAssociations' parameter is either 'null' or a Dictionary instance whose keys are ServiceContext instances and whose values are String instances, based on the semantics as defined above by setMultiScreenConfiguration.

If the calling thread has not been granted 'MonitorAppPermission("multiscreen.configuration")', the 'requestMultiScreenConfigurationChange' method 1378 generates 'java.lang.SecurityException'.

If the 'configuration' parameter is not one of this (display) screen's multiscreen configurations as would be returned by MultiScreenContext.getMultiScreenConfigurations( ),the 'requestMultiScreenConfigurationChange' method 1378 generates 'java.lang.IllegalArgumentException'.

If this screen is not a display screen or (1) if the MSM implementation does not permit activation of the specified multiscreen configuration, (2) if the 'setMultiScreenConfiguration' method 1378 was previously called and the change processing steps has not yet been completed, or (3) if activation is not otherwise permitted at the time of method invocation, the 'setMultiScreenConfiguration' method 1378 generates 'java.lang.IllegalStateException'.

The 'requestMultiScreenConfigurationChange' method 1378 has been applied since the MSM I01 version.

The 'getClient' method 1362 may be declared as 'org.davic.resources.ResourceClient getClient( )', and the resource client that currently holds the reservation on the underlying screen and screen resources associated with this HScreen instance is obtained.

The getClient' method 1362 is also specified by 'getClient' of the 'org.davic.resources.ResourceProxy' interface.

The 'getClient' method 1362 returns a ResourceClient instance or returns 'null' if the underlying screen and screen resources associated with this HScreen are not reserved.

The 'getClient' method 1362 has been applied since the MSM I01 version.

The 'reserveScreen' method 1380 may be declared as 'boolean reserveScreen(org.davic.resources.ResourceClient client, java.lang.Object requestData)', and underlying resources of this screen are atomically reserved.

If reserving a screen may be considered equivalent to reserving all HScreenDevice instances associated with the screen, except that when the screen is reserved using the 'reserveScreen' method 1380, individual HScreenDevice instances may not be released without first releasing all HScreenDevice instances and all underlying screen resources of this screen.

If when reserving a screen, some HScreenDevice of the screen have already been reserved by another application, then that reservation must be successfully released (by the MSM implementation) prior to granting reservation to the screen. If the reservation is not or cannot be released, then an attempt to reserve the screen may fail. That is, the 'reserveScreen' method 1380 may return 'false'.

If when reserving a screen, some HScreenDevice of the screen have already been reserved by the reserving application, then that reservation may be implicitly subsumed by the successful reservation of the entire screen.

If an attempt to reserve a screen using the 'reserveScreen' method 1380 succeeds, i.e., if the 'reserveScreen' method 1380 returns 'true', then getClient( ) of all HScreenDevice instances of the screen may return the same value as the getClient( ) method 1362 defined by the 'org.ocap.ui.MultiScreenConfigurableContext' interface 1210 (as implemented by the concrete implementation of HScreen).

If this screen was previously unreserved and invocation of the 'reserveScreen' method 1380 causes the screen to be reserved, then, prior to returning from the 'reserveScreen' method 1380, a MultiScreenResourceEvent.MULTI_SCREEN_RESOURCE_SCREEN_RESERVED event may be generated.

If the calling application has already held a reservation on this screen and if the specified client and requestData arguments are identical to those specified when the calling application was previously granted the reservation, then the 'reserveScreen' method 1380 may have no side effect and return 'true'. However, if the calling application has already held a reservation on this screen but either the specified client or requestData argument differs from those specified when the calling application was previously granted the reservation, then (1) the specified client and requestData arguments may be replaced with those previously specified, (2) the calling application may retain the reservation, and (3) the 'reserveScreen' method 1380 may return 'true'.

The 'client' parameter may be a 'ResourceClient' instance. The 'requestData' parameter is either 'null' or an Object instance that implements the java.rmi.Remote interface.

The 'reserveScreen' method 1380 returns 'true' if underlying resources of screen were successfully reserved, and otherwise returns 'false'. The 'reserveScreen' method 1380 has been applied since the MSM I01 version, and 'Remote' is referred.

The 'releaseScreen' method 1370 may be declared as 'void releaseScreen( )', and underlying resources of the screen is atomically released.

If the calling application does not hold a reservation on this screen, then the 'releaseScreen' method 1370 may have no side effect.

If this screen was previously reserved and invocation of the 'releaseScreen' method 1370 causes the screen to be no longer reserved (i.e., to be unreserved), then, a MultiScreenResourceEvent.MULTI_SCREEN_RESOURCE_SCREEN_RELEASED event may be generated before a value is returned from the 'releaseScreen' method 1370.

The 'releaseScreen' method 1370 has been applied since the MSM I01 version.

FIG. 14A illustrates a definition of a 'MultiScreenConfiguration' interface of the 'org.ocap.ui' package according to an exemplary embodiment of the present invention.

The 'MultiScreenConfiguration' interface may be declared as 'public interface MultiScreenConfiguration'.

The MultiScreenConfiguration interface implemented by an OCAP host platform provides information on a discrete screen configuration as well as a mechanism for monitoring changes to the screen configuration.

An MSM implementation may support at least one multiscreen configuration whose configuration type is SCREEN_CONFIGURATION_DISPLAY.

An the MSM implementation may support at least one multiscreen configuration whose configuration type is SCREEN_CONFIGURATION_NON_PIP.

The MSM implementation implements PIP functionality and permits the presentation of a PIP screen during an OCAP operation, then the MSM implementation may support the multiscreen configuration SCREEN_CONFIGURATION_PIP.

If the MSM implementation implements POP functionality and permits the presentation of a POP screen during the OCAP operation, then the MSM implementation may support the multiscreen configuration SCREEN_CONFIGURATION_POP.

If the MSM implementation implements PIP, POP, or OVERLAY functionality in a discrete configuration being not explicitly specified below by a non-general multiscreen configuration, then the MSM implementation may support one or more multiscreen configurations of configuration type SCREEN_CONFIGURATION_GENERAL that represent each such multiscreen configuration.

The 'MultiScreenConfiguration' interface 1220 of the 'org.ocap.ui' package has been applied since the MSM I01 version.

FIG. 14B illustrates a field 1400 of a 'MultiScreenConfiguration' interface of the 'org.ocap.ui' package according to an exemplary embodiment of the present invention.

The field 1400 of the 'MultiScreenConfiguration' interface of the 'org.ocap.ui' package includes at least one of: a 'static java.lang.String SCREEN_CATEGORY_DISPLAY' field 1402, a 'static java.lang.String SCREEN_CATEGORY_GENERAL' field 1404, a 'static java.lang.String SCREEN_CATEGORY_MAIN' field 1406, a 'static java.lang.String SCREEN_CATEGORY_NONE' field 1408, a 'static java.lang.String SCREEN_CATEGORY_OVERLAY' field 1410, a 'static java.lang.String SCREEN_CATEGORY_PIP' field 1412, a 'static java.lang.String SCREEN_CATEGORY_POP' field 1414, a 'static java.lang.String SCREEN_CONFIGURATION_DISPLAY' field 1416, a 'static java.lang.String SCREEN_CONFIGURATION_GENERAL' field 1418, a 'static java.lang.String SCREEN_CONFIGURATION NON_PIP' field 1420, a 'static java.lang.String SCREEN_CONFIGURATION_PIP' field 1422, and a 'static java.lang.String SCREEN_CONFIGURATION_POP' field 1424.

The 'SCREEN_CONFIGURATION_DISPLAY' field 1416 may be declared as 'static final java.lang.String SCREEN_CONFIGURATION_DISPLAY'. If 'MultiScreenConfiguration' is associated with one or more display screens and is a candidate for being used as a per-platform multiscreen configuration, then its configuration type is the SCREEN_CONFIGURATION_DISPLAY field 1416.

The initial default screen of the configuration type of the SCREEN_CONFIGURATION_DISPLAY field 1416 may be a first screen returned by getScreens(SCREEN_CATEGORY_MAIN). If there is no such categorized screen in the configuration, then initial default screen of the configuration type of the SCREEN_CONFIGURATION_DISPLAY field 1416 may be the first screen returned by getScreens( ).

The 'SCREEN_CONFIGURATION_DISPLAY' field 1416 has been applied since the MSM I01 version.

The 'SCREEN_CONFIGURATION_NON_PIP' field 1420 may be declared as 'static final java.lang.String SCREEN_CONFIGURATION_NON_PIP'. If a MultiScreenConfiguration is associated with exactly one screen whose category is SCREEN_CATEGORY_MAIN, then its configuration type is SCREEN_CONFIGURATION_NON_PIP.

The initial default screen of the configuration type of the SCREEN_CONFIGURATION_NON_PIP field 1420 may be a first screen returned by getScreens(SCREEN_CATEGORY_MAIN).

A MultiScreenConfiguration instance that is categorized as having the configuration type of the SCREEN_CONFIGURATION_NON_PIP field 1420 may not contain more than one display screen.

The 'SCREEN_CONFIGURATION_NON_PIP' field 1420 has been applied since the MSM I01 version.

The 'SCREEN_CONFIGURATION_PIP' field 1422 may be declared as 'static final java.lang.String SCREEN_CONFIGURATION_PIP'. If a MultiScreenConfiguration is (1) associated with one logical screen with default z-order of zero mapped to the entire area of a single display screen, and (2) associated with one or more nonintersecting logical screens with default z-order of one mapped to the same display screen, then its configuration type is the SCREEN_CONFIGURATION_PIP field 1422.

The initial default screen of the configuration type of the SCREEN_CONFIGURATION_PIP field 1422 may be a first screen returned by getScreens(SCREEN_CATEGORY_MAIN), or, if there is no screen categorized as the SCREEN_CATEGORY_MAIN field 1406 in the configuration, then the initial default screen of the configuration type of the SCREEN_CONFIGURATION_PIP field 1422 may be a first screen returned by getScreens( ).

A MultiScreenConfiguration instance that is categorized as having the configuration type of the SCREEN_CONFIGURATION_PIP field 1422 may not contain more than one display screen.

The 'SCREEN_CONFIGURATION_PIP' field 1422 has been applied since the MSM I01 version.

The 'SCREEN_CONFIGURATION_POP' field 1424 may be declared as 'static final java.lang.String SCREEN_CONFIGURATION_POP'. If a MultiScreenConfiguration is associated with two or more non-intersecting logical screens with default z-order of zero whose default display areas (in union) tile the entire area of a single display screen, then its configuration type is the SCREEN_CONFIGURATION_POP field 1424.

The initial default screen of the configuration type of the SCREEN_CONFIGURATION_POP field 1424 may be a first screen returned by getScreens(SCREEN_CATEGORY_POP), or, if there is no screen categorized as the 'SCREEN_CATEGORY_POP' field 1414 in the configuration, then the initial default screen of the configuration type of the SCREEN_CONFIGURATION_POP field 1424 may be a first screen returned by getScreens( ).

A MultiScreenConfiguration instance that is categorized as having the configuration type of the SCREEN_CONFIGURATION_POP field 1424 may not contain more than one display screen.

The 'SCREEN_CONFIGURATION_POP' field 1424 has been applied since the MSM I01 version.

The 'SCREEN_CONFIGURATION_GENERAL' field 1418 may be declared as 'static final java.lang.String SCREEN_CONFIGURATION_GENERAL'. If a MultiScreenConfiguration cannot be categorized as one of the other predefined screen configuration types, then its configuration type is the SCREEN_CONFIGURATION_GENERAL field 1418.

The initial default screen of the configuration type of the SCREEN_CONFIGURATION_GENERAL 1418 may be a first screen returned by getScreens(SCREEN_CATEGORY_MAIN). If there is no screen categorized as the SCREEN_CATEGORY_GENERAL field 1404 in the configuration, then the initial default screen of the configuration type of the SCREEN_CONFIGURATION_GENERAL 1418 may be a first screen returned by getScreens( ).

A MultiScreenConfiguration instance that is categorized as having the configuration type of the SCREEN_CONFIGURATION_GENERAL 1418 may not contain more than one display screen.

The 'SCREEN_CONFIGURATION_GENERAL' field 1418 has been applied since the MSM I01 version.

The 'SCREEN_CATEGORY_NONE' field 1408 may be declared as 'static final java.lang.String SCREEN_CATEGORY_NONE'. If an HScreen instance is not associated with any other more specific category, then its category is the SCREEN_CATEGORY_NONE field 1408.

A MultiScreenConfiguration instance that is categorized as having the configuration type of the SCREEN_CATEGORY_NONE field 1408 may not contain more than one display.

The 'SCREEN_CATEGORY_NONE' field has been applied since the MSM I01 version.

The 'SCREEN_CATEGORY_DISPLAY' field 1402 may be declared as 'static final java.lang.String SCREEN_CATEGORY_DISPLAY'. If a display HScreen instance is characterized as a non-main screen, then its category is the SCREEN_CATEGORY_DISPLAY field 1402. A display screen assigned this category may not be populated by an HBackgroundDevice or an HVideoDevice but may be populated by one or more HGraphicsDevice instances that serve as overlays.

A display HScreen instance that is categorized as the SCREEN_CATEGORY_DISPLAY field 1402 has the exceptional property that its HGraphicsDevice instances, if any exist, may overlay all logical screens mapped to the display screen. This property may not hold even though MultiScreenContext.getZOrder( ) returns '0' for any display screen.

The exceptional property described above is intended to support (1) legacy device scenarios where a closed caption overlay appears over all other content, and (2) configurations where, rather than treating an overlay screen as a separate logical screen, an overlay screen is considered as an integral HGraphicsDevice of the display screen.

The 'SCREEN_CATEGORY_DISPLAY' field 1402 has been applied since the MSM I01 version.

The 'SCREEN_CATEGORY_MAIN' field 1406 may be declared as 'static final java.lang.String SCREEN_CATEGORY_MAIN'. If a display or logical HScreen instance is characterized as a main screen, then its category is the SCREEN_CATEGORY_MAIN field 106. A logical screen assigned this category may be mapped to the full area of some display screens and may be assigned a default z-order of 'zero.

The SCREEN_CATEGORY_MAIN' field 1406 has been applied since the MSM I01 version.

The 'SCREEN_CATEGORY_PIP' field 1412 may be declared as 'static final java.lang.String SCREEN_CATEGORY_PIP'. If a logical HScreen instance is characterized as a picture-in-picture (PIP) screen, then its category is the SCREEN_CATEGORY_PIP field 1412. A logical screen assigned this category may not be mapped to the full area of some display screens, may not be assigned a screen z-order of zero, and may co-exist in a configuration to which some screens are assigned the category SCREEN_CATEGORY_MAIN 1406.

The 'SCREEN_CATEGORY_PIP' field 1412 has been applied since the MSM I01 version.

The 'SCREEN_CATEGORY_POP' field 1414 may be declared as 'static final java.lang.String SCREEN_CATEGORY_POP'. If a logical HScreen instance is characterized as a POP screen, then its category is the SCREEN_CATEGORY_POP field 1414. A logical screen assigned this category may not be mapped to the full area of some display screens, may not co-exist in a configuration to which some screens are assigned the category SCREEN_CATEGORY_MAIN 1406, and may co-exist in a configuration to which some other screens are assigned the category SCREEN_CATEGORY_POP 1414.

The 'SCREEN_CATEGORY_POP' field 1414 has been applied since the MSM I01 version.

The 'SCREEN_CATEGORY_OVERLAY' field 1410 may be declared as 'static final java.lang.String SCREEN_CATEGORY_OVERLAY'. If a logical HScreen instance is characterized as an overlay screen, then its category is the SCREEN_CATEGORY_OVERLAY field 1410. A logical screen assigned this category may be mapped to the full area of some display screen, may be assigned a default z-order greater than any screen associated with one of the following categories: the SCREEN_CATEGORY_MAIN field 1406, the SCREEN_CATEGORY_PIP 1412, and the SCREEN_CATEGORY_POP 1414, and may not contain a background or an explicit video plane (HVideoDevice).

Notwithstanding the above, an overlay screen may make use of the resources of an implied video plane (HVideoDevice) for the purpose of presenting component-based video in (one of) its graphics plane(s).

The 'SCREEN_CATEGORY_OVERLAY' field 1410 has been applied since the MSM I01 version.

The 'SCREEN_CATEGORY_GENERAL' field 1404 may be declared as 'static final java.lang.String SCREEN_CATEGORY_GENERAL'. If a logical HScreen instance is capable of being configured (e.g., in terms of its size, position, or z-order) such that it may operate in a mode that would have suggested assignment of two or more of the other screen categories, then its category may be the SCREEN_CATEGORY_GENERAL field 1404. A logical screen assigned this category may not be constrained in size, position, z-order, or other configurable properties except to the extent that the terminal device places intrinsic limitations on one (or more) configurable properties.

The 'SCREEN_CATEGORY_GENERAL' field 1404 has been applied since the MSM I01 version.

FIG. 14C illustrates a method 1450 of a 'MultiScreenConfiguration' interface of the 'org.ocap.ui' package according to an exemplary embodiment of the present invention.

The method 1450 of the 'MultiScreenConfiguration' interface of the 'org.ocap.ui' package includes at least one of: a 'java.lang.String getConfigurationType( )' method 1452, an 'org.havi.ui.HScreen getDefaultServiceContextScreen( )' method 1454, an 'org.havi.ui.HScreen[ ] getScreens( )' method 1456, an 'org.havi.ui.HScreen[ ] getScreens(java.lang.String category)' method 1458, a 'boolean hasOverlayScreen( )' method 1460, a 'boolean isScreenInConfiguration (org.havi.ui.HScreen screen)' method 1462, and a 'void setDefaultServiceContextScreen' method 1464.

The 'getConfigurationType' method 1452 may be declared as 'java.lang.String getConfigurationType( )', and the screen configuration type of this configuration is obtained. If more than one non-general configuration type may be applied or if the configuration type is unknown or cannot be determined, then the value of the SCREEN_CONFIGURATION_GENERAL method 1418 may be returned.

The 'getConfigurationType' method 1452 returns a string that is either (i) an element from among the 'SCREEN_CONFIGURATION_DISPLAY' method 1416, the 'SCREEN_CONFIGURATION_NON_PIP' method 1420, the 'SCREEN_CONFIGURATION_PIP' method 1422, the 'SCREEN_CONFIGURATION_POP' method 1424, and the 'SCREEN_CONFIGURATION_GENERAL' method 1418, or (ii) a string value that denotes a platform-dependent configuration type and that starts with the prefix "x-".

The 'getConfigurationType' method 1452 has been applied since the MSM I01 version.

The 'getScreens( )' method 1456 may be declared as 'org.havi.ui.HScreen[ ] getScreens( )', and the set of accessible screens associated with this configuration is obtained.

The underlying resources of a given HScreen instance returned by the 'getScreens( )' method 1456 may be shared with an HScreen instance included in another multiscreen configuration. However, the shared resources may be active in no more than one multiscreen configuration at a given time. The order of entries in the returned array of HScreen instances is implementation dependent.

Given the values of any two distinct entries of the returned array, S1 and S2, and given the singleton instance of the MultiScreenManager, MSM, then the following constraints are applied during the interval between the time when the 'getscreens( )' method 1456 returns and the time when a MultiScreenConfigurationEvent.MULTI_SCREEN_CONFIGURATION_CHANGING event is generated and dispatched:

MSM.isEmptyScreen(S1) shall be 'false';

MSM.isEmptyScreen(S2) shall be 'false';

MSM.sameResources(S1,S2) shall be 'false';

If invoked by an application that does not have MonitorAppPermission ("multiscreen.configuration") then the screens of this configuration that are not associated with a ServiceContext instance accessible by the application may not be returned; otherwise, all accessible screens of this configuration may be returned.

Over the course of an application's lifecycle, and except as constrained below, an MSM implementation may add screens to or remove screens from a multiscreen configuration, in which case it may generate a MultiScreenConfigurationEvent.MULTI_SCREEN_CONFIGURATION_SCREEN_ADDED or MultiScreenConfigurationEvent.MULTI_SCREEN_CONFIGURATION_SCREEN_REMOVED event, respectively.

A screen may not be added to or removed from a multiscreen configuration that is the currently active per-platform multiscreen configuration or some currently active per-display multiscreen configuration.

The MSM implementation must wait until a multiscreen configuration is no longer the currently active multiscreen configuration in order to add or remove screens from that configuration.

During any time interval in which no MultiScreenConfigurationEvent.MULTI_SCREEN_CONFIGURATION_SCREEN_ADDED or MultiScreenConfigurationEvent.MULTI_SCREEN_CONFIGURATION_SCREEN_REMOVED event is generated, the set of returned HScreen instances and the order of these returned instances may not be changed from the perspective of a given application.

An MSM implementation may not remove nor generate a MultiScreenConfigurationEvent.MULTI_SCREEN_CONFIGURATION_SCREEN_REMOVED event that would have the effect of removing (or reporting the removal) from this multiscreen configuration an HScreen instance whose underlying resources represent the same underlying resources of some non-destroyed application's default HScreen instance.

The 'getScreens( )' method 1456 returns an 'HScreen' array. The returned 'HScreen' array may be an empty array.

The 'getScreens( )' method 1456 has been applied since the MSM I01 version.

The 'getScreens(String)' method 1458 may be declared as 'org.havi.ui.HScreen[ ] getScreens(java.lang.String category)', and all accessible screens with a given category is obtained.

The 'getScreens(String)' method 1458 may function identically to the getScreens( ) method 1456 except as follows: If category is not null, then return only those screens assigned the specified category, or, if no such screen exists, then return an empty HScreen array; otherwise, if category is null, then return the same value as the getScreens( ) method 1456.

The category parameter may be one of the following values: (1) null, (2) an element of the following enumeration: {the SCREEN_CATEGORY_NONE 1408, the SCREEN_CATEGORY_DISPLAY 1402, the SCREEN_CATEGORY_MAIN 1406, the SCREEN_CATEGORY_PIP 1412, the SCREEN_CATEGORY_POP 1414, the SCREEN_CATEGORY_OVERLAY 1410, and the SCREEN_CATEGORY_GENERAL 1404}, or (3) a platform-dependent string value not pre-defined as a screen category but that may be returned by getScreenCategory(HScreen).

The 'getScreens(String)' method 1458 returns an 'HScreen' array. The returned 'HScreen' array returned by the 'getScreens(String)' method 1458 may be empty.

The 'getScreens(String)' method 1458 has been applied since the MSM I01 version.

The 'hasOverlayScreen( )' method 1460 may be declared as 'boolean hasOverlayScreen( )', and it is determined if the set of screens associated with this configuration includes an overlay screen, i.e., a screen whose category is the SCREEN_CATEGORY_OVERLAY 1410.

The 'hasOverlayScreen( )' method 1460 returns 'true' if getScreens(SCREEN_CATEGORY_OVERLAY) would return a non-empty array; otherwise, it returns 'false'.

The 'hasOverlayScreen( )' method 1460 has been applied since the MSM I01 version.

The 'getDefaultServiceContextScreen( )' method 1454 may be declared as 'org.havi.ui.HScreen getDefaultServiceContextScreen( )', and the default service context association screen of this configuration is obtained.

The default service context association screen of a multiscreen configuration is the screen with which ServiceContext instances are associated when the configuration becomes active in case that no more specific information is available to determine how to associate a ServiceContext instance with a screen.

The following constraints are applied:

1. if this multiscreen configuration is a per-platform display multiscreen configuration, then the default service context association screen may be a screen associated with the per-display multiscreen configuration of some display screens associated with this multiscreen configuration;
2. otherwise, if this multiscreen configuration is a per-display multiscreen configuration, then the default service context association screen may be a display screen or a logical screen associated with this multiscreen configuration.

The 'getDefaultServiceContextScreen( )' method 1454 returns an HScreen instance that serves as the default service context screen for this configuration.

If the calling thread has not been granted MonitorAppPermission("multiscreen.configuration", the 'getDefaultServiceContextScreen( )' method 1454 generates 'java.lang.SecurityException'.

The 'getDefaultServiceContextScreen( )' method 1454 has been applied since the MSM I01 version.

The 'setDefaultServiceContextScreen' method 1464 may be declared as 'void setDefaultServiceContextScreen (org.havi.ui.HScreen screen)', and the default service context association screen of this configuration is set.

The default service context association screen of a multiscreen configuration is the screen with which ServiceContext instances are associated when the configuration becomes active in case that no more specific information is available to determine how to associate a ServiceContext instance with a screen.

The 'screen' parameter may be an HScreen instance to be designated as the default service context association screen for this multiscreen configuration.

If the calling thread has not been granted 'MonitorAppPermission("multiscreen.configuration")', the 'setDefaultServiceContextScreen' method 1464 generates 'java.lang.SecurityException' If the constraints specified above under the getDefaultServiceContextScreen( ) 1454 are not satisfied, the 'setDefaultServiceContextScreen' method 1464 generates 'java.lang.IllegalArgumentException'.

The 'setDefaultServiceContextScreen' method 1464 has been applied since the MSM I01 version.

The 'isScreenInConfiguration(HScreen)' method 1462 may be declared as 'boolean isScreenInConfiguration (org.havi.ui.HScreen screen)'. The 'isScreenInConfiguration (HScreen)' method 1462 determines if the underlying resources of a specified screen is represented by an HScreen instance included in the set of screens associated with this configuration.

The 'screen' parameter may be a 'HScreen' parameter.

The 'isScreenInConfiguration(HScreen)' method 1462 returns 'true' if the underlying resources specified screen is represented by an HScreen instance included in this configuration; otherwise it returns 'false'.

The 'isScreenInConfiguration(HScreen)' method 1462 has been applied since the MSM I01 version.

FIG. 15A illustrates definition of the 'MultiScreenContext' interface 1230 of the 'org.ocap.ui' package according to an exemplary embodiment of the present invention.

All known subinterfaces of the 'MultiScreenContext' interface 1230 of the 'org.ocap.ui' package include 'MultiScreenConfigurableContext', and are declared as 'public interface MultiScreenContext'.

The 'MultiScreenContext' interface 1230 provides a set of tools for accomplishing the following:

1. distinguishing between HScreen instances that are directly associated with a VideoOutputPort and those that are indirectly associated with a VideoOutputPort through a logical mapping process; i.e., discovering whether an HScreen is a display screen or a logical screen;
2. discovering the unique platform identifier of an HScreen instance's underlying resource;
3. discovering the category assigned to an HScreen within its containing MultiScreenConfiguration;

4. discovering the mapping of logical HScreens to display HScreens including the area (extent) on the display HScreen where the logical HScreen appears, its visibility, and its z-order;
5. discovering the z-order of HScreenDevices within an HScreen;
6. discovering the set of ServiceContexts associated with an HScreen;
7. discovering the association of display HScreens and corresponding VideoOutputPort instances;
8. discovering the set of HScreenDevices whose generated audio constitute the set of audio sources of an HScreen;
9. discovering the current audio focus assignment of a display HScreen;
10. obtaining notification of changes in state of this MultiScreenContext or certain changes in the HScreen instance that implements this interface;
11. obtaining notification of changes to the per-display multiscreen configuration of a display screen;
12. discovering the set of per-display multiscreen configurations that may be used with a display screen; and
13. obtaining the currently active per-display multiscreen configuration of a display screen.

If an OCAP implementation does not support the OCAP Multiscreen Manager (MSM) Extension and does not otherwise support the 'MultiScreenContext' interface 1230, then an OCAP application may assume that the behavior of an HScreen is equivalent to an HScreen instance that does implement this interface, MultiScreenContext, whose methods would behave as follows:

getScreenType( ) returns SCREEN_TYPE_DISPLAY;
getID( ) returns a platform dependent (possibly empty) string;
getScreenCategory( ) returns the string "main";
getVisible( ) returns 'true';
getZOrder( ) returns '0';
getZOrder(HScreenDevice device) returns the array index of device in an array of HScreenDevice instances created by concatenating the ordered results of invoking on this HScreen instance the methods HScreen.getHBackgroundDevices( ), then HScreen.getHVideoDevices( ), then HScreen.getHGraphicsDevices( ), or throws an IllegalArgumentException in case device is not present in this array;
getAudioSources( ) returns an array of HScreenDevice instances created by concatenating the ordered results of invoking on this HScreen instance the methods HScreen.getHBackgroundDevices( ), then HScreen.getHVideoDevices( ), then HScreen.getHGraphicsDevices( );
getAudioFocus( ) returns this HScreen instance;
getOutputPorts( ) returns an array containing all VideoOutputPorts available on the platform;
getDisplayScreen( ) returns this HScreen instance;
getDisplayArea( ) returns new HScreenRectangle(0,0,1,1); and
getContexts( ) returns an array containing all ServiceContexts that are accessible by the current application;

An MSM implementation may support the MultiScreenContext interface 1230 on every HScreen instance.

The 'MultiScreenContext' interface 1230 of the 'org.ocap.ui' package has been applied since the MSM I01 version.

FIG. 15B illustrates a field 1500 of the 'MultiScreenContext' interface 1230 of the 'org.ocap.ui' package according to an exemplary embodiment of the present invention.

The field 1500 of the 'MultiScreenContext' interface 1230 of the 'org.ocap.ui' package includes at least one of a 'static int SCREEN_TYPE_DISPLAY' field 1502 and 'static int SCREEN_TYPE_LOGICAL field 1504.

The 'SCREEN_TYPE_DISPLAY' field 1502 may be declared as 'static final int SCREEN_TYPE_DISPLAY'. If an HScreen is directly associated with a VideoOutputPort and the extent of the HScreen is mapped to the extent of the video raster produced from the VideoOutputPort, then the type of the HScreen is SCREEN_TYPE_DISPLAY, and is referred to as a display HScreen.

The 'SCREEN_TYPE_DISPLAY' field 1502 has been applied since the MSM I01 version.

The 'SCREEN_TYPE_LOGICAL' field 1504 may be declared as 'static final int SCREEN_TYPE_LOGICAL'. If an HScreen is not directly associated with a VideoOutputPort or the extent of the HScreen is mapped to a sub-region of the video raster produced from some VideoOutputPort, then the type of the HScreen is SCREEN_TYPE_LOGICAL, and is referred to as a logical HScreen. A logical HScreen may be associated with a display HScreen. If a logical HScreen is not associated with a display HScreen, then a visible or audible manifestation may not be produced by any ServiceContextassociated with the logical HScreen.

A logical HScreen that is not associated with a display HScreen may decode and use content for some purpose other than presentation. For example, the logical HScreen may record the content from a ServiceContext for future presentation.

The 'SCREEN_TYPE_LOGICAL' field 1504 has been applied since the MSM I01 version.

FIGS. 15C and 15D illustrate a method 1550 of the 'MultiScreenContext' interface 1230 of the 'org.ocap.ui' package according to an exemplary embodiment of the present invention.

The method 1550 of the 'MultiScreenContext' interface 1230 of the 'org.ocap.ui' package includes at least one of: a 'void addMultiScreenConfigurationListener (MultiScreenConfigurationListener listener)' method 1552, a 'void addScreenContextListener (MultiScreenContextListener listener)' method 1554, an 'org.havi.ui.HScreen getAudioFocus( )' method 1556, an 'org.havi.ui.HScreenDevice[ ] getAudioSources( )' method 1558, an 'org.havi.ui.HScreenRectangle getDisplayArea( )' method 1560, an 'org.havi.ui.HScreen getDisplayScreen( )' method 1562, a 'java.lang.String getID( )' method 1564, a 'MultiScreenConfiguration getMultiScreenConfiguration( )' method 1566, a 'MultiScreenConfiguration[ ] getMultiScreenConfigurations( )' method 1568, a 'MultiScreenConfiguration[ ] getMultiScreenConfigurations(java.lang.String screenConfigurationType)' method 1570, an 'org.ocap.hardware.VideoOutputPort[ ] getOutputPorts( )' method 1572, a 'java.lang.String getScreenCategory( )' method 1574, an 'int getScreenType( )' method 1576, a 'javax.tv.service.selection.ServiceContext[ ] getServiceContexts( )' method 1578, a 'boolean getVisible( )' method 1580, an 'int getZOrder( )' method 1582, 'int getZOrder(org.havi.ui.HScreenDevice device)' method 1584, a 'void removeMultiScreenConfigurationListener(MultiScreenConfigurationListener listener)' method 1586, and a 'void removeScreenContextListener (MultiScreenContextListener listener)' method 1588.

The 'getScreenType( )' method 1576 may be declared as 'int getScreenType( )', and the type of this HScreen is obtained. The 'getScreenType( )' method 1576 returns an integer value denoted by 'SCREEN_TYPE_DISPLAY' or 'SCREEN_TYPE_LOGICAL'.

The 'getScreenType( )' method 1576 has been applied since the MSM I01 version.

The 'getID( )' method 1564 may be declared as 'java.lang.String getID( )', and a platform dependent unique identifier for the underlying collection of screen resources denoted by this screen is obtained, where the scope for uniqueness is not smaller than the set of screens associated with the currently active per-platform multiscreen configuration and all active per-display multiscreen configurations. It is implementation dependent whether the scope for screen identifier uniqueness includes other, non-active multiscreen configurations or not.

A screen identifier may not be equal to any screen category returned by getScreenCategory( ).

If S1 and S2 are instances of HScreen in the context of the implemented scope of uniqueness and MultiScreenManager.sameResources(S1,S2) returns 'false', then ((MultiScreenContext)S1).getID( ) and ((MultiScreenContext)S2).getID( ) may not return the same (equivalent) string. Conversely, if MultiScreenManager.sameResources (S1,S2) returns 'true', then ((MultiScreenContext)S1).getID( ) and (MultiScreenContext)S2).getID( ) may return the same (equivalent) string.

A string value denotes the collection of underlying resources this HScreen instance represents in the implemented scope of uniqueness.

The 'getID( )' method 1564 has been applied since the MSM I01 version.

The 'getScreenCategory( )' method 1574 may be declared as 'java.lang.String getScreenCategory( )', and the screen category of this HScreen instance is obtained. The 'getScreenCategory( )' method 1574 may be a string that is either (1) an element of the following enumeration of constants defined by MultiScreenConfiguration: {the 'SCREEN_CATEGORY_DISPLAY' field 1402, the 'SCREEN_CATEGORY_MAIN' field 1406, the 'SCREEN_CATEGORY_PIP' field 1412, the 'SCREEN_CATEGORY_POP' field 1414, the 'SCREEN_CATEGORY_OVERLAY' field 1410, and the 'SCREEN_CATEGORY_GENERAL' field 1404}, or (2) a string value that denotes a platform-dependent screen category and that starts with the prefix "x-".

The 'getScreenCategory( )' method 1574 has been applied since the MSM I01 version.

The 'getVisible( )' method 1580 may be declared as 'boolean getVisible( )', and screen visibility is obtained.

The 'getVisible( )' method 1580 determines whether this HScreen is marked as visible for presentation on some display HScreens, where "visible" is defined as producing a raster signal to a VideoOutputPort, regardless of whether or not the VideoOutputPort is enabled or disabled. A display HScreen may remain marked as visible. A logical HScreen may be visible or hidden (not visible).

The 'getVisible( )' method 1580 returns a boolean value indicating whether this HScreen is marked visible or not on some display HScreens.

The 'getVisible( )' method 1580 has been applied since the MSM I01 version.

The 'getZOrder( )' method 1582 may be declared as 'int getZOrder( )' and screen z-order is obtained, that is, the z-order of this HScreen is determined. An display HScreen may always return a z-order of zero. A logical HScreen may be assigned a z-order of '1' or greater, unless it is not associated with a display HScreen, in which case its z-order is '−1'. A greater z-order denotes a more front-most (top-most) order among a set of HScreen instances.

The 'getZOrder( )' method 1582 is a value indicating the z-order of this HScreen or '−1'. If this HScreen is a logical HScreen that is not associated with a display HScreen, then '−1' may be returned.

The 'getZOrder( )' method 1582 has been applied since the MSM I01 version.

The 'getZOrder(HScreenDevice)' 1584 may be declared as 'int getZOrder (org.havi.ui.HScreenDevice device)', and screen device z-order within this screen is obtained. That is, the 'getZOrder(HScreenDevice)' 1584 determines the z-order of a specified HScreenDevice with an HScreen where the following constraints are applied:

- if an HBackgroundDevice is present in this screen, then the z-order of the rear-most (bottommost) HBackgroundDevice is zero;
- if no HBackgroundDevice is present in this screen and if an HVideoDevice is present in this screen, then the z-order of the rear-most (bottom-most) HVideoDevice is zero;
- if neither HBackgroundDevice nor HVideoDevice is present in this screen and if an HGraphicsDevice is present in this screen, then the z-order of the rear-most (bottom-most) HGraphicsDevice is zero;
- the z-order of an HVideoDevice is greater than the z-order of any HBackgroundDevice in this screen; and
- the z-order of an HGraphicsDevice is greater than the z-order of any HVideoDevice in this screen.

A greater z-order denotes a more front-most (top-most) order among a set of HScreenDevice instances within an HScreen instance.

Each distinct set of underlying screen devices represented as an HScreen instance constitutes a distinct z-ordering. That is, given multiple HScreen instances representing distinct underlying screens, the set of z-order values assigned to the underlying screen device resources of these screens may reuse the same z-order indices.

The device parameter may be an HScreenDevice that is associated with this screen.

The 'getZOrder(HScreenDevice)' 1584 returns a non-negative value indicating the z-order of the specified HScreenDevice.

If the device is not an HScreenDevice of this screen, the 'getZOrder(HScreenDevice)' 1584 generates 'java.lang.IllegalArgumentException'.

The 'getZOrder(HScreenDevice)' 1584 has been applied since the MSM I01 version.

The 'getAudioSources( )' method 1558 may be declared as 'org.havi.ui.HScreenDevice[ ] getAudioSources( )', and audio sources of this screen are obtained. That is, the 'getAudioSources( )' method 1558 obtains the set of HScreenDevice from which presented audio is selected (and mixed) for the purpose of audio presentation from this screen.

The default set of audio sources of a screen consists of all HScreenDevice instances association with the screen.

The order of entries in the array returned by the 'getAudioSources( )' method 1558 is not limited to that which is defined by the present specification and may be considered implementation dependent.

The 'getAudioSources( )' method 1558 returns a reference to an (possibly empty) array of HScreenDevice instances, where each such instance contributes to a mixed audio presentation from this screen, or, if this screen does not support mixed audio, then at most one entry will be present in the returned array.

The 'getAudioSources( )' method 1558 has been applied since the MSM I01 version.

The 'getAudioFocus( )' method 1556 may be declared as 'org.havi.ui.HScreen getAudioFocus( )', and the audio focus screen is obtained.

The audio focus screen of this HScreen is determined according to the following ordered rules, where the first rule applied is used and others are ignored:

1. If this HScreen is a logical screen, then apply the following ordered sub-rules:
   a. If this logical HScreen is mapped to a display screen, then apply the following subrules:

i. If this logical HScreen is currently assigned audio focus in the context of its display screen, then this logical HScreen is returned.

ii. Otherwise (not currently assigned audio focus in its display screen), 'null' is returned.

b. Otherwise (not mapped to a display screen), if this logical HScreen is directly mapped to a video output port, then this HScreen is returned.

c. Otherwise (not mapped to a display screen and not directly mapped to a video output port), 'null' is returned.

2. Otherwise (this HScreen is a display screen), apply the following sub-rules:

a. If some logical screens mapped to this display screen are assigned audio focus, then that logical HScreen is returned;

b. Otherwise (no logical screen is mapped to this display screen or no logical screen mapped to this display screen is assigned audio focus), then return this display HScreen.

The audio focus screen of a display screen is the screen whose currently selected audio sources are assigned to be rendered on all (implied) audio presentation devices of all video output ports to which the display screen is mapped.

The 'getAudioFocus( )' method 1556 returns an HScreen instance or null as described above.

The 'getAudioFocus( )' method 1556 has been applied since the MSM I01 version.

The 'getOutputPorts( )' method 1572 may be declared as 'org.ocap.hardware.VideoOutputPort[ ] getOutputPorts( )', and video ports to which a screen is mapped are obtained. That is, the 'getOutputPorts( )' method 1572 obtains the set of VideoOutputPorts associated with this HScreen. If this HScreen's type is SCREEN_TYPE_DISPLAY, then the VideoOutputPort instances associated with this display screen may be returned. If this HScreen's type is SCREEN_TYPE_LOGICAL and this HScreen is associated with a display HScreen, then the VideoOutputPort instances associated with that display HScreen may be returned. If this HScreen's type is SCREEN_TYPE_LOGICAL and this HScreen is not associated with a display HScreen, then an empty array may be returned.

The 'getOutputPorts( )' method 1572 returns a reference to an array of VideoOutputPort instances. If the returned array is empty, then this HScreen is not associated with any VideoOutputPort.

The 'getOutputPorts( )' method 1572 has been applied since the MSM I01 version.

The 'getDisplayScreen( )' method 1562 may be declared as 'org.havi.ui.HScreen getDisplayScreen( )', and a display screen associated with this screen is obtained. That is, the 'getDisplayScreen( )' method 1562 obtains the display HScreen associated with this HScreen.

If this HScreen's type is SCREEN_TYPE_DISPLAY, then a reference to this HScreen may be returned. If this HScreen's type is SCREEN_TYPE_LOGICAL and this HScreen is associated with a display HScreen, then that display HScreen may be returned. If this HScreen's type is SCREEN_TYPE_LOGICAL and this HScreen is not associated with a display HScreen, then the value 'null' may be returned.

The 'getDisplayScreen( )' method 1562 returns a reference to a display HScreen instance or 'null'. If 'null' is returned, then this HScreen is not associated with a display HScreen.

The 'getDisplayScreen( )' method 1562 has been applied since the MSM I01 version.

The 'getDisplayArea( )' method 1560 may be declared as 'org.havi.ui.HScreenRectangle getDisplayArea( )', and an area of the display screen to which this screen is mapped is obtained. The 'getDisplayArea( )' method 1560 obtains the area (extent) of this HScreen. If this HScreen's type is SCREEN_TYPE_DISPLAY, then an HScreenRectangle whose value is equal to HScreenRectangle(0,0,1,1) may be returned. If this HScreen's type is SCREEN_TYPE_LOGICAL and this HScreen is associated with a display HScreen, then the area (extent) occupied by this logical HScreen on its associated display HScreen may be returned. If this HScreen's type is SCREEN_TYPE_LOGICAL and this HScreen is not associated with a display HScreen, then the value 'null' may be returned.

The 'getDisplayArea( )' method 1560 returns a reference to an HScreenRectangle instance or 'null'. If 'null' is returned, then this HScreen is not associated with a display HScreen.

The 'getDisplayArea( )' method 1560 has been applied since the MSM I01 version.

The 'getServiceContexts( )' method 1578 may be declared as 'javax.tv.service.selection.ServiceContext[ ] getServiceContexts( )', and service contexts associated with this screen is obtained. That is, The 'getServiceContexts( )' method 1578 obtains the set of ServiceContexts associated with this HScreen to which the calling application is granted access.

The 'getServiceContexts( )' method 1578 returns a reference to an array of ServiceContext instances. If the returned array is empty, then this HScreen is not associated with any accessible ServiceContext.

The 'getServiceContexts( )' method 1578 has been applied since the MSM I01 version.

The 'addScreenContextListener(MultiScreenContextListener)' method 1554 may be declared as 'void addScreenContextListener(MultiScreenContextListener listener)', and a screen context listener is added. That is, the 'addScreenContextListener(MultiScreenContextListener)' method 1554 adds a listener to be notified upon the occurrence of screen context events. If a listener has previously been added and not subsequently removed, then an attempt to add it again may not produce any side effect.

The listener parameter may be a MultiScreenContextListener instance.

The 'addScreenContextListener(MultiScreenContextListener)' method 1554 has been applied since the MSM I01 version.

The 'removeScreenContextListener(MultiScreenContextListener)' method 1588 may be declared as 'void removeScreenContextListener(MultiScreenContextListener listener)', and the screen context listener is removed. That is, the 'removeScreenContextListener(MultiScreenContextListener)' method 1588 removes a listener previously added to be notified upon the occurrence of screen context events. If the specified listener is not currently registered as a listener, then an attempt to remove it may not produce any side effect.

The listener parameter may be a MultiScreenContextListener instance.

The 'removeScreenContextListener(MultiScreenContextListener)' method 1588 has been applied since the MSM I01 version.

The 'addMultiScreenConfigurationListener(MultiScreenConfigurationListener)' method 1552 may be declared as 'void addMultiScreenConfigurationListener(MultiScreenConfigurationListener listener)', and a listener to be notified upon the occurrence of multiscreen configuration events that are applied to this screen in the case it is a display screen is added. If a listener has previously been added and not subsequently removed, then an attempt to add it again may not produce any side effect. Configuration events that are applied to a display screen may be restricted to those that affect the complement of logical screens associated with the display screen.

If an event defined by MultiScreenConfigurationEvent is generated, then the MSM implementation may notify each registered screen configuration listener accordingly.

The listener parameter may be a MultiScreenConfigurationListener instance.

If the type of this screen is not SCREEN_TYPE_DISPLAY, the 'addMultiScreenConfigurationListener(MultiScreenConfigurationListener)' method 1552 generates 'java.lang.IllegalStateException'.

The 'addMultiScreenConfigurationListener(MultiScreenConfigurationListener)' method 1552 has been applied since the MSM I01 version.

The 'removeMultiScreenConfigurationListener(MultiScreenConfigurationListener)' method 1586 may be declared as 'void removeMultiScreenConfigurationListener(MultiScreenConfigurationListener listener)', and a listener previously added to be notified upon the occurrence of multiscreen configuration events is removed. If the specified listener is not currently registered as a listener, then an attempt to remove it may not produce any side effect.

The listener parameter may be a MultiScreenConfigurationListener instance.

The 'removeMultiScreenConfigurationListener(MultiScreenConfigurationListener)' method 1586 has been applied since the MSM I01 version.

The 'getMultiScreenConfigurations( )' method 1568 may be declared as 'MultiScreenConfiguration[ ] getMultiScreenConfigurations( )', and a set of all per-display multiscreen configurations currently associated with this display screen is obtained where the configuration type of any such multiscreen configuration may not be the 'SCREEN_CONFIGURATION_DISPLAY' field 1416.

The 'getMultiScreenConfigurations( )' method 1568 returns a non-empty array of MultiScreenConfiguration instances.

If the calling thread has not been granted MonitorAppPermission("multiscreen.configuration", the 'getMultiScreenConfigurations( )' method 1568 generates 'java.lang.SecurityException'.

The 'getMultiScreenConfigurations( )' method 1568 has been applied since the MSM I01 version.

The 'getMultiScreenConfigurations(String)' method 1570 may be declared as 'MultiScreenConfiguration[ ] getMultiScreenConfigurations(java.lang.String screenConfigurationType)', and per-display multiscreen configurations of a specific type associated with this display screen are obtained.

The screenConfigurationType parameter may be (1) an element of the following enumeration of constants defined by the MultiScreenConfiguration interface: {the SCREEN_CONFIGURATION_NON_PIP field 1420, the SCREEN_CONFIGURATION_PIP field 1422, the SCREEN_CONFIGURATION_POP field 1424, and the SCREEN_CONFIGURATION_GENERAL field 1418}, or (2) some other platform-dependent value being not pre-defined as a multiscreen configuration type.

The 'getMultiScreenConfigurations(String)' method 1570 returns an array of MultiScreenConfiguration instances or 'null', depending on whether a specified configuration type is supported or not.

If the calling thread has not been granted MonitorAppPermission("multiscreen.configuration", the 'getMultiScreenConfigurations(String)' method 1570 generates 'java.lang.SecurityException'.

If screenConfigurationType is SCREEN_CONFIGURATION_DISPLAY, is not defined, or is otherwise unknown to the platform implementation, the 'getMultiScreenConfigurations(String)' method 1570 generates 'java.lang.IllegalArgumentException'.

The 'getMultiScreenConfigurations(String)' method 1570 has been applied since the MSM I01 version.

The 'getMultiScreenConfiguration( )' method 1566 may be declared as 'MultiScreenConfiguration getMultiScreenConfiguration( )', and the currently active per-display multiscreen configuration for this display screen is obtained.

The 'getMultiScreenConfiguration( )' method 1566 returns the currently active per-display MultiScreenConfiguration instance applied to this display screen.

If the 'HScreen' is not a display screen, the 'getMultiScreenConfiguration( )' method 1566 generates 'java.lang.IllegalStateException'.

The 'getMultiScreenConfiguration( )' method 1566 has been applied since the MSM I01 version.

FIG. 16A illustrates a definition of the 'MultiScreenManager' class 1260 of the 'org.ocap.ui' package according to an exemplary embodiment of the present invention.

The 'MultiScreenManager' class 1260 of the 'org.ocap.ui' package is a lower class of 'java.lang.Object', and all implemented interfaces include 'org.davic.resources.ResourceServer'.

The MultiScreenManager' class 1260 of the 'org.ocap.ui' package may be declared as 'public abstract class MultiScreenManager', extends to 'extends java.lang.Object', and is implemented as 'implements org.davic.resources.ResourceServer'.

The 'MultiScreenManager' class 1260 may be an abstract, singleton management class implemented by an OCAP host platform that provides multiscreen management services.

Other semantic constraints and behavior that are to be applied will be described in further detail.

The MultiScreenManager' class 1260 of the 'org.ocap.ui' package has been applied since the MSM I01 version.

FIG. 16B illustrates a constructor 1600 of the 'MultiScreenManager' class 1260 of the 'org.ocap.ui' package according to an exemplary embodiment of the present invention.

The constructor 1600 of the 'MultiScreenManager' class 1260 may be declared as 'protected MultiScreenManager( )', and a default constructor may be protected.

A 'MultiScreenManager( )' 1602 has been applied since the MSM I01 version.

FIGS. 16C through 16F illustrate a method 1630 of the 'MultiScreenManager' class 1260 of the 'org.ocap.ui' package according to an embodiment of the present invention.

The method 1630 of the 'MultiScreenManager' class 1260 of the 'org.ocap.ui' package includes at least one of: a 'void addMultiScreenConfigurationListener (MultiScreenConfigurationListener listener)' method 1632, a 'void addPlayerScreenDevices(javax.media.Player player, org.havi.ui.HScreenDevice[ ] devices)' method 1634, a 'void addResourceStatusListener (org.davic.resources.ResourceStatusListener listener)' method 1636, an 'org.havi.ui.HScreen[ ] findScreens(javax.tv.service.selection.ServiceContext context)' method 1638, an 'org.havi.ui.HScreen[ ] getCompatibleScreens (org.ocap.hardware.VideoOutputPort port)' method 1640, an 'org.havi.ui.HScreen getDefaultScreen( )' method 1642, an 'org.havi.ui.HScreen getEmptyScreen( )' method 1644, a 'static MultiScreenManager getInstance( )' method 1646, a 'MultiScreenConfiguration getMultiScreenConfiguration( )' method 1648, a 'MultiScreenConfiguration getMultiScreenConfiguration(org.

havi.ui.HScreen screen)' method 1650, a 'MultiScreenConfiguration[ ] getMultiScreenConfigurations( )' method 1652, a 'MultiScreenConfiguration[ ] getMultiScreenConfigurations(java.lang.String screenConfigurationType)' method 1654, an 'org.havi.ui.HScreen getOutputPortScreen(org.ocap.hardware.VideoOutputPort port)' method 1656, an 'org.havi.ui.HScreenDevice[ ] getPlayerScreenDevices(javax.media.Player player)' method 1658, an 'org.havi.ui.HScreen[ ] getScreens( )' method 1660, a 'boolean isEmptyScreen(org.havi.ui.HScreen screen)' method 1662, a 'boolean isEmptyScreenDevice(org.havi.ui.HScreenDevice device)' method 1664, a 'void moveServiceContexts (org.havi.ui.HScreen src, org.havi.ui.HScreen dst, a javax.tv.service.selection.ServiceContext[ ] contexts)' method 1666, a 'void removeMultiScreenConfigurationListener (MultiScreenConfigurationListener listener)' method 1668, a 'void removePlayerScreenDevices(javax.media.Player player, org.havi.ui.HScreenDevice[ ] devices)' method 1670, a 'void removeResourceStatusListener(org.davic.resources.ResourceStatusListener listener)' method 1672, a 'void requestMultiScreenConfigurationChange(MultiScreenConfiguration configuration, java.util.Dictionary serviceContextAssociations)' method 1674, a 'boolean sameResources (org.havi.ui.HScreenDevice device1, org.havi.ui.HScreenDevice device2' method 1676, a 'boolean sameResources(org.havi.ui.HScreen screen1, org.havi.ui.HScreen screen2' method 1678, a 'boolean sameResources (javax.tv.service.selection.ServiceContext sc1, javax.tv.service.selection.ServiceContext sc2' method 1680, a 'void setMultiScreenConfiguration(MultiScreenConfiguration configuration, java.util.Dictionary serviceContextAssociations)' method 1682, and a 'void swapServiceContexts(org.havi.ui.HScreen screen1, org.havi.ui.HScreen screen2, javax.tv.service.selection.ServiceContext[ ] exclusions)' method 1684.

Methods 1690 inherited from the 'java.lang.Object' class include at least one from among 'clone', 'equals', 'finalize', 'getClass', 'hashCode', 'notify', 'notifyAll', 'toString', 'wait', 'wait', and 'wait'.

Methods 1695 inherited from the 'org.davic.resources.ResourceServer' interface include at least one from among 'addResourceStatusEventListener', and 'removeResourceStatusEventListener'.

The 'getScreens( )' method 1660 may be declared as 'public org.havi.ui.HScreen[ ] getScreens( )', and the set of accessible 'HScreen' instances may be obtained.

The set of HScreen instances returned may be determined as follows.

When called by an OCAP application that is granted MonitorAppPermission ("multiscreen.configuration"), then an HScreen instance may be returned for each display screen and each logical screen exposed through any accessible MultiScreenConfiguration instance at the time of this method's invocation. Otherwise, an HScreen instance may be returned for each display screen and each logical screen with which an accessible ServiceContext is associated (either directly or indirectly) for the purpose of presentation or potential presentation.

The first HScreen instance in the returned HScreen[ ] array may be equal to a value returned by the getDefaultScreen( ) method 1642 of the 'MultiScreenManager' class 1260. Subsequent elements of the returned array do not follow a prescribed order, and an application may not rely upon the order of these subsequent elements.

The set of HScreen instances returned by the 'getScreens( )' method 1660 may change over the course of an application's lifecycle, such as when a screen is added to or removed from an accessible multiscreen configuration. However, the HScreen instance reference that represents an application's default HScreen may not remain constant over the application's lifecycle. That is, from the perspective of a given application instance, an MSM implementation may always return the same HScreen instance reference as the first element of the returned array of HScreen instances.

Any HScreen instance returned by the 'getScreens( )' method 1660 may not be equivalent to the empty HScreen during the interval between the time when the 'getScreens( )' method 1660 returns a value and the time when a MultiScreenConfigurationEvent.MULTI_SCREEN_CONFIGURATION_CHANGING event or a MultiScreenContext Event. MULTI_SCREEN_CONTEXT_SERVICE_CONTEXT_CHANGED event is generated and dispatched.

Each HScreen instance returned by the 'getScreens( )' method 1660 may return different sets of HScreenDevice instances from those returned from its getHBackgroundDevices( ), getHVideoDevices( ), and getHGraphicsDevices( ) over the course of an application's lifecycle. However, as described below under the definition of the getDefaultScreen( ) method, the set of default HBackgroundDevice, VideoDevice, and HGraphicsDevice instances returned from a default HScreen instance via 'getHBackgroundDevices( )', 'getHVideoDevices( )', and 'getHGraphicsDevices( )' may remain constant over an application's lifecycle, while the underlying device resources and configurations of these default HScreenDevice instances may change.

Any background, video, or graphics screen device, i.e., HBackgroundDevice, HVideoDevice, or HGraphicsDevice, of any HScreen returned by the 'getScreens( )' method 1660 may not be equivalent to the empty HScreenDevice of its specific sub-type during the interval between the time when the 'getScreens( )' method 1660 returns a value and the time when a MultiScreenConfigurationEvent.MULTI_SCREEN_CONFIGURATION_CHANGING event or a MultiScreenContextEvent.MULTI_SCREEN_CONTEXT_SERVICE_CONTEXT_CHANGED event is generated.

The number of HScreenDevice instances returned from getHBackgroundDevices( ), getHVideoDevices( ), and getHGraphicsDevices( ) of an HScreen instance returned by the 'getScreens( )' method 1660 may change over the lifecycle of that HScreen instance. If they do change, then a MultiScreenContextEvent.MULTI_SCREEN_CONTEXT_DEVICES_CHANGED event may be generated and dispatched to all registered MultiScreenContextListener instances.

If the number of HScreenDevice instances of a particular type increases or remains the same (for a given HScreen instance), then any reference to a non-default HScreenDevice instance previously returned to the application may remain viable, and may, at the option of the MSM implementation, either (1) be reused to represent the new underlying device resources of that type of screen device or (2) be reset to the empty HScreenDevice of the appropriate sub-type as defined above. In the former case, the reused HScreenDevice instance may be present in the set of screen devices returned from getHBackgroundDevices( ), getHVideoDevices( ), or getHGraphicsDevices( ) according to its screen device type. In the latter case, the HScreenDevice instance whose state is reset to the empty HScreenDevice state may not be present in the set of screen devices returned from getHBackgroundDevices( ), getHVideoDevices( ), or getHGraphicsDevices( ).

If the number of HScreenDevice instances of a particular type decreases (for a given HScreen instance), then any reference to a non-default HScreenDevice instance previously returned to the application may remain viable, may be reset to the empty screen device state, and may not be present in the set of screen devices returned by the HScreen instance.

The net effect of the above specified behavior is that an application that accesses only its default HScreen instances and default HScreenDevice instances can continue to access and use those instances without any knowledge of the existence of MSM functionality. In contrast, an application that accesses non-default HScreen instances or non-default HScreenDevice instances needs to monitor changes to the current per-platform and per-display multiscreen configurations as well as changes to the set of screen devices associated with a non-default screen.

If a non-default HScreen instance that was previously referenced by an application is reset to the empty screen state as a result of a multiscreen configuration change, the application can detect this fact by comparing the set of HScreen instance references that were obtained prior to an appropriate MultiScreenConfigurationEvent with those obtainable after the event. After this event, those HScreen instances that were reset to the empty state will no longer be present in the array of HScreen instances returned by the 'getScreens( )' method 1660. Furthermore, those previously obtained HScreen instances can be queried as to whether they were reset by using isEmptyScreen(HScreen) defined by the 'MultiScreenManager' class 1260. Lastly, if the application continues to make use of such a reset HScreen instance, then its behavior is well defined and immutable.

Similarly, if a non-default HScreenDevice instance that was previously referenced by an application is reset to the empty screen device state as a result of a multiscreen configuration change, the application can detect this fact by comparing the set of HScreenDevice instance references that were obtained prior to an appropriate MultiScreenContextEvent event with those obtainable after the event. After this event, those HScreenDevice instances that were reset to the empty state will no longer be accessible through set of accessible HScreen instances returned by the 'getScreens( )' method 1660. Furthermore, they can be queried as to whether they were reset by using the isEmptyScreenDevice(HScreenDevice) method defined by the 'MultiScreenManager' class 1260. Lastly, if the application continues to make use of such a reset HScreenDevice instance, then its behavior is well defined and immutable.

If an HScreen instance, 'S', does not implement the MultiScreenConfigurableContext interface (e.g., because it was not configurable when being created and the MSM implementation selectively implements this interface on specific instances of HScreen) and if the new underlying screen resources are configurable (and thus this interface would be implemented on an HScreen instance that represents this set of underlying screen resources), then the MSM implementation may not reuse S to represent a new set of underlying screen resources upon a multiscreen configuration change, but may instead reset S to the empty state.

The 'getScreens( )' method 1660 returns a non-empty array of HScreen instances as described above.

The 'getScreens( )' method 1660 has been applied since the MSM I01 version.

The 'getDefaultScreen( )' method 1642 may be declared as 'public org.havi.ui.HScreen getDefaultScreen( )', and the default HScreen instance is obtained.

The HScreen instance returned by the 'getDefaultScreen( )' method 1642 may represent the currently active set of default, underlying screen devices and their currently active HAVi screen configurations. In addition, the HScreen instance may represent a set of currently active non-default, underlying screen devices and their configurations.

The returned default HScreen instance is intended to be the default from the perspective of the calling application or the application on whose behalf this method is invoked. If the 'getDefaultScreen( )' method 1642 is invoked by the platform implementation in a context that does not imply a specific application, then the returned value is not defined and may be implementation dependent, including, e.g., returning 'null'.

Over the course of an application's lifecycle, the reference returned from the 'getDefaultScreen( )' method 1642 may remain constant. Furthermore, the set of default HScreenDevice instances returned by getDefaultHBackgroundDevice( ), getDefaultHVideoDevice( ), and getDefaultHGraphicsDevice( ) of this default HScreen instance may similarly remain constant over the application's lifecycle. Notwithstanding this constancy of reference, the underlying device resources and the underlying configurations of these device resources may change over the course of an application's lifecycle.

Any non-default background, video, or graphics screen device, i.e., HBackgroundDevice, HVideoDevice, or HGraphicsDevice, of any HScreen returned by the 'getDefaultScreen( )' method 1642 may not be equivalent to the empty HScreenDevice of its specific sub-type during the interval between the time when this method returns and the time when a MultiScreenConfigurationEvent.MULTI_SCREEN_CONFIGURATION_CHANGING or MultiScreenContextEvent.MULTI_SCREEN_CONTEXT_SERVICE_CONTEXT_CHANGED event is generated.

If any HScreenConfiguration parameter (or a derived screen device type specific parameter) of any of the default HScreenDevice instances returned by 'getDefaultHBackgroundDevice( )', 'getDefaultHVideoDevice( )', and 'getDefaultHGraphicsDevice( )' changes over the course of an application's lifecycle, then an appropriate HScreenConfigurationEvent may be generated and dispatched to all registered HScreenConfigurationListener instances. Similarly, if any value that would be returned by any of the query (get*) methods of the MultiScreenContext interface implemented by this default HScreen instance changes, then an appropriate MultiScreenContextEvent may be generated and dispatched to all registered MultiScreenContextListener instances.

If any HScreen instance returned by the 'getDefaultScreen( )' method 1642 implements the MultiScreenConfigurableContext interface, then every HScreen instance returned by this method may implement the MultiScreenConfigurableContext interface irrespective of whether the underlying screen resources represented by any returned HScreen instance is configurable or not.

The 'getDefaultScreen( )' method 1642 returns an HScreen instance as described above.

The 'getDefaultScreen( )' method 1642 has been applied since the MSM I01 version.

The 'findScreens(ServiceContext)' method 1638 may be declared as 'public org.havi.ui.HScreen[ ] findScreens(javax.tv.service.selection.ServiceContext context)', and at least one accessible screen associated with specific service context is found. A given service context may be associated with zero, one, or multiple HScreen instances. That is, the 'findScreens (ServiceContext)' method 1638 finds the set of accessible HScreen instances with which a specified ServiceContext is associated. An HScreen instance is accessible (by some applications) if the getScreens( ) method 1660 returns (or would return) the HScreen instance (when being invoked by the same application at the time this method is invoked).

The 'context' parameter may be a 'ServiceContext' instance.

The 'findScreens(ServiceContext)' method 1638 returns an array of HScreen instances or 'null'. If the specified ServiceContext is associated with some accessible HScreen, then that HScreen may be present in the returned array which may be not 'null' and be non-empty. Otherwise, 'null' is returned, indicating that the ServiceContext is not associated with any HScreen.

The 'findScreens(ServiceContext)' method 1638 has been applied since the MSM I01 version.

The 'getOutputPortScreen(VideoOutputPort)' method 1656 may be declared as 'public org.havi.ui.HScreen getOutputPortScreen(org.ocap.hardware.VideoOutputPort port)', and the screen associated with an output port is obtained. Given a specific VideoOutputPort instance, the 'getOutputPortScreen(VideoOutputPort)' method 1656 obtains the HScreen instance that is associated with that port for the purpose of presentation.

The port parameter may be a VideoOutputPort instance.

The 'getOutputPortScreen(VideoOutputPort)' method 1656 returns the HScreen instance associated with the specified port or returns 'null' if no association exists.

The 'getOutputPortScreen(VideoOutputPort)' method 1656 has been applied since the MSM I01 version.

The getCompatibleScreens(VideoOutputPort) method 1640 may be declared as getCompatibleScreens(org.ocap.hardware.VideoOutputPort port), and the set of accessible screens that are compatible with an output port is obtained.

Given a specific VideoOutputPort instance, the getCompatibleScreens(VideoOutputPort) method 1640 obtains the subset of HScreen instances (of the larger set returned by the getScreens( ) method) that may be associated with that port for the purpose of presentation.

A port parameter may be a VideoOutputPort instance.

The getCompatibleScreens(VideoOutputPort) method 1640 returns a (possibly empty) array of HScreen instances that may be associated with the specified port.

The getCompatibleScreens(VideoOutputPort) method 1640 has been applied since the MSM I01 version.

The getMultiScreenConfigurations( ) method 1652 may be declared as public MultiScreenConfiguration[ ] getMultiScreenConfigurations( ), and the set of all current multiscreen configurations supported by this platform is obtained, irrespective of their configuration type.

The set of multiscreen configuration instances returned by the getMultiScreenConfigurations( ) method 1652 may include all per-platform multiscreen configurations (composed solely of display screens) and all per-display multiscreen configurations (composed of no more than one display screen and any number of logical screens).

The order of multiscreen configurations returned by the getMultiScreenConfigurations( ) method 1652 is not defined in detail by this specification, but may be variable.

The getMultiScreenConfigurations( ) method 1652 returns an array of MultiScreenConfiguration instances.

The getMultiScreenConfigurations( ) method 1652 may throw java.lang.SecurityException if the calling thread has not been granted MonitorAppPermission("multiscreen.configuration").

The getMultiScreenConfigurations( ) method 1652 has been applied since the MSM I01 version.

The getMultiScreenConfigurations(String) method 1654 may be declared as public MultiScreenConfiguration[ ] getMultiScreenConfigurations(java.lang.String screenConfigurationType), and multiscreen configurations of a specific configuration type are obtained.

A screenConfigurationType parameter may be one of the following values: (1) an element of the following enumeration of constants defined by MultiScreenConfiguration: {SCREEN_CONFIGURATION_DISPLAY 1416, SCREEN_CONFIGURATION_NON_PIP 1420, SCREEN_CONFIGURATION_PIP 1422, SCREEN_CONFIGURATION_POP 1424, SCREEN_CONFIGURATION_GENERAL 1418}, or (2) some other platform-dependent value not pre-defined as a multiscreen configuration type.

The set of multiscreen configuration instances returned by the getMultiScreenConfigurations(String) method 1654 may include all multiscreen configurations of the specified type that appear in the array returned by the getMultiScreenConfigurations( ) method 1652.

The order of multiscreen configurations returned by the getMultiScreenConfigurations(String) method 1654 is not defined in detail by this specification, but may be variable.

The getMultiScreenConfigurations(String) method 1654 returns an array of MultiScreenConfiguration instances or null, depending on whether the specified configuration type is supported or not.

The getMultiScreenConfigurations(String) method 1654 throws java.lang.SecurityException if the calling thread has not been granted MonitorAppPermission("multiscreen.configuration").

The getMultiScreenConfigurations(String) method 1654 has been applied since the MSM I01 version.

The getMultiScreenConfiguration(HScreen) method 1650 may be declared as public MultiScreenConfiguration getMultiScreenConfiguration(org.havi.ui.HScreen screen), and the multiscreen configuration of a specific screen is obtained.

A given HScreen instance may be associated with either zero or exactly one multiscreen configuration instance; however, since a single underlying screen may be potentially shared (multiply referenced) by multiple HScreen instances, an underlying screen (and its constituent resources) may be associated with more than one multiscreen configuration.

A screen parameter may be an HScreen instance.

The getMultiScreenConfiguration(HScreen) method 1650 returns the MultiScreenConfiguration instance of which the specified HScreen is a constituent screen or null if the specified HScreen is orphaned (i.e., not owned by a multiscreen configuration, e.g., as would be the case if it were an empty screen).

The getMultiScreenConfiguration(HScreen) method 1650 has been applied since the MSM I01 version.

The getMultiScreenConfiguration( ) method 1648 may be declared as public MultiScreenConfiguration getMultiScreenConfiguration( ), and a currently active per-platform display multiscreen configuration is obtained.

The getMultiScreenConfiguration( ) method 1648 returns the currently active per-platform display MultiScreenConfiguration instance.

The getMultiScreenConfiguration( ) method 1648 has been applied since the MSM I01 version.

The setMultiScreenConfiguration( ) method 1682 may be declared as public void setMultiScreenConfiguration(MultiScreenConfiguration configuration, java.util.Dictionary serviceContextAssociations), and a currently active per-platform display multiscreen configuration is set.

If the specified configuration is the current per-platform display multiscreen configuration, then, unless SecurityException applies, the setMultiScreenConfiguration( ) method 1682 returns a value without producing any side effect.

If the specified configuration is not the current per-platform display multiscreen configuration and if SecurityException, IllegalArgumentException, and IllegalStateException do not apply, then the setMultiScreenConfiguration( ) method 1682 performs the synchronous per-platform multiscreen configuration change processing defined by the OCAP Multiscreen Manager (MSM) Extension specification.

If the serviceContextAssociations argument is specified (i.e., not null), then any ServiceContext instance that is accessible to the invoking application may be associated with either no screen or the applicable screen(s) in the specified (new) per-platform multiscreen configuration (or in its per-display multiscreen configurations). If no association matches some accessible ServiceContext, if some accessible ServiceContext instance is not present in the specified associations, or if it is present but no such applicable screen exists in the new per-platform multiscreen configuration (or in its per-display multiscreen configurations), then the ServiceContext instance may be associated with the default service context association screen of the specified multiscreen configuration, i.e., the screen returned by configuration.getDefaultServiceContextScreen( ).

For the purpose of matching accessible ServiceContext instances whose references appear as keys in a specified serviceContextAssociations dictionary, the virtual method equals(Object) on these keys may be used, in which case it is assumed that the setMultiScreenConfiguration( ) method 1682 behaves identically to the default implementation of an Object.equals(Object) method.

In the context of a given application instance, the MSM host implementation should maintain a one-to-one relationship between ServiceContext instances exposed to that application and collections of underlying service context resources. If the MSM host implementation fails to maintain this relationship, then when consulting a serviceContextAssociations dictionary, the MSM implementation may consider two distinct collections of underlying service context resources to be the same service context, e.g., if at different times, a single ServiceContext instance references distinct underlying collections of resources, or may consider a single collection of underlying service context resources to be two distinct service contexts, e.g., if at a given time, two distinct ServiceContext instances reference the same underlying collection of resources.

The state of the decoder format conversion (DFC) component of a video pipeline being used to process video associated with a service context that is implicitly swapped or moved between screens by the setMultiScreenConfiguration( ) method 1682 may not be affected by performance of the setMultiScreenConfiguration( ) method 1682.

A configuration parameter may be a MultiScreenConfiguration instance to become the currently active per-platform display multiscreen configuration.

A serviceContextAssociations parameter may be, if not null, a Dictionary instance whose keys are ServiceContext instances and whose values are String instances, where the string values are defined as follows: (1) if the string value is "–", then no screen applies (in which case a matching service context is not associated with any screen after the configuration change), (2) otherwise, if the string value is "*", then all screens of the new screen configuration apply, (3) otherwise, if the string value is a screen identifier as returned by a MultiScreenContext.getID( ) method, then that screen applies, (4) otherwise, if the string value is a screen category as returned by a MultiScreenContext.getScreenCategory( ) method, then any screen of the new configuration with that category applies, (5) otherwise, if the string value is a semicolon separated list of screen identifiers, then each screen of the new configuration with a matching identifier applies, (6) otherwise, if the string value is a semicolon separated list of screen categories, then each screen of the new configuration with a matching category applies, (7) otherwise, if the string value is a semicolon separated list of screen identifiers or screen categories, then each screen of the new configuration with a matching identifier or category applies, (8) otherwise, the default service context association screen of the new configuration applies.

The setMultiScreenConfiguration( ) method 1682 throws java.lang.SecurityException if the calling thread has not been granted MonitorAppPermission("multiscreen.configuration").

The setMultiScreenConfiguration( ) method 1682 throws java.lang.IllegalArgumentException if a configuration parameter is not a per-platform multiscreen configuration that would be returned by MultiScreenManager.getMultiScreenConfigurations(SCREEN_CONFIGURATION_DISPLAY).

The setMultiScreenConfiguration( ) method 1682 throws java.lang.IllegalStateException if the MSM implementation (1) does not permit activation of the specified multiscreen configuration, (2) if the setMultiScreenConfiguration( ) method 1682 was previously called and the change processing steps are not yet complete, or (3) if activation is not otherwise permitted at the time of method invocation.

The setMultiScreenConfiguration( ) method 1682 has been applied since the MSM I01 version.

The requestMultiScreenConfigurationChange method 1674 may be declared by public void requestMultiScreenConfigurationChange (MultiScreenConfiguration configuration, java.util.Dictionary serviceContextAssociations), and requests change to the currently active per-platform display multiscreen configuration.

If the specified configuration is the current configuration, then, unless SecurityException applies, the requestMultiScreenConfigurationChange method 1674 returns a value without producing any side effect.

If the specified configuration is not the current per-platform display multiscreen configuration and if SecurityException, IllegalArgumentException, and IllegalStateException do not apply, then the requestMultiScreenConfigurationChange method 1674 initiates an asynchronous change to the current per-platform multiscreen configuration, where the semantics of the setMultiScreenConfiguration( ) method 1682 apply except that the requestMultiScreenConfigurationChange method 1674 may return immediately after a MultiScreenConfiguration.MULTI_SCREEN_CONFIGURATION_CHANGING event is generated (but before it is dispatched).

A configuration parameter may be a MultiScreenConfiguration instance to become the currently active screen configuration. A serviceContextAssociations parameter may be either null or a Dictionary instance whose keys are ServiceContext instances and whose values are String instances, with semantics as defined by setMultiScreenConfiguration(..) above.

The requestMultiScreenConfigurationChange method 1674 throws java.lang.SecurityException if the calling thread has not been granted MonitorAppPermission("multiscreen.configuration").

The requestMultiScreenConfigurationChange method 1674 throws java.lang.IllegalStateException (1) if the MSM implementation does not permit activation of the specified multiscreen configuration, (2) if the requestMultiScreenConfigurationChange method 1674 was previously called and the change processing steps are not yet complete, or (3) if activation is not otherwise permitted at the time of method invocation.

The requestMultiScreenConfigurationChange method 1674 has been applied since the MSM I01 version.

The addMultiScreenConfigurationListener method 1632 may be declared as public void addMultiScreenConfigurationListener (MultiScreenConfigurationListener listener), and a listener to be notified upon the occurrence of multiscreen configuration events is added. If a listener has previously been added and not subsequently removed, then an attempt to add it again may not produce a side effect.

Configuration events that apply to this MultiScreenManager singleton instance may be restricted to those that affect the complement of usable display screens.

If an event defined by MultiScreenConfigurationEvent is generated, then the MSM implementation may notify each registered screen configuration listener accordingly.

A listener parameter may be a MultiScreenConfigurationListener instance.

The addMultiScreenConfigurationListener method 1632 has been applied since the MSM I01 version.

The removeMultiScreenConfigurationListener method 1668 may be declared as public void removeMultiScreenConfigurationListener (MultiScreenConfigurationListener listener), and a listener previously added to be notified upon the occurrence of multiscreen configuration events is removed. If the specified listener is not currently registered as a listener, then an attempt to remove it may not produce a side effect.

A listener parameter may be a MultiScreenConfigurationListener instance.

The removeMultiScreenConfigurationListener method 1668 has been applied since the MSM I01 version.

The addResourceStatusListener method 1636 may be declared as public void addResourceStatusListener(org.davic.resources.ResourceStatusListener listener), and a resource status listener is added.

A listener parameter may be a ResourceStatusListener instance.

The addResourceStatusListener method 1636 has been applied since the MSM I01 version.

The removeResourceStatusListener method 1672 may be declared as public void removeResourceStatusListener(org.davic.resources.ResourceStatusListener listener), and a resource status listener is removed.

A listener parameter may be a ResourceStatusListener instance.

The removeResourceStatusListener method 1672 has been applied since the MSM I01 version.

The swapServiceContexts method 1684 may be declared as public void swapServiceContexts(org.havi.ui.HScreen screen1, org.havi.ui.HScreen screen2, javax.tv.service.selection.ServiceContext[ ] exclusions), and atomically swaps service contexts between two HScreen instances.

The swapServiceContexts method 1684 is a convenience method for supporting the common function of swapping content presentation between screens. Similar results obtained by the swapServiceContexts method 1684 may also be accomplished by the more general mechanism of removing and adding service contexts to specific accessible screens by using MultiScreenConfigurableContext.addServiceContext(..) and MultiScreenConfigurableContext.removeServiceContext(..) methods. Nevertheless, use of the more general method may result in more presentation transition artifacts than use of the swapServiceContexts method 1684 due to the atomic swap semantics of the swapServiceContexts method 1684.

The state of the decoder format conversion (DFC) component of a video pipeline being used to process video associated with a service context that is being swapped by the swapServiceContexts method 1684 may not be affected by performance of the swapServiceContexts method 1684.

A screen1 parameter may be an HScreen instance whose service contexts are to be swapped with those of screen2.

A screen2 parameter may be an HScreen instance whose service contexts are to be swapped with those of screen1.

An exclusions parameter may be, if not null, a non-empty array of ServiceContext instances to be excluded from the swap operation, i.e., whose screen associations are not to be affected by the swap.

The swapServiceContexts method 1684 throws java.lang.SecurityException if the calling thread has not been granted MonitorAppPermission("multiscreen.configuration").

The swapServiceContexts method 1684 throws java.lang.IllegalStateException if any of the following hold true: (1) video is being presented as component video rather than background video in either screen, or (2) the ServiceContexts for the specified screens cannot be changed, e.g., if the platform uses a permanent association with a specific ServiceContext and a screen.

The swapServiceContexts method 1684 has been applied since the MSM I01 version.

The moveServiceContexts method 1666 may be declared as public void moveServiceContexts(org.havi.ui.HScreen src, org.havi.ui.HScreen dst, javax.tv.service.selection.ServiceContext[ ] contexts), and a set of specific service context from one HScreen instance to another HScreen instance is atomically moved.

The moveServiceContexts method 1666 is a convenience method for supporting the common function of moving content presentations between screens for a set of given service contexts. Similar results obtained by the moveServiceContexts method 1666 may also be accomplished by the more general mechanism of removing and adding the service context to specific accessible screens by using the MultiScreenConfigurableContext.addServiceContexts(..) and MultiScreenConfigurableContext.removeServiceContexts(..) methods. Nevertheless, use of the more general method may result in more presentation transition artifacts than use of the moveServiceContexts method 1666 due to the atomic move semantics of the moveServiceContexts method 1666.

The state of the decoder format conversion (DFC) component of a video pipeline being used to process video associated with a service context that is being moved by the moveServiceContexts method 1666 may not be affected by performance of the moveServiceContexts method 1666.

An src parameter may be an HScreen instance from which the specified service contexts are to be moved.

A dst parameter may be an HScreen instance to which the specified service contexts are to be moved.

A contexts parameter may be a non-empty array of ServiceContext instances to be moved from an src screen to a dst screen.

The moveServiceContexts method 1666 throws java.lang.SecurityException if the calling thread has not been granted MonitorAppPermission("multiscreen.configuration").

The moveServiceContexts method 1666 throws java.lang.IllegalArgumentException if some specified ServiceContext is not currently associated with the source HScreen instance, src.

The moveServiceContexts method 1666 throws java.lang.IllegalStateException if any of the following hold true: (1) video is being presented as component video rather than background video in either screen; (2) some specified ServiceContext for the specified screens cannot be moved, e.g., if the platform uses a permanent association with a specific ServiceContext and a screen; or (3) a non-abstract ServiceContext is already associated with the destination screen and the platform supports only one non-abstract ServiceContext per screen.

The moveServiceContexts method 1666 has been applied since the MSM I01 version.

The getPlayerScreenDevices method 1658 may be declared as public org.havi.ui.HScreenDevice[ ] getPlayerScreenDevices(javax.media.Player player), and the set of screen devices currently assigned for use by a Java Media Framework (JMF) media player is obtained.

A player parameter may be a JMF Player instance to query for its set of screen devices.

The getPlayerScreenDevices method 1658 may be an array of HScreenDevice instances, which may be empty if and only if there is no associated screen device.

The getPlayerScreenDevices method 1658 has been applied since the MSM I01 version.

The addPlayerScreenDevices method 1634 may be declared as public void addPlayerScreenDevices(javax.media.Player player, org.havi.ui.HScreenDevice[ ] devices), and screen device(s) are added to a media player.

A player parameter may be a JMF Player instance to query for the specified screen device(s). A devices parameter may be a non-empty array of HScreenDevice instances on which to present some type of rendered content from the specified media player.

The addPlayerScreenDevices method 1634 throws java.lang.SecurityException if the calling thread has not been granted MonitorAppPermission("multiscreen.context").

The addPlayerScreenDevices method 1634 throws java.lang.IllegalStateException if any of the following hold true: (1) the specified player is not in a stopped state; (2) the specified screen device is not compatible with the specified player; (3) some underlying screen device of devices is not available for use by this application, e.g., due to being exclusively reserved by another application; or (4) some underlying screen device of devices is already associated with a media player, and that device does not support association with multiple media players.

The addPlayerScreenDevices method 1634 has been applied since the MSM I01 version.

More detailed information about the addPlayerScreenDevices method 1634 is obtained by referring to Player, HScreenDevice instances.

The removePlayerScreenDevices method 1670 may be declared as public void removePlayerScreenDevices(javax.media.Player player, org.havi.ui.HScreenDevice[ ] devices), and screen device(s) are removed from a media player. In other words, all or a non-empty set of HScreenDevice instances are removed from the set of screen devices on which the specified media player is presented (or otherwise associated for presentation). If devices is null, then all screen device associations are removed.

The removePlayerScreenDevices method 1670 throws java.lang.SecurityException if the calling thread has not been granted MonitorAppPermission("multiscreen.context").

The removePlayerScreenDevices method 1670 throws java.lang.IllegalArgumentException if devices is not null and some entry of devices is not associated with the specified Player instance.

The removePlayerScreenDevices method 1670 throws java.lang.IllegalStateException if the specified player is not in a stopped state.

The removePlayerScreenDevices method 1670 has been applied since the MSM I01 version.

The getEmptyScreen( ) method 1644 may be declared as public org.havi.ui.HScreen getEmptyScreen( ), and the singleton empty HScreen instance is obtained.

Using this empty HScreen, the getEmptyScreen( ) method 1644 may obtain a reference to the empty HScreenDevice, empty HScreenConfiguration, and empty HScreenConfigTemplate of each available sub-type, e.g., HBackgroundDevice, HVideoDevice, HGraphicsDevice, etc.

The presence of the getEmptyScreen method 1644 is primarily aimed at supporting the testing of MSM functionality, such as the semantics of isEmptyScreen( ), isEmptyScreenDevice( ), sameResources( ), etc.

The getEmptyScreen( ) method 1644 returns the empty HScreen singleton.

The getEmptyScreen( ) method 1644 has been applied since the MSM I01 version.

The isEmptyScreen method 1662 may be declared as public boolean isEmptyScreen(org.havi.ui.HScreen screen), and it is determined if an instance of HScreen is equivalent, in terms of constraint satisfaction, to the empty HScreen.

If screen does not implement MultiScreenConfigurableContext, then those constraints that pertain to MultiScreenConfigurableContext may be deemed to be equivalent.

A screen parameter may be an HScreen instance.

The isEmptyScreen method 1662 returns true if the specified screen is equivalent to the empty HScreen.

The isEmptyScreen method 1662 has been applied since the MSM I01 version.

The isEmptyScreenDevice method 1664 may be declared as public boolean isEmptyScreenDevice(org.havi.ui.HScreenDevice device), and it is determined if an instance of HScreenDevice is equivalent, in terms of constraint satisfaction, to the empty HScreenDevice of the specific sub-type.

A device parameter may be an HScreenDevice instance of one of the following sub-types: HBackgroundDevice, HVideoDevice, or HGraphicsDevice.

The isEmptyScreenDevice method 1664 returns true if the specified device is equivalent to the empty HScreenDevice of the matching sub-type.

The isEmptyScreenDevice method 1664 has been applied since the MSM I01 version.

The sameResources(HScreen, HScreen) method 1678 may be declared as public boolean sameResources(org.havi.ui.HScreen screen1, org.havi.ui.HScreen screen2), and it is determined if two HScreen instances represent the same underlying platform resources and underlying resource state, i.e., are equivalent with respect to these underlying resources.

For the purpose of determining equivalence, the following conditions may apply:

if exactly one of screen1 and screen2 is equivalent to the empty HScreen, then the two screens are not equivalent with respect to underlying resources;

if, for each screen device, BD1, returned by screen1.getHBackgroundDevices( ) there is not exactly one screen device, BD2, returned by screen2.getHBackgroundDevices( ) such that sameResources(BD1,BD2) returns true, then the two screens are not equivalent with respect to underlying resources;

if, for each screen device, VD1, returned by screen1.getHVideoDevices( ) there is not exactly one screen device, VD2, returned by screen2.getHVideoDevices( ) such that sameResources (VD1,VD2) returns true, then the two screens are not equivalent with respect to underlying resources;

if, for each screen device, GD1, returned by screen1.getHGraphicsDevices( ) there is not exactly one screen device, GD2, returned by screen2.getHGraphicsDevices( ) such that sameResources (GD1,GD2) returns true, then the two screens are not equivalent with respect to underlying resources;

if, given an equivalent set of template arguments, screen1.getBestConfiguration(..) and screen2.getBestConfiguration(..) would not return (nominally unordered) sets of equivalent HScreenConfiguration instances, then the two screens are not equivalent with respect to underlying resources;

if, given an equivalent set of screen configuration arguments, screen1.getCoherentScreenConfigurations(..) and screen2.getCoherentScreenConfigurations(..) would not return sets of equivalent HScreenConfiguration instances, then the two screens are not equivalent with respect to underlying resources;

if, given an equivalent set of screen configuration arguments, screen1.setCoherentScreenConfigurations(..) and screen2.setCoherentScreenConfigurations(..) would not return the same value or would not modify the set of screen devices associated with the specified screen configuration arguments such that those screen devices remain equivalent, then the two screens are not equivalent with respect to underlying resources; and if none the above conditions apply, then screen1 and screen2 are deemed equivalent with respect to underlying resources;

Screen1 and screen2 parameters in this case are HScreen instances.

A true value is returned if the specified screens are equivalent as described by the above conditions.

The sameResources(HScreen, HScreen) method 1678 has been applied since the MSM I01 version.

The sameResources(HScreenDevice, HScreenDevice) method 1676 may be declared as public boolean sameResources(org.havi.ui.HScreenDevice device1, org.havi.ui.HScreenDevice device2), and it is determined if two HScreenDevice instances represent the same underlying platform resources and underlying resource state, i.e., are equivalent with respect to these underlying resources.

For the purpose of determining equivalence, the following conditions may apply:

if device1 and device2 are not of the same sub-type, HBackgroundDevice, HVideoDevice, or HGraphicsDevice, then the two screen devices are not equivalent with respect to underlying resources;

if exactly one of device1 and device2 is equivalent to the empty HScreenDevice of the appropriate sub-type, then the two screen devices are not equivalent with respect to underlying resources;

if device1.getFlickerFilter( ) and device2.getFlickerFilter( ) would not return the same value, then the two screen devices are not equivalent with respect to underlying resources;

if device1.getInterlaced( ) and device2.getInterlaced( ) would not return the same value, then the two screen devices are not equivalent with respect to underlying resources;

if device1.getPixelAspectRatio( ) and device2.getPixelAspectRatio( ) would not return equivalent values, then the two screen devices are not equivalent with respect to underlying resources;

if device1.getPixelResolution( ) and device2.getPixelResolution( ) would not return equivalent values, then the two screen devices are not equivalent with respect to underlying resources;

if device1.getScreenArea( ) and device2.getScreenArea( ) would not return equivalent values, then the two screen devices are not equivalent with respect to underlying resources;

if given equivalent HScreenConfiguration instances, SC1 and SC2, as arguments, device1.getOffset(SC1) and device2.getOffset(SC2) would not return equivalent values, then the two screen devices are not equivalent with respect to underlying resources;

if given equivalent HScreenConfiguration instances, SC1 and SC2, and equivalent Point instances, P1 and P2, as arguments, device1.convertTo(SC1,P1) and device2.convertTo (SC2,P2) would not return equivalent values, then the two screen devices are not equivalent with respect to underlying resources;

if device1.getConfigurations( ) and device2.getConfigurations( ) would not return (nominally unordered) sets of equivalent HScreenConfiguration instances, then the two screens are not equivalent with respect to underlying resources;

if device1.getCurrentConfiguration( ) and device2.getCurrentConfiguration( ) would not return equivalent HScreenConfiguration instances, then the two screens are not equivalent with respect to underlying resources;

if device1.getDefaultConfiguration( ) and device2.getDefaultConfiguration( ) would not return equivalent HScreenConfiguration instances, then the two screens are not equivalent with respect to underlying resources;

if, given an equivalent template arguments or sets of template arguments, device1.getBestConfiguration(..) and device2.getBestConfiguration(..) would not return sets of equivalent HScreenConfiguration instances, then the two screens are not equivalent with respect to underlying resources;

if device1 and device2 are instances of HBackgroundDevice and if device1.setBackgroundConfiguration(..) and device2.setBackgroundConfiguration(..) would not return the same value when equivalent HBackgroundConfiguration instances are specified as arguments, then the two screens are not equivalent with respect to underlying resources;

if device1 and device2 are instances of HVideoDevice and if (1) device1.setVideoConfiguration(..) and device2.setVideoConfiguration(..) would not return the same value when equivalent HVideoConfiguration instances are specified as arguments, (2) device1.getVideoSource( ) and device1.getVideoSource( ) would not return nominally equivalent video sources, or (3) device1.getVideoController( ) and device1.getVideoController( ) would not return nominally equivalent video controllers, then the two screens are not equivalent with respect to underlying resources;

if device1 and device2 are instances of HGraphicsDevice and if device1.setGraphicsConfiguration(..) and device2.setGraphicsConfiguration(..) would not return the same value when equivalent HGraphicsConfiguration instances are specified as arguments, then the two screens are not equivalent with respect to underlying resources; and if none the above conditions apply, then device1 and device2 are deemed equivalent with respect to underlying resources.

Device1 and device2 parameters in this case are HScreenDevice instances.

The sameResources(HScreenDevice, HScreenDevice) method 1676 returns true if the specified screens are equivalent as described by the above conditions.

The sameResources(HScreenDevice, HScreenDevice) method 1676 has been applied since the MSM I01 version.

The sameResources(ServiceContext, ServiceContext) method 1680 may be declared as public boolean sameResources(javax.tv.service.selection. ServiceContext sc1, javax.tv.service.selection.ServiceContext sc2), and it is determined if two ServiceContext instances represent the same underlying platform resources and underlying resource state, i.e., are equivalent with respect to these underlying resources.

Sc1 and sc2 parameters in this case are ServiceContext instances.

The sameResources(ServiceContext, ServiceContext) method 1680 returns true if the specified service contexts are equivalent (i.e., represent the same underlying resources and resource state).

The sameResources(ServiceContext, ServiceContext) method 1680 has been applied since the MSM I01 version.

The getInstance( ) method 1646 may be declared as public static MultiScreenManager getInstance( ), and the singleton instance of the MultiScreenManager is obtained. The MultiScreenManager instance is returned.

The getInstance( ) method 1646 has been applied since the MSM I01 version.

FIG. 17 illustrates an interface 1700 and a class 1710 of an org.ocap.ui.event package, according to an exemplary embodiment of the present invention.

The org.ocap.ui.event package has extensions to HAVi User Interface Event classes, including OCAP specific remote control events and multiscreen management events.

The interface 1700 of the org.ocap.ui.event package includes at least one of a MultiScreenConfigurationListener interface 1702 and a MultiScreenContextListener interface 1704.

The MultiScreenConfigurationListener interface 1702 is used to provide notifications regarding system and application induced changes to the global state of the MultiScreenManager instance or the state of some display HScreen with respect to the per-platform or some per-display multiscreen configuration, respectively, or to changes to a specific MultiScreenConfiguration instance.

The MultiScreenContextListener interface 1704 is used to provide notifications regarding system and application induced changes to a MultiScreenContext.

The class 1710 of the org.ocap.ui.event package includes at least one of a MultiScreenConfigurationEvent class 1712, a MultiScreenContextEvent class 1714, a MultiScreenEvent class 1716, and a MultiScreenResourceEvent class 1718.

The MultiScreenConfigurationEvent class 1712 is used to report changes to the global state of the MultiScreenManager instance or the state of some display HScreen with respect to the per-platform or some per-display multiscreen configuration, respectively, or to changes to a specific MultiScreenConfiguration instance.

The MultiScreenContextEvent class 1714 is used to report a change to a MultiScreenContext to interested listeners.

The MultiScreenEvent class 1716 is an abstract, base class used to organize event identification codes used by disparate types of events related to multiple screen management functionality.

The MultiScreenResourceEvent class 1718 is used to report changes regarding the resource status of multiscreen related resources.

FIG. 18A illustrates a definition of the MultiScreenConfigurationEvent class 1712 of the org.ocap.ui.event package, according to an exemplary embodiment of the present invention.

The Java type of the MultiScreenConfigurationEvent class 1712 of the org.ocap.ui.event package is defined as a sub-level of org.ocap.ui.event.MultiScreenEvent that is a sub-level of java.util.EventObject that is a sub-level of java.lang.Object.

The MultiScreenConfigurationEvent class 1712 of the org.ocap.ui.event package includes java.io.Serializable as All Implemented Interfaces, may be declared as public class MultiScreenConfigurationEvent, and the MultiScreenEvent is extended.

The MultiScreenConfigurationEvent class 1712 is used to report changes to the global state of the MultiScreenManager instance or the state of some display HScreen with respect to the per-platform or some per-display multiscreen configuration, respectively, or to changes to a specific MultiScreenConfiguration instance.

The following types of changes may cause the generation of the MultiScreenConfigurationEvent class 1712:

- The currently active per-platform multiscreen configuration as determined by the MultiScreenManager changes from one multiscreen configuration to another multiscreen configuration;
- The currently active per-display multiscreen configuration as determined by some display HScreen changes from one multiscreen configuration to another multiscreen configuration;
- The set of screens associated with a MultiScreenConfiguration changes (i.e., a screen is added or removed from the multiscreen configuration);

The MultiScreenConfigurationEvent class 1712 of the org.ocap.ui.event package has been applied since the MSM I01 version.

FIG. 18B illustrates a field 1800 of the MultiScreenConfigurationEvent class 1712 of the org.ocap.ui.event package, according to an exemplary embodiment of the present invention.

The field 1800 of the MultiScreenConfigurationEvent class 1712 of the org.ocap.ui.event package includes at least one of a static int MULTI_SCREEN_CONFIGURATION_CHANGED field 1802, a static int MULTI_SCREEN_CONFIGURATION_CHANGING field 1804, a static int MULTI_SCREEN_CONFIGURATION_LAST field 1806, a static int MULTI_SCREEN_CONFIGURATION_SCREEN_ADDED field 1808, and a static int MULTI_SCREEN_CONFIGURATION_SCREEN_REMOVED field 1810.

Fields 1820 inherited from the MultiScreenEvent class 1716 of the org.ocap.ui.event package include at least one of MULTI_SCREEN_CONFIGURATION_FIRST and MULTI_SCREEN_CONTEXT_FIRST.

Fields 1825 inherited from class java.util.EventObject include a source.

The MULTI_SCREEN_CONFIGURATION_CHANGING field 1804 may be declared as public static final int MULTI_SCREEN_CONFIGURATION_CHANGING A change to the currently active per-platform or some per-display MultiScreenConfiguration as determined by the MultiScreenManager or some display HScreen has been initiated, in which case the value returned by getSource( ) may be the affected MultiScreenManager or display HScreen, and the value returned by getRelated( ) may be the subsequently active MultiScreenConfiguration.

The MULTI_SCREEN_CONFIGURATION_CHANGING field 1804 may not be dispatched to an application that has not been granted MonitorAppPermission("multiscreen-.configuration").

The MULTI_SCREEN_CONFIGURATION_CHANGING field 1804 has been applied since the MSM I01 version.

The MULTI_SCREEN_CONFIGURATION_CHANGED field 1802 may be declared as public static final int MULTI_SCREEN_CONFIGURATION_CHANGED. The currently active per-platform or some per-display MultiScreenConfiguration as determined by the MultiScreenManager or some display HScreen has changed, in which case the value returned by getSource( ) may be the affected MultiScreenManager or display HScreen, and the value returned by getRelated( ) may be the previously active MultiScreenConfiguration.

The MULTI_SCREEN_CONFIGURATION_CHANGED field 1802 has been applied since the MSM I01 version.

The MULTI_SCREEN_CONFIGURATION_SCREEN_ADDED field 1808 may be declared as public static final int MULTI_SCREEN_CONFIGURATION_SCREEN_ADDED. The set of screens associated with a MultiScreenConfiguration has changed, with a new screen having been added, in which case the value returned by getSource( ) may be the affected MultiScreenConfiguration, and the value returned by getRelated( ) may be the newly added HScreen.

Except during the interval between the last dispatching of the MULTI_SCREEN_CONFIGURATION_CHANGING field 1804 and the generation of the MULTI_SCREEN_CONFIGURATION_CHANGED field 1802, a screen may not be added to and the MULTI_SCREEN_CONFIGURATION_SCREEN_ADDED field 1808 may not be generated for a multiscreen configuration that is the current per-platform or some current per-display multiscreen configuration.

The MULTI_SCREEN_CONFIGURATION_SCREEN_ADDED field 1808 has been applied since the MSM I01 version.

The MULTI_SCREEN_CONFIGURATION_SCREEN_REMOVED field 1810 may be declared as public static final int MULTI_SCREEN_CONFIGURATION_SCREEN_REMOVED. The set of screens associated with a MultiScreenConfiguration has changed, with an existing screen having been removed, in which case the value returned by getSource( ) may be the affected MultiScreenConfiguration, and the value returned by getRelated( ) may be the newly removed HScreen.

Except during the interval between the last dispatching of the MULTI_SCREEN_CONFIGURATION_CHANGING field 1804 and the generation of the MULTI_SCREEN_CONFIGURATION_CHANGED field 1802, a screen may not be removed from and the MULTI_SCREEN_CONFIGURATION_SCREEN_REMOVED field 1810 may not be generated for a multiscreen configuration that is the current per-platform or some current per-display multiscreen configuration.

The MULTI_SCREEN_CONFIGURATION_SCREEN_REMOVED field 1810 has been applied since the MSM I01 version.

The MULTI_SCREEN_CONFIGURATION_LAST field 1806 may be declared as public static final int MULTI_SCREEN_CONFIGURATION_LAST, and is a last event identifier assigned to MultiScreenConfigurationEvent event identifiers.

The MULTI_SCREEN_CONFIGURATION_LAST field 1806 has been applied since the MSM I01 version.

FIG. 18C illustrates a constructor 1830 of the MultiScreenConfigurationEvent class 1712 of the org.ocap.ui.event package, according to an exemplary embodiment of the present invention.

The constructor 1830 includes MultiScreenConfigurationEvent(java.lang.Object source, int id, java.lang.Object related) 1832.

The constructor 1830 may be declared as public MultiScreenConfigurationEvent(java.lang.Object source, int id, java.lang.Object related), and the MultiScreenConfigurationEvent class 1712 is constructed.

A source parameter may be a reference to a MultiScreenManager instance, a display HScreen instance, or a MultiScreenConfiguration instance in accordance with the specific event as specified above.

An id parameter may be the event identifier of this event, the value of which may be one of the following: MULTI_SCREEN_CONFIGURATION_CHANGING, MULTI_SCREEN_CONFIGURATION_CHANGED, MULTI_SCREEN_CONFIGURATION_SCREEN_ADDED, or MULTI_SCREEN_CONFIGURATION_SCREEN_REMOVED.

A related parameter may be a reference to a MultiScreenConfiguration instance or an HScreen instance in accordance with the specific event as specified above.

The constructor 1830 of the MultiScreenConfigurationEvent class 1712 has been applied since the MSM I01 version.

FIG. 18D illustrates a method 1840 of the MultiScreenConfigurationEvent class 1712 of the org.ocap.ui.event package, according to an exemplary embodiment of the present invention.

The method 1840 of the MultiScreenConfigurationEvent class 1712 of the org.ocap.ui.event package includes a java.lang.Object getRelated( ) method 1842, methods 1850 inherited from class org.ocap.ui.event.MultiScreenEvent include getId, methods 1852 inherited from class java.util.EventObject include at least one of getSource, toString, methods 1854 inherited from class java.lang.Object include at least one of clone, equals, finalize, getClass, hashCode, notify, notifyAll, wait, wait, and wait.

The getRelated( ) method 1842 may be declared as public java.lang.Object getRelated( ), and the related object of this event is obtained. That is, the getRelated( ) method 1842 returns the related object instance of this event, the value of which may be one of the following as determined by the specific event type: a reference to a MultiScreenConfiguration instance or a reference to an HScreen instance.

The getRelated( ) method 1842 has been applied since the MSM I01 version.

FIG. 19A illustrates definition of the MultiScreenConfigurationListener interface 1702 of the org.ocap.ui.event package, according to an exemplary embodiment of the present invention.

The MultiScreenConfigurationListener interface 1702 of the org.ocap.ui.event package include java.util.EventListener as Superinterfaces, may be declared as public interface MultiScreenConfigurationListener, and java.util.EventListener is extended.

The MultiScreenConfigurationListener interface 1702 is used to provide notifications regarding system and application induced changes to the global state of the MultiScreenManager instance or the state of some display HScreen with respect to the per-platform or some per-display multiscreen configuration, respectively, or to changes to a specific MultiScreenConfiguration instance.

The MultiScreenConfigurationListener interface 1702 has been applied since the MSM I01 version.

FIG. 19B illustrates a method 1900 of the MultiScreenConfigurationListener interface 1702 of the org.ocap.ui.event package, according to an exemplary embodiment of the present invention.

The method 1900 of the MultiScreenConfigurationListener interface 1702 of the org.ocap.ui.event package includes a void notify(MultiScreenConfigurationEvent evt) method 1910.

The void notify method 1910 may be declared as void notify(MultiScreenConfigurationEvent evt). When a MultiScreenConfigurationEvent is generated, the implementation may invoke the void notify method 1910 on all registered listeners in order to report event information to each listener as required by specific event semantics.

In case the event is MultiScreenConfigurationEvent.MULTI_SCREEN_CONFIGURATION_CHANGING, the void notify method 1910 may not be invoked unless the application that registered this listener has been granted MonitorAppPermission("multiscreen.configuration"). Furthermore, an implementation of the void notify method 1910 may severely limit the amount of processing that may occur, since an absolute time limit is placed on the invocation of the void notify method 1910 for the set of all applicable listeners.

An evt parameter may be a MultiScreenConfigurationEvent instance.

The void notify method 1910 has been applied since the MSM I01 version.

FIG. 20A illustrates definition of the MultiScreenContextEvent class 1714 of the org.ocap.ui.event package, according to an exemplary embodiment of the present invention.

The MultiScreenContextEvent class 1714 of the org.ocap.ui.event package is defined as a sub-level of org.ocap.ui.event.MultiScreenEvent that is a sub-level of java.util.EventObject that is a sub-level of java.lang.Object.

All Implemented Interfaces of the MultiScreenContextEvent class 1714 of the org.ocap.ui.event package include java.io.Serializable, may be declared as public class MultiScreenContextEvent, and MultiScreenEvent is extended.

The MultiScreenContextEvent class 1714 is used to report a change to a MultiScreenContext to interested listeners.

The following types of changes cause the generation of the MultiScreenContextEvent class 1714:

Change of associated ServiceContext;

Change of associated display HScreen;

Change of associated display HScreen area (extent) assignment;

Change of associated set of VideoOutputPorts;

Change of audio focus of a display HScreen;

Change of screen visibility;

Change of screen z-order;

Change of set of underlying HScreenDevice that contribute audio sources to an HScreen;

Change of set of underlying HScreenDevice instances, e.g., due to addition or removal of an HScreenDevice from an HScreen; and Change of the z-order of the underlying HScreenDevice instances of an HScreen.

The MultiScreenContextEvent class 1714 of the org.ocap.ui.event package has been applied since the MSM I01 version.

FIG. 20B illustrates a field 2000 of the MultiScreenContextEvent class 1714 of the org.ocap.ui.event package, according to an exemplary embodiment of the present invention.

The field 2000 of the MultiScreenContextEvent class 1714 of the org.ocap.ui.event package includes at least one of a static int MULTI_SCREEN_CONTEXT_AUDIO_FOCUS_CHANGED field 2002, a static int MULTI_SCREEN_CONTEXT_AUDIO_SOURCES_CHANGED field 2004, a static int MULTI_SCREEN_CONTEXT_DEVICES_CHANGED field 2006, a static int MULTI_SCREEN_CONTEXT_DEVICES_Z_ORDER_CHANGED field 2008, a static int MULTI_SCREEN_CONTEXT_DISPLAY_AREA_CHANGED field 2010, a static int MULTI_SCREEN_CONTEXT_DISPLAY_SCREEN_CHANGED field 2012, a static int MULTI_SCREEN_CONTEXT_OUTPUT_PORT_CHANGED field 2014, a static int MULTI_SCREEN_CONTEXT_SERVICE_CONTEXT_CHANGED field 2016, a static int MULTI_SCREEN_CONTEXT_VISIBILITY_CHANGED field 2018, a static int MULTI_SCREEN_CONTEXT_Z_ORDER_CHANGED field 2020, and a static int MULTI_SCREEN_CONTEXTS_LAST field 2022.

Fields 2030 inherited from class org.ocap.ui.event.MultiScreenEvent include at least one of MULTI_SCREEN_CONFIGURATION_FIRST and MULTI_SCREEN_CONTEXT_FIRST. Fields 2035 inherited from class java.util.EventObject include a source.

The MULTI_SCREEN_CONTEXT_DEVICES_CHANGED field 2006 may be declared as public static final int MULTI_SCREEN_CONTEXT_DEVICES_CHANGED, and corresponds to a case when the set of HScreenDevice instances associated with the underlying HScreen of the source MultiScreenContext has changed.

The MULTI_SCREEN_CONTEXT_DEVICES_CHANGED field 2006 has been applied since the MSM I01 version.

The MULTI_SCREEN_CONTEXT_DEVICES_Z_ORDER_CHANGED field 2008 may be declared as public static final int MULTI_SCREEN_CONTEXT_DEVICES_Z_ORDER_CHANGED, and corresponds to a case when the z-order of the set of HScreenDevice instances associated with the underlying HScreen of the source MultiScreenContext has changed.

The MULTI_SCREEN_CONTEXT_DEVICES_Z_ORDER_CHANGED field 2008 has been applied since the MSM I01 version.

The MULTI_SCREEN_CONTEXT_SERVICE_CONTEXT_CHANGED 2016 may be declared as public static final int MULTI_SCREEN_CONTEXT_SERVICE_CONTEXT_CHANGED, and corresponds to a case when the ServiceContext associated with the underlying HScreen of the source MultiScreenContext has changed.

The MULTI_SCREEN_CONTEXT_SERVICE_CONTEXT_CHANGED 2016 has been applied since the MSM I01 version.

The MULTI_SCREEN_CONTEXT_DISPLAY_SCREEN_CHANGED field 2012 may be declared as public static final int MULTI_SCREEN_CONTEXT_DISPLAY_SCREEN_CHANGED, and corresponds to a case when the display HScreen associated with the underlying HScreen of the source code>MultiScreenContext has changed.

The MULTI_SCREEN_CONTEXT_DISPLAY_SCREEN_CHANGED field 2012 has been applied since the MSM I01 version.

The MULTI_SCREEN_CONTEXT_DISPLAY_AREA_CHANGED 2010 may be declared as public static final int MULTI_SCREEN_CONTEXT_DISPLAY_AREA_

CHANGED, and corresponds to a case when the area (extent) of the display HScreen to which the underlying HScreen of the source MultiScreenContext is assigned has changed.

The MULTI_SCREEN_CONTEXT_DISPLAY_AREA_CHANGED 2010 has been applied since the MSM I01 version.

The MULTI_SCREEN_CONTEXT_OUTPUT_PORT_CHANGED field 2014 may be declared as public static final int MULTI_SCREEN_CONTEXT_OUTPUT_PORT_CHANGED, and corresponds to the set of video output ports associated with underlying HScreen of the source MultiScreenContext has changed.

The MULTI_SCREEN_CONTEXT_OUTPUT_PORT_CHANGED field 2014 has been applied since the MSM I01 version.

The MULTI_SCREEN_CONTEXT_VISIBILITY_CHANGED field 2018 may be declared as public static final int MULTI_SCREEN_CONTEXT_VISIBILITY_CHANGED, and corresponds to a case when the visibility of the underlying HScreen of the source MultiScreenContext has changed.

The MULTI_SCREEN_CONTEXT_VISIBILITY_CHANGED field 2018 has been applied since the MSM I01 version.

The MULTI_SCREEN_CONTEXT_Z_ORDER_CHANGED field 2020 may be declared as public static final int MULTI_SCREEN_CONTEXT_Z_ORDER_CHANGED, and corresponds to a case when the z-order of the underlying HScreen of the source MultiScreenContext has changed.

The MULTI_SCREEN_CONTEXT_Z_ORDER_CHANGED field 2020 has been applied since the MSM I01 version.

The MULTI_SCREEN_CONTEXT_AUDIO_SOURCES_CHANGED field 2004 may be declared as public static final int MULTI_SCREEN_CONTEXT_AUDIO_SOURCES_CHANGED, and corresponds to a case when the audio sources of the underlying HScreen of the source MultiScreenContext has changed.

The MULTI_SCREEN_CONTEXT_AUDIO_SOURCES_CHANGED field 2004 has been applied since the MSM I01 version.

The MULTI_SCREEN_CONTEXT_AUDIO_FOCUS_CHANGED field 2002 may be declared as public static final int MULTI_SCREEN_CONTEXT_AUDIO_FOCUS_CHANGED, and corresponds to a case when the audio focus screen of the underlying HScreen of the source MultiScreenContext has changed. When the audio focus screen of a display HScreen changes, then this event may be generated twice (after completing the change): firstly to the MultiScreenContext of the logical screen which has lost audio focus (if such logical screen existed), and secondly to the MultiScreenContext of the display screen. In both of these cases, the source MultiScreenContext may be the display screen.

The MULTI_SCREEN_CONTEXT_AUDIO_FOCUS_CHANGED field 2002 has been applied since the MSM I01 version.

The MULTI_SCREEN_CONTEXTS_LAST field 2022 may be declared as public static final int MULTI_SCREEN_CONTEXTS_LAST, and is a last event identifier assigned to MultiScreenConfigurationEvent event identifiers.

The MULTI_SCREEN_CONTEXTS_LAST field 2022 has been applied since the MSM I01 version.

FIG. 20C illustrates a constructor 2040 of the MultiScreenContextEvent class 1714 of the org.ocap.ui.event package, according to an exemplary embodiment of the present invention.

The constructor 2040 includes MultiScreenContextEvent (java.lang.Object source, int id)(2042).

The constructor 2040 may be declared as public MultiScreenContextEvent(java.lang.Object source, int id), and MultiScreenContextEvent class 1714 is constructed.

A source parameter may be a reference to a MultiScreenContext interface.

An id parameter may be the event identifier of this event, the value of which may be one of the following: the MULTI_SCREEN_CONTEXT_DEVICES_CHANGED field 2006, the MULTI_SCREEN_CONTEXT_DEVICES_Z_ORDER_CHANGED field 2008, the MULTI_SCREEN_CONTEXT_SERVICE_CONTEXT_CHANGED field 2016, the MULTI_SCREEN_CONTEXT_DISPLAY_SCREEN_CHANGED field 2012, the MULTI_SCREEN_CONTEXT_DISPLAY_AREA_CHANGED field 2010, the MULTI_SCREEN_CONTEXT_OUTPUT_PORT_CHANGED field 2014, the MULTI_SCREEN_CONTEXT_VISIBILITY_CHANGED field 2018, the MULTI_SCREEN_CONTEXT_Z_ORDER_CHANGED field 2020, the MULTI_SCREEN_CONTEXT_AUDIO_SOURCES_CHANGED field 2004, and the MULTI_SCREEN_CONTEXT_AUDIO_FOCUS_CHANGED field 2002.

The constructor 2040 of the MultiScreenContextEvent class 1714 has been applied since the MSM I01 version.

FIG. 20D illustrates a method 2050 of the MultiScreenContextEvent class 1714 of the org.ocap.ui.event package, according to an exemplary embodiment of the present invention.

Methods 2052 inherited from the MultiScreenEvent class 1716 of the org.ocap.ui.event package include getId, and methods 2054 inherited from class java.util.EventObject include at least one of getSource and toString. Methods 2056 inherited from class java.lang.Object include at least one of clone, equals, finalize, getClass, hashCode, notify, notifyAll, wait, wait, and wait.

FIG. 21A illustrates definition of the MultiScreenConfigurationListener interface 1702 of the org.ocap.ui.event package, according to an exemplary embodiment of the present invention.

The MultiScreenConfigurationListener interface 1702 of the org.ocap.ui.event package includes java.util.EventListener as Superinterfaces, may be declared as public interface MultiScreenContextListener, and java.util.EventListener is extended.

The MultiScreenConfigurationListener interface 1702 is used to provide notifications regarding system and application induced changes to a MultiScreenContext.

The MultiScreenConfigurationListener interface 1702 has been applied since the MSM I01 version.

FIG. 21B illustrates a method 2100 of the MultiScreenConfigurationListener interface 1702 of the org.ocap.ui.event package, according to an exemplary embodiment of the present invention.

The method 2100 of the MultiScreenConfigurationListener interface 1702 includes a void notify(MultiScreenContextEvent evt) method 2102.

The void notify(MultiScreenContextEvent) method 2102 may be declared as void notify(MultiScreenContextEvent evt). When an OCAP implementation makes any change to a MultiScreenContext that causes generation of a MultiScreenContextEvent, then the implementation may invoke the void notify(MultiScreenContextEvent) method 2102 on all registered listeners in order to report change information to the listener.

If the application that registered this listener has not been granted MonitorAppPermission("multiscreen.context") and the source MultiScreenContext associated with the specified MultiScreenContextEvent is associated with no ServiceContext or a ServiceContext that is not accessible to that application, then the void notify(MultiScreenContextEvent) method 2102 may not be invoked on this listener; otherwise it may be invoked on this listener.

A ServiceContext is accessible to an application if it is returned from a ServiceContextFactory.getServiceContexts( ) method.

An evt parameter may be a MultiScreenContextEvent instance.

The void notify(MultiScreenContextEvent) method 2102 has been applied since the MSM I01 version.

FIG. 22A illustrates definition of the MultiScreenEvent class 1716 of the org.ocap.ui.event package, according to an exemplary embodiment of the present invention.

The MultiScreenEvent class 1716 of the org.ocap.ui.event package is defined as a sub-level of java.util.EventObject that is a sub-level of java.lang.Object.

The MultiScreenEvent class 1716 of the org.ocap.ui.event package includes java.io.Serializable as All Implemented Interfaces, and includes at least one of MultiScreenConfigurationEvent and MultiScreenContextEvent as Direct Known Subclasses.

The MultiScreenEvent class 1716 of the org.ocap.ui.event package may be declared as public abstract class MultiScreenEvent, and java.util.EventObject is extended.

A MultiScreenEvent is an abstract, base class used to organize event identification codes used by disparate types of events related to multiple screen management functionality.

The MultiScreenEvent class 1716 of the org.ocap.ui.event package has been applied since the MSM I01 version.

FIG. 22B illustrates a field 2200 of the MultiScreenEvent class 1716 of the org.ocap.ui.event package, according to an exemplary embodiment of the present invention.

The field 2200 of the MultiScreenEvent class 1716 of the org.ocap.ui.event package at least one of a static int MULTI_SCREEN_CONFIGURATION_FIRST field 2202 and a static int MULTI_SCREEN_CONTEXT_FIRST field 2204. Fields 2210 inherited from class java.util.EventObject include a source.

The MULTI_SCREEN_CONFIGURATION_FIRST field 2202 may be declared as public static final int MULTI_SCREEN_CONFIGURATION_FIRST, and is the first event identifier assigned to MultiScreenConfigurationEvent event identifiers.

The MULTI_SCREEN_CONFIGURATION_FIRST field 2202 has been applied since the MSM I01 version.

The MULTI_SCREEN_CONTEXT_FIRST field 2204 may be declared as public static final int MULTI_SCREEN_CONTEXT_FIRST, and is the first event identifier assigned to MultiScreenContextEvent event identifiers.

The MULTI_SCREEN_CONTEXT_FIRST field 2204 has been applied since the MSM I01 version.

FIG. 22C illustrates a constructor 2220 of the MultiScreenEvent class 1716 of the org.ocap.ui.event package, according to an exemplary embodiment of the present invention.

The constructor 2220 of the MultiScreenEvent class 1716 of the org.ocap.ui.event package includes at least one of protected MultiScreenEvent(java.lang.Object source, int id) (2222).

The constructor 2220 of the MultiScreenEvent class 1716 of the org.ocap.ui.event package may be declared as protected MultiScreenEvent(java.lang.Object source, int id), and is a protected constructor for a MultiScreenEvent.

A source parameter may be a reference to an event source as defined by a concrete subclass of the MultiScreenEvent class 1716.

An id parameter may be the event identifier of the MultiScreenEvent class 1716.

The constructor 2220 of the MultiScreenEvent class 1716 has been applied since the MSM I01 version.

FIG. 22D illustrates a method 2230 of the MultiScreenEvent class 1716 of the org.ocap.ui.event package, according to an exemplary embodiment of the present invention.

The method 2230 of the MultiScreenEvent class 1716 of the org.ocap.ui.event package includes an int getId( ) method 2232. Methods 2240 inherited from class java.util.EventObject include at least one of getSource and toString. Methods 2245 inherited from class java.lang.Object include at least one of clone, equals, finalize, getClass, hashCode, notify, notifyAll, wait, wait, and wait.

The int getId( ) method 2232 may be declared as public int getId( ), and the event identifier associated with MultiScreenEvent class is obtained.

The event identifier of MultiScreenEvent, for which see the sub-classes of MultiScreenEvent: MultiScreenConfigurationEvent and MultiScreenContextEvent is returned.

The int getId( ) method 2232 has been applied since the MSM I01 version.

FIG. 23A illustrates definition of the MultiScreenResourceEvent class 1718 of the org.ocap.ui.event package, according to an exemplary embodiment of the present invention.

The MultiScreenResourceEvent class 1718 of the org.ocap.ui.event package is defined as a sub-level of org.davic.resources.ResourceStatusEvent that is a sub-level of java.util.EventObject that is a sub-level of java.lang.Object.

The MultiScreenResourceEvent class 1718 of the org.ocap.ui.event package includes java.io.Serializable as All Implemented Interfaces. The MultiScreenResourceEvent class 1718 of the org.ocap.ui.event package may be declared as public class MultiScreenResourceEvent, and org.davic.resources.ResourceStatusEvent is extended.

The MultiScreenResourceEvent class 1718 is used to report changes regarding the resource status of multiscreen related resources.

The MultiScreenResourceEvent class 1718 of the org.ocap.ui.event package has been applied since the MSM I01 version.

FIG. 23B illustrates a field 2300 of the MultiScreenResourceEvent class 1718 of the org.ocap.ui.event package, according to an exemplary embodiment of the present invention.

The MultiScreenResourceEvent class 1718 of the org.ocap.ui.event package includes at least one of a static int MULTI_SCREEN_RESOURCE_SCREEN_RELEASED field 2302 and a static int MULTI_SCREEN_RESOURCE_SCREEN_RESERVED field 2304. Fields 2310 inherited from class java.util.EventObject include a source.

The MULTI_SCREEN_RESOURCE_SCREEN_RELEASED field 2302 may be declared as public static final int MULTI_SCREEN_RESOURCE_SCREEN_RELEASED. The reservation on a screen has just been released, indicating that the screen (or its constituent screen devices) may now be reserved (i.e., they are now unreserved).

The MULTI_SCREEN_RESOURCE_SCREEN_RELEASED field 2302 has been applied since the MSM I01 version.

The MULTI_SCREEN_RESOURCE_SCREEN_RESERVED field 2304 may be declared as public static final int MULTI_SCREEN_RESOURCE_SCREEN_RESERVED.

The reservation on a screen has just been granted to an application, indicating that the screen (including its constituent screen devices) is no longer unreserved.

The MULTI_SCREEN_RESOURCE_SCREEN_RESERVED field 2304 has been applied since the MSM I01 version.

FIG. 23C illustrates a constructor 2320 of the MultiScreenResourceEvent class 1718 of the org.ocap.ui.event package, according to an exemplary embodiment of the present invention.

The constructor 2320 of the MultiScreenResourceEvent class 1718 includes MultiScreenResourceEvent(java.lang.Object source, int id) 2322.

The constructor 2320 of the MultiScreenResourceEvent class 1718 may be declared as public MultiScreenResourceEvent(java.lang.Object source, int id), and is a constructor for a MultiScreenResourceEvent.

A source parameter may be a reference to an HScreen instance whose resource status has changed.

An id parameter may be the event identifier of the MultiScreenResourceEvent class 1718.

The constructor 2320 of the MultiScreenResourceEvent class 1718 has been applied since the MSM I01 version.

FIG. 23D illustrates a method 2330 of the MultiScreenResourceEvent class 1718 of the org.ocap.ui.event package, according to an exemplary embodiment of the present invention.

The method 2330 of the MultiScreenResourceEvent class 1718 of the org.ocap.ui.event package includes at least one of an int getId( ) method 2332 and a java.lang.Object getSource( ) method 2334. Methods 2340 inherited from class java.util.EventObject includes toString, and methods 2345 inherited from class java.lang.Object includes at least one of clone, equals, finalize, getClass, hashCode, notify, notifyAll, wait, wait, and wait.

The getSource( ) method 2334 may be declared as public java.lang.Object getSource( ), and the source object that generated this event is obtained.

The getSource( ) method 2334 overrides getSource in class org.davic.resources.ResourceStatusEvent. The getSource( ) method 2334 returns a reference to an HScreen instance, or a subclass thereof The getSource( ) method 2334 has been applied since the MSM I01 version.

The getId( ) method 2332 may be declared as public int getId( ), and the resource event identifier associated with the MultiScreenResourceEvent class 1718 is obtained.

The event identifier of the MultiScreenResourceEvent class 1718 is returned, where the identifier may be one of the following: {the MULTI_SCREEN_RESOURCE_SCREEN_ RELEASED field 2302, the MULTI_SCREEN_RESOURCE_SCREEN_RESERVED field 2304}.

The getId( ) method 2332 has been applied since the MSM I01 version.

Hereinafter, application usage constraints for multiscreen configuration, according to an exemplary embodiment of the present invention will be described with reference to FIGS. 24A through 24D, 25A through 25E, 26A through 26D, 27, 28A, 28B, and 29.

According to an exemplary embodiment, preconditions (FIGS. 24A through 24C) and postconditions (FIGS. 25A through 25E) for multiscreen configuration change processing, that is, multiscreen reconfiguration have to be satisfied. In this case, the preconditions and the postconditions have to be satisfied under the following assumptions:

1. platform implements MSM as defined;
2. more than one distinct multiscreen configuration exists and is accessible;
3. caller has MonitorAppPermission("multiscreen.configuration");
4. no MultiScreenConfigurationEvent.MULTI_SCREEN_CONFIGURATION_CHANGING or MultiScreenConfigurationEvent.MULTI_SCREEN_CONFIGURATION_CHANGED event is generated during the execution of a verifyConstraints( ) method other than as a direct result of the invocation of setMultiScreenConfiguration( ) by the verifyConstraints( ) method;
5. no MultiScreenConfigurationEvent.MULTI_SCREEN_CONFIGURATION_SCREEN_ADDED or MultiScreenConfigurationEvent.MULTI_SCREEN_CONFIGURATION_SCREEN_REMOVED event is generated during the execution of the verifyConstraints( ) method;
6. application signals allow_default_device_reconfig as '1' in multiple screen usage descriptor;
7. the platform preserves key default screen device configuration parameters, specifically screen area, pixel resolution, and pixel aspect ratio across configuration change; i.e., it does not take advantage of fact that application has signaled allow_default_device_reconfig as '1' in order to reconfigure default screen device parameters (note that this verification process could be expanded to cover a case where platform does not preserve these parameters, i.e., an appropriate HScreenConfigurationEvent or MultiScreenContextEvent could be listened for and used to note that platform does not preserve these parameters);

FIGS. 24A through 24C illustrate preconditions for changing multiscreen configuration, according to an exemplary embodiment of the present invention.

In S2410 of FIG. 24A, invariants are verified. According to an exemplary embodiment of the present invention, static invariants are verified as a precondition. In this case, a verifyInvariantConstraints( ) method of verifying invariants will be described later with reference FIGS. 26A through 26D.

In S2420 of FIG. 24A, a default screen is recorded.

In S2430 of FIG. 24A, a default background screen device and key configuration parameters are recorded.

In S2440 of FIG. 24B, a default video screen device and key configuration parameters are recorded.

In S2450 of FIG. 24B, a default graphics screen device and key configuration parameters are recorded.

In S2460 of FIG. 24C, non-default screens are recorded.

In S2470 of FIG. 24C, non-default screen devices are recorded.

In S2480 of FIG. 24C, a different configuration from a current configuration is found.

FIG. 24D illustrates a process of changing multiscreen configuration according to an exemplary embodiment of the present invention.

In S2490, a multiscreen configuration is changed. That is, the multiscreen configuration is changed via MSM.setMultiScreenConfiguration (MSC2, null), and generation of MULTI_SCREEN_CONFIGURATION_CHANGING and MULTI_SCREEN_CONFIGURATION_CHANGED events are waited for via a waitForMultiScreenConfigurationChangingEvent( ) method and a waitForMultiScreenConfigurationChangedEvent( ) method.

FIGS. 25A through 25E illustrate postconditions for changing multiscreen configuration, according to an exemplary embodiment of the present invention.

In S2500 of FIG. 25A, invariants are verified. According to an exemplary embodiment of the present invention, static invariants are verified as a postcondition. In this case, a verifyInvariantConstraints( ) method of verifying invariants will be described later with reference FIGS. 26A through 26D.

In S2505 of FIG. 25A, the current multiscreen configuration is the new configuration.

In S2510 of FIG. 25A, the new default screen must be same instance as the old default screen.

In S2515 of FIG. 25A, if it exists, the new default background screen device must be the same instance as the old default background screen device if it exists unless the application signals allow_default_device_reconfig as '1' in which case it is permitted that no default background device is available after reconfiguration, in which case the former default background device must be reset to the empty background screen device state.

In S2520 of FIG. 25B, if it exists, the new default background screen device must have same screen area, pixel resolution, and pixel aspect ratio as it did with previous default background screen device.

In S2525 of FIG. 25C, if it exists, the new default video screen device must be the same instance as the old default video screen device if it exists unless the application signals allow_default_device_reconfig as '1' in which case it is permitted that no default video device is available after reconfiguration, in which case the former default video device must be reset to the empty video screen device state.

In S2530 of FIG. 25C, if it exists, the new default video screen device must have same screen area, pixel resolution, and pixel aspect ratio as it did with previous default video screen device.

In S2535 of FIG. 25D, if it exists, the new default graphics screen device must be the same instance as the old default graphics screen device if it exists unless the application signals allow_default_device_reconfig as '1' in which case it is permitted that no default graphics device is available after reconfiguration, in which case the former default graphics device must be reset to the empty graphics screen device state.

In S2540 of FIG. 25D, if it exists, the new default graphics screen device must have same screen area, pixel resolution, and pixel aspect ratio as it did with previous default graphics screen device.

In S2545 of FIG. 25E, for every non-default screen obtained prior to reconfiguration, if no longer a non-default screen, then it must be equivalent to an empty screen; otherwise, it must not be equivalent to an empty screen.

In S2550 of FIG. 25E, for every non-default screen device obtained prior to reconfiguration, if no longer a non-default screen device, then it must be equivalent to an empty screen device; otherwise, it must not be equivalent to an empty screen device.

FIGS. 26A through 26D illustrate constraints for verifying invariants, according to an exemplary embodiment of the present invention.

In S2605 of FIG. 26A, there must be a multiscreen manager.

In S2610 of FIG. 26A, there must be a current multiscreen configuration.

In S2615 of FIG. 26A, there must be a non-empty set of accessible multiscreen configurations.

In S2620 of FIG. 26A, the current multiscreen configuration must be an accessible configuration.

In S2625 of FIG. 26B, there must be a non-empty set of screens in the current multiscreen configuration In S2630 of FIG. 26B, the screens in the current multiscreen configuration must not be empty.

In S2635 of FIG. 26B, any two distinct screen entries in the current multiscreen configuration must not represent the same resources.

In S2640 of FIG. 26C, there must be a current default screen.

In S2645 of FIG. 26C, the current default screen must not be equivalent to the empty screen.

In S2650 of FIG. 26C, exactly one screen entry in the current multiscreen configuration must represent the same resources as the default screen.

In S2655 of FIG. 26C, there must be a non-empty set of accessible screens.

In S2660 of FIG. 26C, the current default screen must be a distinct member of the set of accessible screens.

In S2665 of FIG. 26D, any background screen device of the current default screen must not be equivalent to the empty background screen device.

In S2670 of FIG. 26D, any video screen device of the current default screen must not be equivalent to the empty video screen device.

In S2675 of FIG. 26D, any graphics screen device of the current default screen must not be equivalent to the empty graphics screen device.

FIG. 27 illustrates definition of a getNonDefaultScreens( ) method, according to an exemplary embodiment of the present invention.

The getNonDefaultScreens( ) method obtains non-default screens (SX1ND) by returning the non-default screens (SX1ND) on Multiscreen Manager(MSM).

FIGS. 28A and 28B illustrate definition of a getNonDefaultScreenDevices( ) method, according to an exemplary embodiment of the present invention.

In S2810 of FIG. 28A, the numbers of non-default screen devices of background screen devices, video screen devices, and graphics screen devices are separately checked.

In S2820 of FIG. 28B, the non-default screen devices of the background screen devices, the video screen devices, and the graphics screen devices are separately obtained and returned.

FIG. 29 illustrates a plurality of methods according to an exemplary embodiment of the present invention.

In S2910, a waiting state is maintained until a MultiScreenConfigurationEvent.MULTI_SCREEN_CONFIGURATION_CHANGING event is generated.

In S2920, a waiting state is maintained until a MultiScreenConfigurationEvent.MULTI_SCREEN_CONFIGURATION_CHANGED event is generated.

In S2930, an assertion failure is checked and reported.

Hereinafter, subjects to be changed and added in accordance with OCAP standards in order to implement exemplary embodiments of the present invention in an OCAP environment will be described with reference to FIGS. 30A, 30B, 31, 32A, 32B, 33A, 33B, and 34A through 34C.

An OCAP application does not support or alternatively very restrictively supports screen management of multiple display screens or multiple logical screens as defined by the HAVi HScreen class, and, in particular, for the screen management of PIP and POP functionality. Accordingly, in order to implement an OCAP MSM according to an exemplary embodiment of the present invention, the OCAP application may verify the presence of the "ocap.api.option.msm" Java system property. If the "ocap.api.option.msm" Java system property is verified, the OCAP application may discover, configure, use, and otherwise manipulate the following device capabilities: PIP functions, POP functions, Multiple Displays, and Mapping from Main, PIP, POP Screens to Output Ports.

Hereinafter, AppID for identifying applications which are to be changed to implement an OCAP MSM will be described with reference to FIGS. 30A and 30B.

FIG. 30A illustrates pseudo-codes of AppID according to OCAP standards. FIG. 30B illustrates pseudo-codes of OcapAppID for implementing an OCAP MSM, according to an exemplary embodiment of the present invention.

If an OCAP platform implementation supports the simultaneous presentation of multiple service contexts (javax.tv.select-ion.ServiceContext), then it is impossible to distinguish between two instances of the an application that use the same organization and application identifier as represented by the MHP defined class org.dvb.application.AppID, where these separate instances are running in distinct service contexts.

As a consequence, the functionality of the application database and related classes that use AppID are not well-defined, i.e., are ambiguous in such a use-case.

According to an exemplary embodiment of the present invention, application identifiers are defined as newly introduced class OcapAppID instead of class AppID by changing S3010 of FIG. 30A to S3050 of FIG. 30B.

Likewise, the application identifiers are defined as class OcapAppID in S3055, S3060, S3065, and S3070 of FIG. 30B instead of class AppID in S3015, S3020, S3025, and S3030 of FIG. 30A.

Definition of class OcapAppID will now be described with reference to FIG. 31.

FIG. 31 illustrates pseudo-codes of OcapAppID according to an exemplary embodiment of the present invention.

In S3110, an OcapAppID permits discriminating amongst multiple instances of the same application where these multiple instances are associated with distinct ServiceContext instances.

Here, the same application means that the application uses the same organization and application identifiers. OCAP implementations that support multiple, simultaneously presenting ServiceContext instances may permit multiple, concurrent instances of the same application.

Except for the case where an instance of org.dvb.application.AppId is constructed by explicit invocation of the constructor AppID(int,int) by an OCAP application, every application visible instance of AppID may also be an instance of OcapAppID.

If an OCAP implementation or an OCAP application encounters an instance of AppID, call this id, that is not an instance of OcapAppID, then that instance may be semantically treated as being equivalent to an OcapAppID constructed as follows.

In S3120, a public constructor to be used when defaulting the ServiceContext field of this OcapAppID is defined. In particular, invoking this constructor may be equivalent to invoking an OcapAppID (oid, aid, null) method.

An oid parameter may be an organization identifier that is compatible with the same named parameter of the superclass constructor AppID(int oid, int aid).

An aid parameter may be an organization identifier that is compatible with the same named parameter of the superclass constructor AppID(int oid, int aid).

In S3130, a public constructor to be used when specifying the ServiceContext field of this OcapAppID is defined.

An oid parameter may be an organization identifier that is compatible with the same named parameter of the superclass constructor AppID(int oid, int aid).

An aid parameter may be an organization identifier that is compatible with the same named parameter of the superclass constructor AppID(int oid, int aid).

A context parameter may be either a ServiceContext instance or 'null'. If 'null', then the current default ServiceContext instance may be substituted for the null when initializing the ServiceContext instance. In S3140, the ServiceContext associated with this OcapAppID instance is obtained. A non-null ServiceContext instance is returned due to a getServiceContext( ) method.

Hereinafter, an HScene Manager according to OCAP standards which is changed so as to support the OCAP MSM extension will be described with reference to FIGS. 32A, 32B, 33A, 33B, and 34A through 34C.

The Scene Management functionality defined by org.ocap.ui.HSceneManager and related types does not adequately support the following use cases:

- use of multiple HScene instances by a single application, where these different instances are associated with distinct HGraphicsDevice instances;
- ability for monitor application or other privileged application to transfer focus from one HScene to another independent of the owning application;
- ability for monitor application or other privileged application to monitor and/or grant/deny application- or platform-initiated change of HScene focus;
- ability for monitor application or other privileged application determine if distinct HSceneBinding instances refer to the same or different underlying scene independent of the owning application;
- ability for monitor application or other privileged application to maintain an accurate state model of all visible scenes, their z-indices, and their screen locations;
- ability for monitor application or other privileged application to specify an alternative z-index ordering of scenes to be used in response to a reordering request; and
- change HSceneManager.getHSceneOrder( ) return value type.

In addition, the following functionality may be better expressed by refactoring through merging:

- merge HSceneChangeRequestHandler.testShow(..)into testOrder(..) by specifying oldOrder as '−1'.

This Engineering Change addresses these issues as follows:

- add HSceneBinding.getGraphicsDevice( );
- add HSceneChangeRequestHandler.testMoveFocus (HSceneBinding, HSceneBinding);
- add HSceneChangeRequestHandler.focusChanged (HSceneBinding, HSceneBinding);
- remove HSceneChangeRequestHandler.testShow(..);
- change HSceneChangeRequestHandler.testOrder(..) signature, return value type, and declared exceptions;
- change HSceneChangeRequestHandler.testMove(..) signature and declared exceptions;
- add HSceneManager.getAppDefaultHScene(AppID);
- add HSceneManager.getAppHScenes(AppID);
- add HSceneManager.getAppHSceneLocation(HScene);
- add HSceneManager.getHSceneFocus( );
- add HSceneManager.getHSceneOrder(HGraphicsDevice);
- add HSceneManager.transferHSceneFocus(HSceneBinding);
- add HSceneManager.sameScene(HSceneBinding, HSceneBinding); and
- change HSceneManager.getHSceneOrder( ) return value type.

In addition, the textual descriptions of HSceneManager, HSceneBinding, and HSceneChangeRequestHandler and their prior existing members have been editorially enhanced for clarity and improved comprehension.

In javax.tv.graphics.TVContainer, if getRootContainer(XletContext ctx) is invoked by (or on behalf of) an OCAP application, ctx is the initial XletContext of the invoking application, and an instance is returned, then that instance may be identical to what would be returned at the same time by org.havi.ui.HSceneFactorygetDefaultHScene( ).

OCAP extends DVB-GEM 1.0.2 through the addition of the OCAP specific Scene Management functionality specified below. In particular, an OCAP implementation may implement org.ocap.ui.HSceneBinding, org.ocap.ui.HSceneChangeRequestHandler, org.ocap.ui.HSceneManager and their associated semantics as specified later with reference to 32B, 33B, 34B, and 34C.

In addition, in org.havi.ui.HsceneFactory, it is not required that an OCAP application use a dispose(HScene) method on a previously acquired HScene S1 before acquiring another HScene S2 provided that the former and the latter HScene instances S1 and S2 are associated with different HGraphicsDevice instances.

In Focus Handling Rules, the implementation may maintain a global, ordered list of focusable HScene instances. A focusable HScene is a visible and active HScene, where an HScene is considered visible if an HScene.isVisible( ) method returns true, and is considered active if either (1) an HScene.setActive(boolean) method has never been called by the application or (2) if a HScene.setActive(boolean focus) method has been called at least once with focus equal to true after having last been called with focus equal to false.

The focused HScene is a focusable HScene that is assigned input focus. There is only one focused HScene at any given time regardless of how many HGraphicsDevice instances or HScreen instances are active.

When an HScene becomes focusable, it is added at the end of the focusable HScene list.

When a focusable HScene is assigned focus, it is moved to the beginning of the focusable HScene list.

When an HScene is no longer focusable, it is removed from the focusable HScene list.

When the focused HScene is no longer focusable, the implementation may withdraw focus from the focused HScene and assign input focus to the first focusable HScene in the focusable HScene list.

When the first focusable HScene is inserted in the focusable HScene list, the implementation may not automatically assign input focus to it.

FIG. 32A illustrates pseudo-codes of HSceneBinding according to OCAP standards. FIG. 32B illustrates pseudo-codes of HSceneBinding for implement an OCAP MSM, according to an exemplary embodiment of the present invention.

In S3250 of FIG. 32B, an HGraphicsDevice interface that does not exist in the OCAP standards of FIG. 32A, is additionally declared.

In S3260 of FIG. 32B, this HSceneBinding is implemented by a platform defined class in order to provide a means of denoting certain properties of an HScene where that HScene is typically owned by another application and, therefore, direct access to the HScene reference is not permitted.

In S3270 of FIG. 32B, the screen rectangle of the HScene denoted by this HSceneBinding is obtained (returned) in the normalized coordinate space of the HScreen to which a getGraphicsDevice( ) method is mapped.

In S3280 of FIG. 32B, the application attributes with which the HScene denoted by this HSceneBinding is associated are obtained (returned).

In S3290 of FIG. 32B, the graphics device with which the HScene denoted by this HSceneBinding is associated are obtained (returned).

FIG. 33A illustrates pseudo-codes of HSceneChangeRequestHandler according to OCAP standards. FIG. 33B illustrates pseudo-codes of HSceneChangeRequestHandler for implementing an OCAP MSM, according to an exemplary embodiment of the present invention.

In particular, the S3310 of FIG. 33A may be removed.

In S3330 of FIG. 33B, HSceneChangeRequestHandler is implemented by a privileged application in order to handle requests (1) to add an HScene not currently displayed, (2) remove an HScene currently displayed, (3) change the positions of HScenes on the screen, (4) move an HScene in the HScene z-order of an HGraphicsDevice, (5) move AWT focus between HScene containment hierarchies, and (6) generate notifications of changes of the assignment of AWT focus to an HScene containment hierarchy.

In S3340 of FIG. 33B, it is tested whether an HScene move (or size change) request is to be allowed or not. A testMove (HSceneBinding move, HSceneBinding currentScenes[ ]) method is called when an HScene is to be moved within the HScreen or to be resized, i.e., if the HScreenRectangle of the represented HScene would be changed in position or size.

A move parameter may be the HSceneBinding that designates the screen rectangle of the affected HScene, and which may be an entry of currentScenes. A currentScenes parameter may be the HSceneBindings that correspond to the existing visible HScenes (and their current screen rectangles) including the affected HScene. In this context, an HScene is considered visible if the HScene.isVisible( ) method returns true.

The testMove method returns true if the move can be made, otherwise returns false.

In S3350 of FIG. 33B, it is tested if an HScene z-order change request can be made or not. testOrder (HSceneBinding reorder, HSceneBinding currentScenes[ ], int currentOrder, int newOrder) is called when an HScene is to be moved in the z-order, or caused to be added or removed from the z-order. In the case that an HScene is being removed from the z-order, the resulting value of the testOrder method may be ignored by the implementation (e.g., an application's HScene is being removed because the application is terminating).

The following constraints may apply when invoking the testOrder method:

either (or both) of currentOrder or (and) newOrder are non-negative;

if currentOrder is non-negative, then it is a valid index of the array referenced by currentScenes; and if currentOrder is a valid index of currentScenes and if newOrder is non-negative, then it is a valid index of the array referenced by currentScenes.

A reorder parameter may be the HSceneBinding that designates the affected HScene. If this HScene is already present in the HScene z-order, then it may appear as an entry of currentScenes; otherwise, it may not be present in currentScenes. The reorder parameter does not considered in the testOrder method of S3320 of FIG. 33A and the z-order may be verified by the reorder parameter in consideration of HScene influenced by the testOrder method of FIG. 33B.

A currentScenes parameter may be the HSceneBindings that correspond to the existing visible HScenes in z-order with the first entry (0) being the front-most HScene. In this context, an HScene is considered visible if the HScene.isVisible( ) method returns true.

A currentOrder parameter may be the value '−1' if the HScene is to be shown due to invocation of an HScene.show( ) method or an HScene.setVisible(true) method, or, if the HScene was already displayed, a non-negative integer denoting the existing position in the currentScene array of the HScene to move.

A newOrder parameter may be a non-negative integer designating the new position to which the affected HScene is to be moved or '−1' if the affected HScene is being removed (entirely) from the HScene z-order. If the affected HScene is being added to the HScene z-order then newOrder indicates the position at which it is to appear, with all other current HScenes to be move down by one position. If currentOrder is '−1' and the value of newOrder is greater than the index of the last valid index of currentScenes, then the to be added HScene is being requested to be placed rear-most in the HScene z-order.

The testOrder method returns null if the reorder (add/remove) request is permitted as specified by parameters. The value of the currentScenes parameter may be returned if the request must not be performed as specified.

A new array of HSceneBinding instances that is a permutation of the set composed of the elements in (a) currentScenes minus reorder if currentOrder is non-negative and newOrder is negative, (b) currentScenes plus reorder if currentOrder is negative and newOrder is non-negative, or (c) currentScenes if currentOrder and newOrder are non-negative, is returned.

In S3360 of FIG. 33B, it is tested whether reassignment (or removal) of AWT focus to (from) an HScene is to be allowed or not. If an HSceneChangeRequestHandler is registered, then an OCAP platform implementation may call a testFocusChange method whenever AWT focus would be initially assigned to an HScene container hierarchy, moved between HScene container hierarchies, or removed from all HScene container hierarchies. If the testFocusChange method returns false for some focus state change, then the OCAP platform implementation may not complete that change, and must leave AWT focus unchanged.

An OCAP platform implementation may not call the testFocusChange method when moving focus between sub-containers or components within an HScene instance.

An OCAP platform implementation may, but need not call (or use the return value from) the testFocusChange method in the case of a platform originated AWT HScene focus reassignment; however, in such a case, the platform may in all cases invoke a focusChanged(..) method to provide notification of the platform originated HScene focus change.

When invoking the testFocusChange method, either (or both) of newScene or (and) oldScene may not null as a constraint.

A newScene parameter may be the HSceneBinding that denotes the HScene to which focus is to be assigned, or, null, in which case focus is not to be assigned to any HScene, i.e., left unassigned.

An oldScene parameter may be the HSceneBinding that denotes the HScene from which focus is to be removed, or, null, in which case focus was not assigned to any HScene (immediately prior to invoking the testFocusChange method).

The testFocusChange method returns true if the focus transfer (or removal) can be made, otherwise returns false.

In S3370 of FIG. 33B, a handler of changes is notified in current assignment of AWT focus. The focusChanged method provides notification of changes to the current assignment of AWT focus to some HScene. In order to designate such HScene, an HSceneBinding is used, which uniquely identifies a scene through the combination of an identified application, from a HSceneBinding.getAppAttributes( ) method, and a graphics screen device, from a HSceneBinding.getGraphicsDevice( ) method.

An OCAP platform implementation may not call a focusChanged method when moving focus between sub-containers or components within an HScene instance.

The unique identification referred to above is based on the constraint that a given application have no more than one HScene per HGraphicsDevice.

A newScene parameter may be either (1) an HSceneBinding indirectly denoting the new HScene to which focus has been assigned or (2) null indicating that no HScene is now assigned focus (in this application environment).

An oldScene parameter may be either (1) an HSceneBinding indirectly denoting the old (previous) HScene from which focus has been removed or (2) null indicating that no HScene was previously assigned focus (in this application environment).

FIG. 34A illustrates pseudo-codes of HSceneManager according to OCAP standards. FIGS. 34B and 34C illustrate pseudo-codes of HSceneManager for implementing an OCAP MSM, according to an exemplary embodiment of the present invention.

In S3420 of FIG. 34B, HSceneManager represents a platform manager component that allows a privileged application to register a handler to process requested HScene changes within an HGraphicsDevice composited with all HScenes (of that HGraphicsDevice). In addition, HScene z-ordering, default scene, and current focus assignment can be queried using HSceneManager.

In S3430 of FIG. 34B, a protected default constructor is generated.

In S3435 of FIG. 34B, the singleton instance of HSceneManager is obtained, where this instance appears to behave (from an accessible state perspective) as if it were scoped to the platform (and not the calling application). The HSceneManager is returned.

In S3440 of FIG. 34B, a setHSceneChangeRequestHandler(HSceneChangeRequestHandler handler) method allows an application establish itself as the HScene change request handler. If a handler is already registered when the setHSceneChangeRequestHandler method is called, the HScene change request handler is replaced with the specified handler.

A handler parameter may be either (1) an HSceneChangeRequestHandler to be queried regarding changes to HScene z-ordering, as well as changes regarding default focus assignment, or (2) null, in which case the current handler is removed.

SecurityException is thrown if the caller does not have MonitorAppPermission("handler.resource").

In S3445 of FIG. 34B, the set of scene bindings that correspond with the visible HScenes of the default HGraphicsDevice of the calling application, is obtained. When compared to public static OcapAppAttributes[ ] getHScene Order( ) in S3410 of FIG. 34A, the scene bindings are returned by being declared as an HSceneBinding[ ] type instead of a static OcapAppAttributes[ ] type.

If the calling application is assigned a default graphics screen, then a getHSceneOrder( ) method may return the same value as a getHSceneOrder(HScreen.getDefaultHScreen( ).getDefaultHGraphicsDevice( )) method; otherwise, it may return an empty array.

An array of HSceneBinding instances corresponding to visible HScene instances of the calling application's default HGraphicsDevice is returned in z-order, where visible means scene.isVisible( ) returns true.

SecurityException is thrown if the caller does not have MonitorAppPermission("handler.resource").

The set of scene bindings that correspond with the visible HScenes of the specified HGraphicsDevice, is obtained.

The array of return scene bindings is ordered such that the first entry (0) corresponds to the front-most visible HScene in the HScene z-order for the specified HGraphicsDevice, and the last entry corresponds to the rear-most visible HScene.

If the specified graphics device is associated with a screen that is not associated with a display screen or an output port or is not enabled for display on an output port, then an empty array may be returned.

A device parameter may be an HGraphicsDevice.

An array of HSceneBinding instances corresponding to visible HScene instances of the specified HGraphicsDevice is returned in z-order, where visible means scene.isVisible( ) returns true.

SecurityException is thrown if the caller does not have MonitorAppPermission("handler.resource").

In S3455 of FIG. 34C, the HScene z-order location for the calling application's default HScene is obtained. Applications can call a getAppHSceneLocation( ) method to determine where in the z-order of an HGraphicsDevice instance their default HScene is located. The getAppHSceneLocation( ) method returns the value '−1' if the application has never obtained a reference to its default HScene (implying that the application has no user interface); otherwise, returns the same value as getAppHSceneLocation(HSceneFactory.getDefaultHScene( )).

In S3460 of FIG. 34C, the HScene z-order location for the specified HScene is obtained. Applications can call a getAppHSceneLocation(HScene scene) method to determine where in the z-order of an HGraphicsDevice a specific HScene is located.

A scene parameter may be an HScene instance for which to obtain the z-order location within the HGraphicsDevice instance with which the HScene is associated.

The getAppHSceneLocation(HScene scene) method returns an integer designating the HScene z-order location for the specified HScene. The value is ordered increasing in z-order where '0' is front-most and all other values are in increasing order below the front-most HScene. A value of '−1' is returned if the HScene has not been ordered or if it is not visible, where visible is defined as scene.isVisible( ) returning true.

In S3465 of FIG. 34C, a getAppDefaultHScene(AppID id) method obtains an HSceneBinding that permits determining the default HScene of an identified application if that application possesses a default HScene.

Invocation of the getAppDefaultHScene(AppID id) method may not cause the creation of or association of a default HScene with an application.

An id parameter may be an AppID instance denoting an OCAP application.

The getAppDefaultHScene(AppID id) method returns either (1) an HSceneBinding (indirectly) denoting the default HScene assigned to the identified application or (2) null indicating that the application no longer exists in the application database, has terminated, or is not (currently) assigned a default HScene.

SecurityException is thrown if the caller does not have MonitorAppPermission("handler.resource").

In S3470 of FIG. 34C, an array of HSceneBinding instances that denote the current HScene instances of an identified application is obtained by a getAppHScenes(AppID id) method.

Invocation of the getAppHScenes(AppID id) method may not cause the creation of or association of an HScene with an application.

An id parameter may be an AppID instance denoting an OCAP application.

Either (1) a non-empty array of HSceneBinding instances that (indirectly) denote the HScene instances assigned to the identified application or (2) null indicating that the application no longer exists in the application database, has terminated, or is not (currently) assigned any HScene, may be returned by the getAppHScenes(AppID id) method.

SecurityException is thrown if the caller does not have MonitorAppPermission("handler.resource").

In S3475 of FIG. 34C, an HSceneBinding that permits determining the HScene (of this application environment) to which AWT focus is assigned, is obtained by a getHSceneFocus( ) method.

If the calling application has not been granted MonitorAppPermission("handler.resource"), then the getHSceneFocus( ) method may return null if AWT focus is assigned to an HScene that is not owned by the calling application.

Either (1) an HSceneBinding (indirectly) denoting the HScene to which AWT focus is assigned or (2) null indicating that AWT focus is not assigned to any HScene (in this application environment) or the calling application does not have MonitorAppPermission("handler.resource") in the circumstances described above may be returned by the getHSceneFocus( ) method.

In S3480 of FIG. 34C, transfer (or removal) of AWT focus is requested to (from) a specific HScene (of this application environment) by a transferHSceneFocus(HSceneBinding binding) method.

If this transfer (or removal) request is fulfilled, then this fulfillment may be asynchronous with respect to invocation of the transferHSceneFocus method; furthermore, fulfillment may not occur if the platform state or some other condition otherwise prevents changing AWT focus.

A request to assign AWT focus to an application that is not in a running state or to an HScene that is not focusable may not be fulfilled.

Upon the successful transfer (or removal) of focus to (from) some HScene by the transferHSceneFocus method or by the platform (independently of the transferHSceneFocus method), a focusChanged( ) method may not be invoked on a registered HSceneChangeRequestHandler instance.

A binding parameter may be either (1) an HSceneBinding which uniquely identifies an HScene to which AWT focus assignment is requested or (2) null, indicating that AWT focus assignment is requested to be removed from all HScene instances (of this application environment).

SecurityException is thrown if the caller does not have MonitorAppPermission("handler.resource").

In S3485 of FIG. 34C, a (HSceneBinding sb1, HSceneBinding sb2) method determines if two HSceneBinding instances refer to the same underlying scene.

Sb1 and sb2 parameters are HSceneBinding instances.

The (HSceneBinding sb1, HSceneBinding sb2) method returns true is sb1 and sb2 denote the same underlying scene; otherwise, returns false.

Exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

Alternatively, exemplary embodiments of the present invention can be written as computer programs and can be transmitted on computer readable transmission mediums such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A method of configuring and managing a multiscreen, the method comprising:

receiving a plurality of broadcasting services in a digital television or a digital set top box;

generating a plurality of display screens, wherein each of the plurality of display screens is a virtual screen to present an output composition of a physical display device;

generating a plurality of logical screens, wherein each of the plurality of logical screens is a virtual screen to be associated with a display screen of the plurality of display screens and a display area on each of the plurality of display screens;

associating the plurality of broadcasting services with the plurality of logical screens;

associating the plurality of logical screens with the plurality of display screens;

discovering a display screen set including active display screens from among the plurality of display screens; and discovering a screen set including active logical screens from among logical screens associated with a current display screen, wherein each of the plurality of display screens is optionally associated to zero or more video output ports, and wherein each of the output ports is for connection to an external device.

2. The method according claim 1, further comprising associating a service context for the at least one logical screen to a context for the at least one display screen, and changing the association between the contexts.

3. The method according to claim 1, further comprising determining a multiscreen configuration including the at least one logical screen, the at least one display screen, a context for the at least one broadcasting services, and information regarding the at least one output port, and changing the multiscreen configuration.

4. The method according to claim 3, further comprising reporting a change of the multiscreen configuration and the contexts.

5. The method according to claim 1, wherein the at least one broadcasting service comprises at least one of a video component, an audio component and a data component.

6. The method according to claim 1, wherein each of the plurality of logical screens includes at least one of a background image, a video raster and a graphic raster.

7. The method according to claim 1, wherein the display screen set further includes potentially active display screens from among the plurality of display screens, and the screen set further includes potentially active logical screens from among the logical screens associated with a current display screen.

8. The method according to claim 1, wherein the active logical screens are logical screens marked as visible, and simultaneously presenting content from the broadcasting services.

9. The method according to claim 1, wherein a logical screen and a display screen are categorized based on state variables regarding screen types of corresponding screen objects.

10. The method of claim 1, wherein parameters of each logical screen of the plurality of logical screens include at least one of information regarding the service context associated with each logical screen, information regarding the display screen associated with each logical screen, information regarding the display area on the display screen associated with each logical screen, and information regarding an output port associated with each logical screen.

11. The method of claim 3 further comprising discovering a state of the screen configuration based on a parameter of the plurality of screen objects.

12. The method of claim 1, wherein the external device includes one of a physical device displaying at least one of the plurality of received broadcasting services, an external output port to which at least one of the plurality of received broadcasting services is output, a storage device in which at least one of the plurality of received broadcasting services is stored, and an external device to which at least one of the plurality of received broadcasting services is transmitted via a network.

* * * * *